(12) United States Patent
Rastegardoost et al.

(10) Patent No.: US 11,653,366 B2
(45) Date of Patent: *May 16, 2023

(54) RANDOM ACCESS RESOURCE CONFIGURATION BASED ON DOWNLINK CONTROL INFORMATION

(71) Applicant: Beijing Xiaomi Mobile Software Co., Ltd., Beijing (CN)

(72) Inventors: Nazanin Rastegardoost, McLean, VA (US); Esmael Dinan, McLean, VA (US); Hyoungsuk Jeon, Centreville, VA (US); Hua Zhou, Vienna, VA (US); Kai Xu, Herndon, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,286

(22) Filed: Feb. 2, 2022

(65) Prior Publication Data
US 2022/0159634 A1 May 19, 2022

Related U.S. Application Data

(63) Continuation of application No. 16/739,716, filed on Jan. 10, 2020, now Pat. No. 11,259,293.

(60) Provisional application No. 62/790,925, filed on Jan. 10, 2019.

(51) Int. Cl.
*H04W 74/08* (2009.01)
*H04L 5/00* (2006.01)
*H04W 72/542* (2023.01)
*H04W 72/044* (2023.01)
*H04W 72/23* (2023.01)

(52) U.S. Cl.
CPC .......... *H04W 72/23* (2023.01); *H04L 5/0048* (2013.01); *H04W 72/542* (2023.01); *H04W 74/0833* (2013.01); *H04W 72/044* (2013.01)

(58) Field of Classification Search
None
See application file for complete search history.

(56) References Cited

U.S. PATENT DOCUMENTS 10,291,378 B1   5/2019   Bai et al.
2007/0097981 A1   5/2007   Papasakellariou
(Continued)

OTHER PUBLICATIONS

3GPP TS 36.212 V15.3.0 (Sep. 2018); 3rd Generation Partnership Project; Technical Specification Group Radio Access Network; Evolved Universal Terrestrial Radio Access (E-UTRA); Multiplexing and channel coding (Release 15).
(Continued)

*Primary Examiner* — Andrew C Oh
(74) *Attorney, Agent, or Firm* — Arch & Lake LLP

(57) ABSTRACT

A wireless device selects a first downlink reference signal from one or more downlink reference signals based on a received signal strength of the first downlink reference signal being above a value. Based on an index of the first downlink reference signal, a radio network identifier is determined. A downlink control information (DCI) addressed to the radio network identifier and indicating one or more random access occasions (ROs) is received. In response to receiving the DCI, a preamble is transmitted via one of the one or more ROs.

14 Claims, 28 Drawing Sheets

(56) References Cited

U.S. PATENT DOCUMENTS

| | | | |
|---|---|---|---|
| 2008/0310561 A1* | 12/2008 | Song | H04L 27/26526 375/343 |
| 2009/0180436 A1* | 7/2009 | Vujcic | H04W 74/0866 370/330 |
| 2009/0232101 A1 | 9/2009 | Papasakellariou et al. | |
| 2010/0110878 A1 | 5/2010 | Frederiksen et al. | |
| 2010/0124291 A1 | 5/2010 | Muharemovic et al. | |
| 2010/0232311 A1 | 9/2010 | Zhang et al. | |
| 2010/0238975 A1 | 9/2010 | Nakao et al. | |
| 2010/0260156 A1* | 10/2010 | Lee | H04W 56/0035 370/336 |
| 2011/0075684 A1 | 3/2011 | Zeng | |
| 2011/0136495 A1 | 6/2011 | Chen | |
| 2012/0039176 A1 | 2/2012 | Eshan et al. | |
| 2012/0176922 A1 | 7/2012 | Ehasan et al. | |
| 2012/0300715 A1* | 11/2012 | Pelletier | H04W 56/0005 370/329 |
| 2012/0327904 A1 | 12/2012 | Park | |
| 2013/0010709 A1 | 1/2013 | Earnshaw | |
| 2013/0034073 A1 | 2/2013 | Alba | |
| 2013/0208710 A1 | 8/2013 | Seo et al. | |
| 2013/0242730 A1 | 9/2013 | Pelletier | |
| 2014/0247799 A1* | 9/2014 | Suzuki | H04J 13/22 370/329 |
| 2014/0247800 A1 | 9/2014 | Ro et al. | |
| 2014/0348092 A1 | 11/2014 | Ihm | |
| 2015/0049699 A1 | 2/2015 | Takeda | |
| 2015/0055723 A1 | 2/2015 | Kim et al. | |
| 2015/0071267 A1 | 3/2015 | Wu et al. | |
| 2015/0139125 A1 | 5/2015 | Bharadwaj et al. | |
| 2015/0245247 A1 | 8/2015 | Chen | |
| 2015/0245347 A1* | 8/2015 | Yi | H04L 5/0048 370/280 |
| 2016/0211948 A1 | 7/2016 | Tirola et al. | |
| 2016/0381715 A1* | 12/2016 | Lee | H04W 74/0841 370/329 |
| 2017/0013595 A1* | 1/2017 | Jung | H04W 72/02 |
| 2017/0013643 A1* | 1/2017 | Nan | H04W 74/006 |
| 2017/0064694 A1 | 3/2017 | Wang | |
| 2017/0273056 A1 | 9/2017 | Papasakellariou | |
| 2018/0063817 A1 | 3/2018 | Chakraborty | |
| 2018/0070332 A1* | 3/2018 | Chen | H04W 72/23 |
| 2018/0077683 A1 | 3/2018 | Rico Alvarino | |
| 2018/0092083 A1* | 3/2018 | Agarwal | H04W 60/04 |
| 2018/0123755 A1 | 5/2018 | Kim et al. | |
| 2018/0184461 A1* | 6/2018 | Zhang | H04W 72/044 |
| 2018/0212659 A1* | 7/2018 | Xiong | H04B 7/0695 |
| 2018/0242280 A1 | 8/2018 | Axmon et al. | |
| 2018/0263060 A1* | 9/2018 | Tirronen | H04W 72/23 |
| 2018/0278365 A1 | 9/2018 | Liu et al. | |
| 2018/0279380 A1* | 9/2018 | Jung | H04W 56/0005 |
| 2018/0288810 A1* | 10/2018 | Ishii | H04W 48/12 |
| 2018/0317263 A1 | 11/2018 | Ishii | |
| 2018/0324768 A1 | 11/2018 | Shaheen | |
| 2018/0368016 A1* | 12/2018 | Lee | H04W 76/15 |
| 2019/0045483 A1* | 2/2019 | Tabet | H04W 72/30 |
| 2019/0053029 A1 | 2/2019 | Agiwal | |
| 2019/0089442 A1* | 3/2019 | Akoum | H04B 7/0639 |
| 2019/0103943 A1 | 4/2019 | Wang | |
| 2019/0110314 A1* | 4/2019 | Abedini | H04W 72/23 |
| 2019/0140774 A1 | 5/2019 | Noh et al. | |
| 2019/0238242 A1 | 8/2019 | Middleton et al. | |
| 2019/0246395 A1* | 8/2019 | Huang | H04W 72/12 |
| 2019/0312696 A1 | 10/2019 | Kim et al. | |
| 2019/0364556 A1* | 11/2019 | Davydov | H04W 72/0446 |
| 2019/0380139 A1 | 12/2019 | Xiong | |
| 2020/0037297 A1 | 1/2020 | Pan | |
| 2020/0037360 A1* | 1/2020 | Qian | H04B 7/0695 |
| 2020/0137806 A1* | 4/2020 | Islam | H04W 74/006 |
| 2020/0213040 A1* | 7/2020 | Takeda | H04W 74/0833 |
| 2020/0213978 A1 | 7/2020 | Iyer | |
| 2020/0252858 A1* | 8/2020 | Wang | H04W 48/10 |
| 2020/0295886 A1 | 9/2020 | Gou | |
| 2020/0304257 A1 | 9/2020 | Kim et al. | |
| 2020/0350971 A1 | 11/2020 | Hakola | |
| 2020/0389871 A1 | 12/2020 | Wang | |
| 2021/0014791 A1 | 1/2021 | Freda | |
| 2021/0029737 A1* | 1/2021 | Pan | H04W 74/0833 |
| 2021/0029739 A1* | 1/2021 | Shi | H04W 74/0833 |
| 2021/0068161 A1* | 3/2021 | Takahashi | H04W 74/0833 |
| 2021/0176789 A1 | 6/2021 | Takahashi et al. | |
| 2021/0195633 A1* | 6/2021 | Ohara | H04L 5/0053 |
| 2021/0282089 A1 | 9/2021 | Takeda et al. | |

OTHER PUBLICATIONS

3GPP TS 36.213 V15.3.0 (Sep. 2018); 3rd Generation Partnership Project; Technical Specification Group Radio Access Network.
3GPP TS 37.213 V15.1.0 (Sep. 2018); 3rd Generation Partnership Project; Technical Specification Group Radio Access Network; Physical layer procedures for shared spectrum channel access (Release 15).
3GPP TS 38.211 V15.3.0 (Sep. 2018); 3rd Generation Partnership Project; Technical Specification Group Radio Access Network; NR; Physical channels and modulation (Release 15).
3GPP TS 38.212 V15.3.0 (Sep. 2018); 3rd Generation Partnership Project; Technical Specification Group Radio Access Network; NR; Multiplexing and channel coding (Release 15).
3GPP TS 38.213 V15.3.0 (Sep. 2018); 3rd Generation Partnership Project; Technical Specification Group Radio Access Network; NR; Physical layer procedures for control (Release 15).
3GPP TS 38.321 V15.3.0 (Sep. 2018); 3rd Generation Partnership Project; Technical Specification Group Radio Access Network; NR; Medium Access Control (MAC) protocol specification (Release 15).
3GPP TS 38.331 V15.3.0 (Sep. 2018); 3rd Generation Partnership Project; Technical Specification Group Radio Access Network; NR; Radio Resource Control (RRC) protocol specification (Release 15).
3GPP TSG RAN WG1 Meeting #94; Gothenburg, Sweden, Aug. 20-24, 2018; Title: RAN1 Chairman's Notes.
3GPP TSG RAN WG1 Meeting #94bis; Chengdu, China, Oct. 8-12, 2018; Title: RAN1 Chairman's Notes.
3GPP TSG RAN WG1 Meeting #95; Spokane, USA, Nov. 12-16, 2018; Title: RAN1 Chairman's Notes.
3GPP TSG RAN WG1 Meeting #94bis R1-1810127; Chengdu, China, Oct. 8-12, 2018; Agenda Item 7.2.2.4.2; Source: Huawei, HiSilicon; Title: Initial access in NR unlicensed ; Document for: Discussion and decision.
3GPP TSG RAN WG1 Meeting #94BIS; R1-1811321; Chengdu, P. R. China, Oct. 8-12, 2018; Agenda Item 7.2.2.3.1; Source: Charter Communications; Title: Initial Signal Design for NR-U; Document for: Discussion/Approval.
3GPP TSG RAN WG1 Meeting #95 R1-1812191; Spokane, USA, Nov. 12-Nov. 16, 2018; Agenda tern: 7.2.2.2; Source: Huawei, HiSilicon; Title: NR numerology and frame structure for unlicensed bands; Document for: Discussion and decision.
3GPP TSG RAN WG1 Meeting #95 R1-1812195; Spokane, USA, Nov. 12-16, 2018; Agenda Item 7.2.2.4.2; Source: Huawei, HiSilicon; Title: Initial access in NR unlicensed ; Document for: Discussion and decision.
3GPP TSG RAN WG1 Meeting #95; R1-1812356 Spokane, USA, Nov. 12-16, 2018; Agenda item:7.2.2.4.1; Source: MediaTek Inc.; Title: Channel access procedure in NR-U; Document for: Discussion and decision.
3GPP TSG RAN WG1 Meeting #95; R1-1812561; Spokane, USA, Nov. 12-16, 2018; Agenda Item 7.2.2.4.2; Source: LG Electronics; Title: Initial access and mobility for NR unlicensed operation; Document for Discussion and decision.
3GPP TSG RAN WG1 Meeting #95; R1-1812698; Spokane, USA, Nov. 12-16, 2018; Agenda item 7.2.2.4.2; Source: Nokia, Nokia Shanghai Bell; Title: On Initial Access and Mobility for NR-U; Document for Discussion and Decision.
3GPP TSG RAN WG1 Meeting #95; R1-1812720; Spokane, USA, Nov. 12-16, 2018; Agenda Item: 7.2.2.4.1; Source: TCL Communication; Title: On Paging and RACH enhancements for NR-U; Document for: Discussion and decision.

(56) References Cited

OTHER PUBLICATIONS

3GPP TSG RAN WG1 Meeting #95; R1-1812802; Spokane, USA, Nov. 12-16, 2018; Source: OPPO; Title: Initial access and mobility for NR-U; Agenda Item: 7.2.2.4.2; Document for: Discussion and Decision.
3GPP TSG RAN WG1 Meeting #95; R1-1813217; Spokane, USA, Nov. 12-16, 2018; Agenda Item: 7.2.2.2; Source: InterDigital Inc.; Title: NR-U Frame Structure Design; Document for: Discussion and Decision.
3GPP TSG RAN WG1 Meeting #95; R1-1813221; Spokane, USA, Nov. 12-16, 2018; Agenda Item 7.2.2.4.2; Source: InterDigital Inc.; Title: Discussion on Procedures for Initial Access and Mobility in NR-U ; Document for: Discussion and Decision.
3GPP TSG RAN WG1 Meeting #95 R1-183410; Spokane, USA; Nov. 12-Nov. 16, 2018; Agenda item: 7.2.2.2; Source: Qualcomm Incorporated; Title: TxOP Frame Structure for NR unlicensed; Document for: Discussion and Decision.
3GPP TSG RAN WG1 Meeting #95 R1-1813414; Spokane, USA; Nov. 12-Nov. 16, 2018; Agenda item: 7.2.2.4.2; Source: Qualcomm Incorporated; Title: Initial access and mobility procedures for NR unlicensed; Document for Discussion and Decision.
3GPP TSG-RAN WG1 Meeting #95 R1-1813459; Spokane, USA, Nov. 12-16, 2018; Agenda Item 7.2.2.4.2; Source: Ericsson; Title: On initial access, RRM, mobility and RLM; Document for: Discussion, Decision.
3GPP TSG-RAN WG2 Meeting #104 R2-1816688; Spokane, US, Nov. 12-16, 2018 Revision of R2-1813964 Agenda Item: 11.2.1.1; Souce: MediaTek Inc.; Title: Random access backoff and timers in NR-U; Document for Discussion and decision.
3GPP TSG-RAN WG2 Meeting #104 R2-1816776; Spokane, U.S. A, Nov. 12-16, 2018 Revision of R2-1814007; Agenda Item: 11.2.1.1; Source: InterDigital; Title: Random access in NR-Unlicensed; Document for Discussion, Decision.
GPP TSG-RAN WG2 Meeting #104 R2-1817473; Spokane, USA, Nov. 12-16, 2018; Agenda Item 11.2.1.1; Source: Apple Inc.; Title: RACH Enhancements in NR-U; Document for: Discussion.
3GPP TSG-RAN WG2 #104 TDoc R2-1817966; Spokane, WA, USA, Nov. 12-16, 2018; Revision of R2-1815026; Agenda Item: 11.2.1.1 ; Source: Ericsson; Title: Discussions on RACH enhancements for NR-U Document for: Discussion, Decision.

* cited by examiner

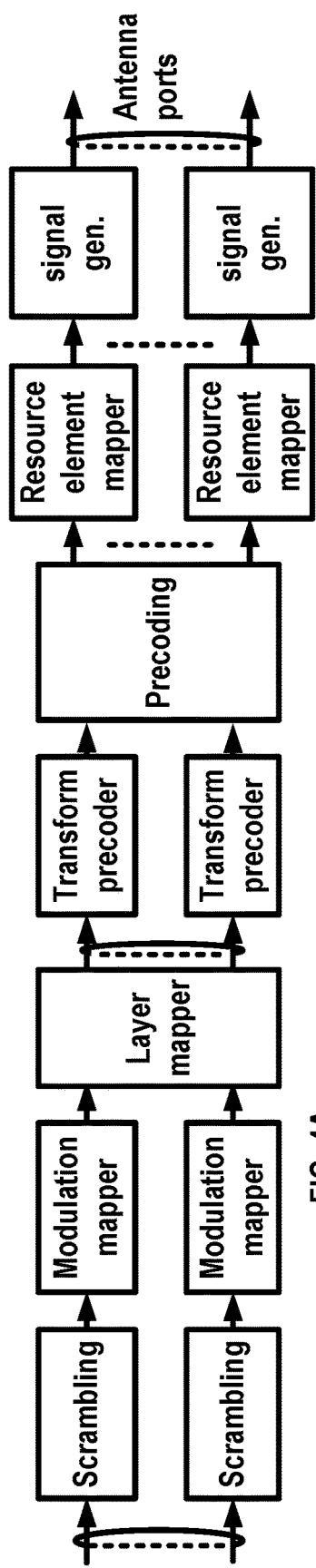
FIG. 4A
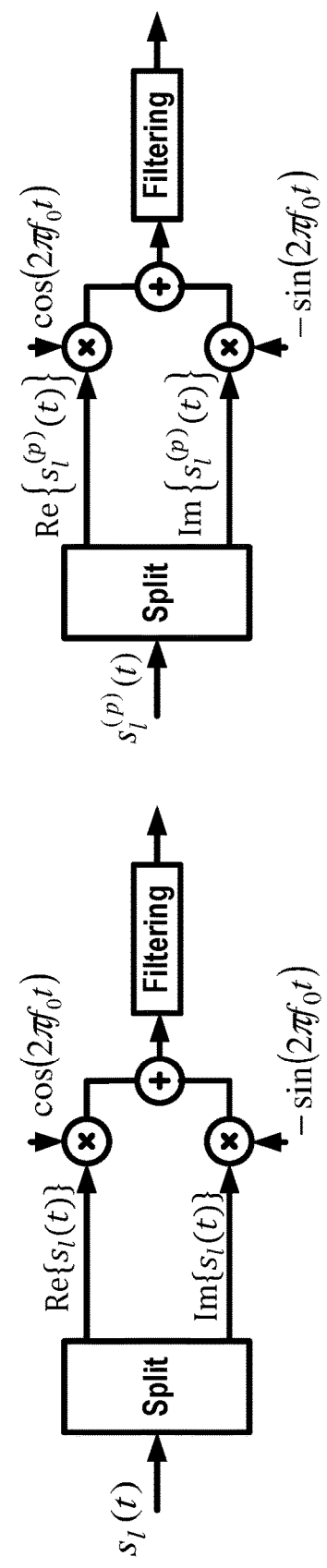
FIG. 4B
FIG. 4D
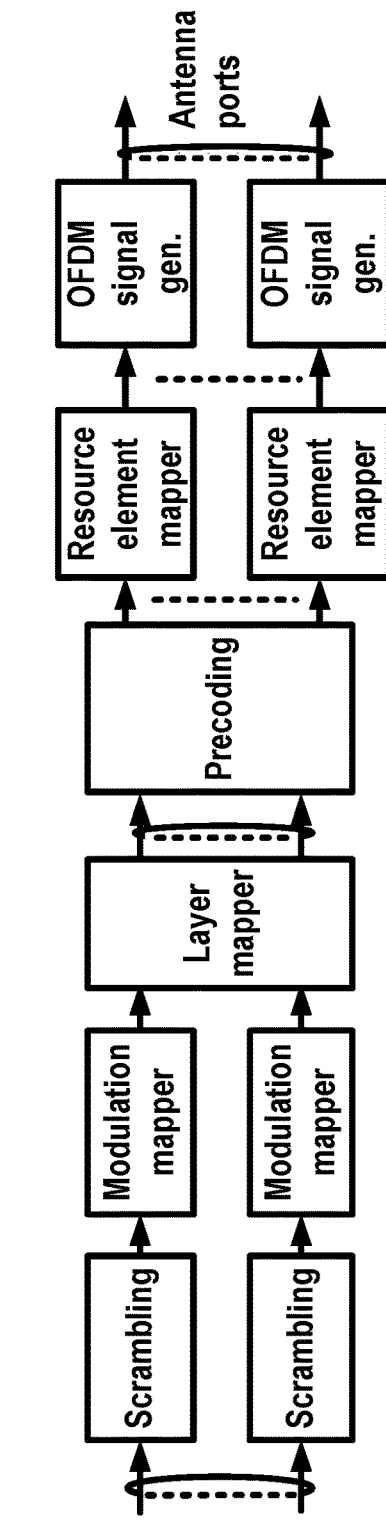
FIG. 4C

Random access configurations

| PRACH Configuration Index | Preamble format | $n_{SFN}^{mod\,x}=y$ | | Subframe number | Starting symbol | Number of PRACH slots within a subframe | $N_t^{RA,slot}$, number of time-domain PRACH occasions within a PRACH slot |
|---|---|---|---|---|---|---|---|
| | | $x$ | $y$ | | | | |
| 0 | 0 | 16 | 1 | 1 | 0 | - | - |
| 1 | 0 | 16 | 1 | 4 | 0 | - | - |
| 2 | 0 | 16 | 1 | 7 | 0 | - | - |
| 3 | 0 | 16 | 1 | 9 | 0 | - | - |
| 4 | 0 | 8 | 1 | 1 | 0 | - | - |
| 5 | 0 | 8 | 1 | 4 | 0 | - | - |
| 6 | 0 | 8 | 1 | 7 | 0 | - | - |
| 7 | 0 | 8 | 1 | 9 | 0 | - | - |
| 8 | 0 | 4 | 1 | 1 | 0 | - | - |
| 9 | 0 | 4 | 1 | 4 | 0 | - | - |
| 10 | 0 | 4 | 1 | 7 | 0 | - | - |
| 11 | 0 | 4 | 1 | 9 | 0 | - | - |
| 12 | 0 | 2 | 1 | 1 | 0 | - | - |
| 13 | 0 | 2 | 1 | 4 | 0 | - | - |
| 14 | 0 | 2 | 1 | 7 | 0 | - | - |
| 15 | 0 | 2 | 1 | 9 | 0 | - | - |
| 16 | 0 | 1 | 0 | 1 | 0 | - | - |
| 17 | 0 | 1 | 0 | 4 | 0 | - | - |
| 18 | 0 | 1 | 0 | 7 | 0 | - | - |
| 19 | 0 | 1 | 0 | 1,6 | 0 | - | - |
| 20 | 0 | 1 | 0 | 2,7 | 0 | - | - |
| ⋮ | ⋮ | ⋮ | ⋮ | ⋮ | ⋮ | ⋮ | ⋮ |
| 132 | A2 | 1 | 0 | 2,7 | 0 | 2 | 3 |
| 133 | A2 | 1 | 0 | 1,4,7 | 0 | 2 | 3 |
| 134 | A2 | 1 | 0 | 0,2,4,6,8 | 0 | 2 | 3 |
| ⋮ | ⋮ | ⋮ | ⋮ | ⋮ | ⋮ | ⋮ | ⋮ |
| 255 | C2 | 1 | 0 | 1,3,5,7,9 | 0 | 2 | 2 |

FIG. 25

RANDOM ACCESS RESOURCE CONFIGURATION BASED ON DOWNLINK CONTROL INFORMATION

CROSS-REFERENCE TO RELATED APPLICATIONS

This application is a continuation of U.S. patent application Ser. No. 16/739,716, filed Jan. 10, 2020, which claims the benefit of U.S. Provisional Application No. 62/790,925, filed Jan. 10, 2019, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 25 is a diagram of example RA configurations as per an aspect of an embodiment of the present disclosure.

DETAILED DESCRIPTION OF EMBODIMENTS

Figure 1:
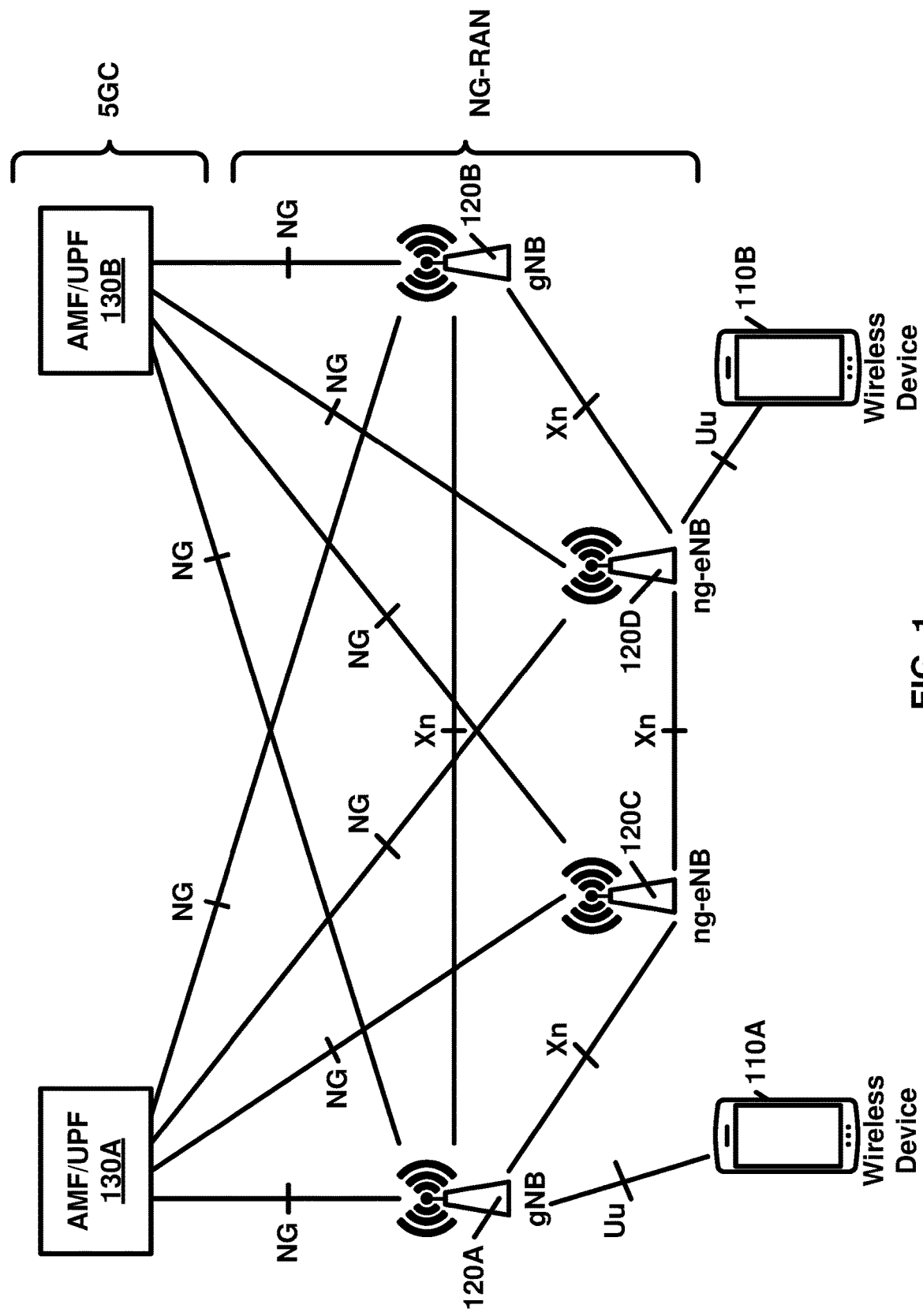
FIG. 1 is a diagram of an example RAN architecture as per an aspect of an embodiment of the present disclosure.

Example embodiments of the present disclosure enable operation of random access. Embodiments of the technology disclosed herein may be employed in the technical field of multicarrier communication systems. More particularly, the embodiments of the technology disclosed herein may relate to one or more procedures in the random access in multi-carrier communication systems.

The following Acronyms are used throughout the present disclosure:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |

| | |
|---|---|
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |
| DCCH | Dedicated Control CHannel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic CHannel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel IDentifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | Orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank Indicator |
| RLC | Radio Link Control |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TDD | Time Division Duplex |
| TDMA | Time Division Multiple Access |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B) providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
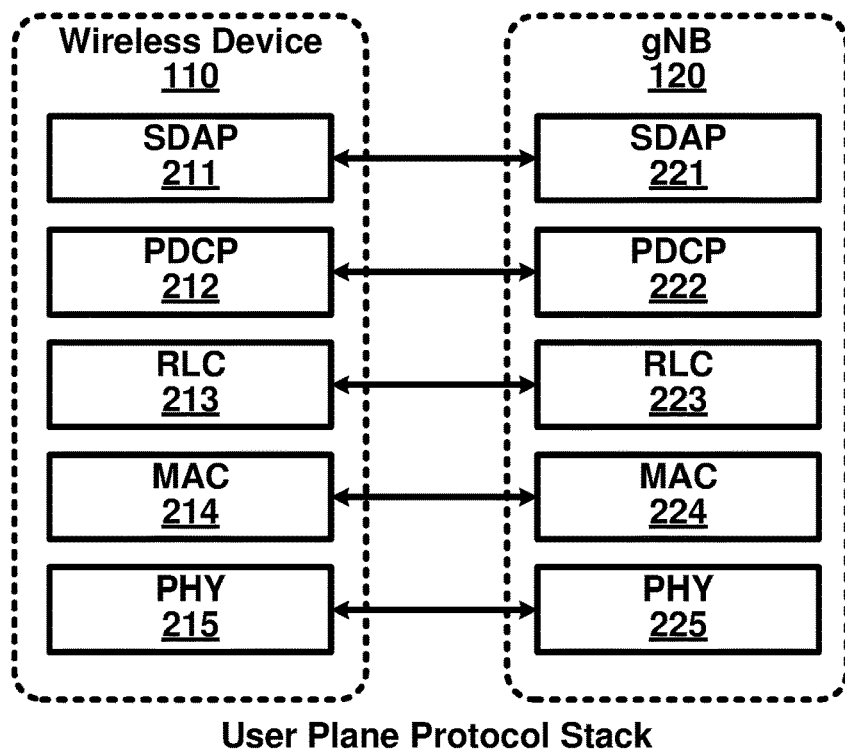
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
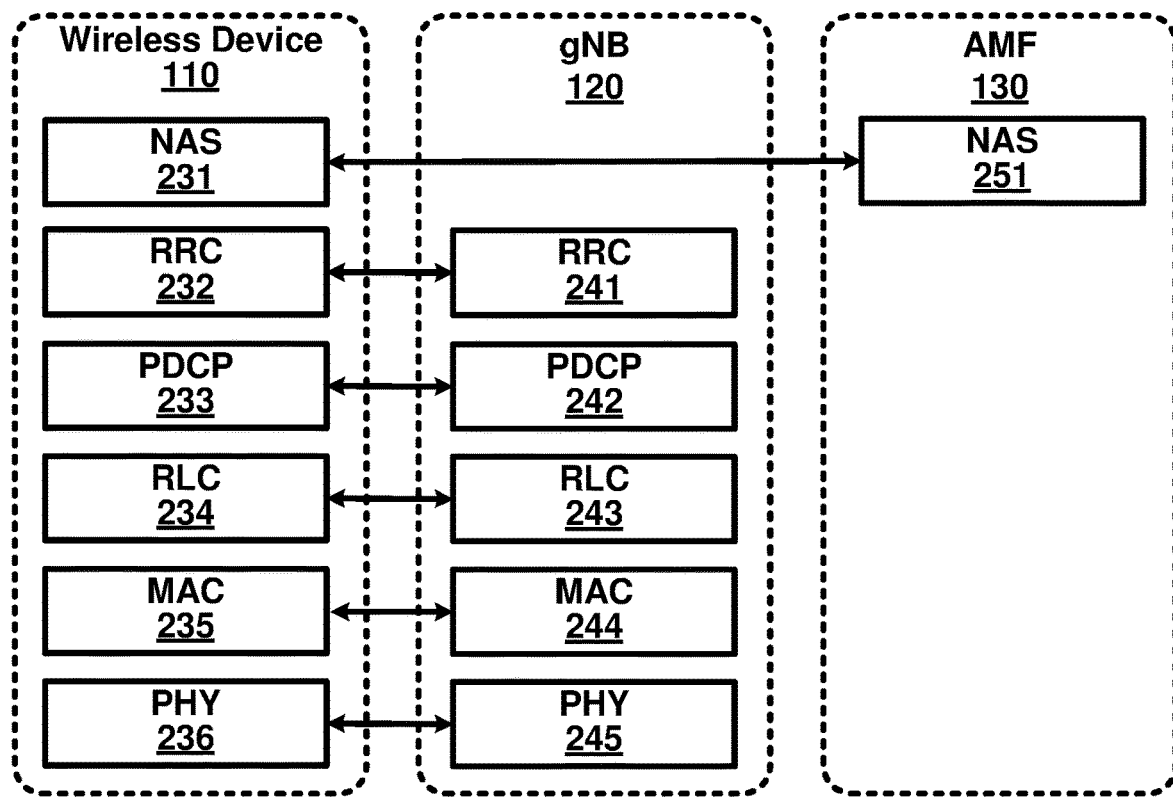
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
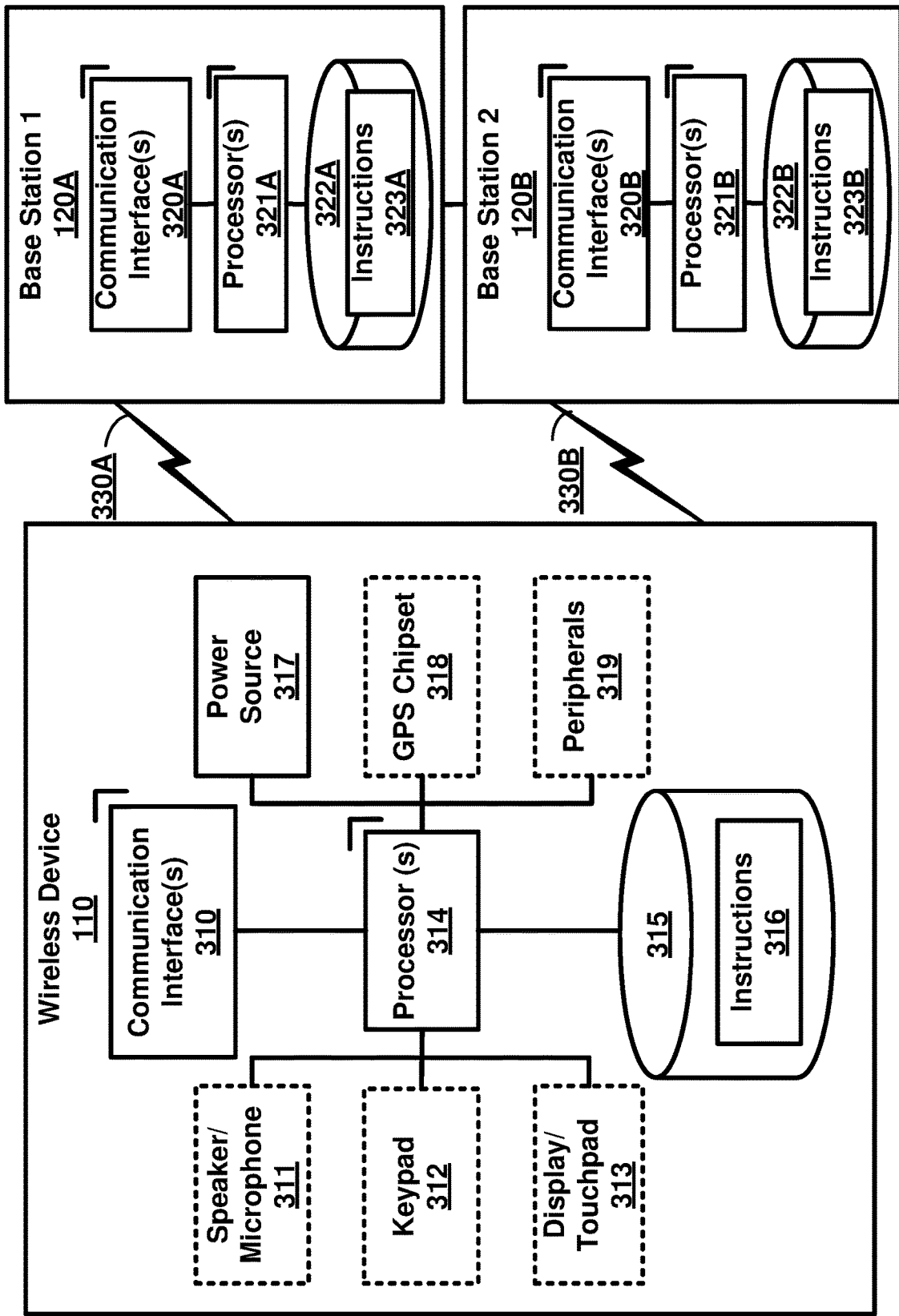
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
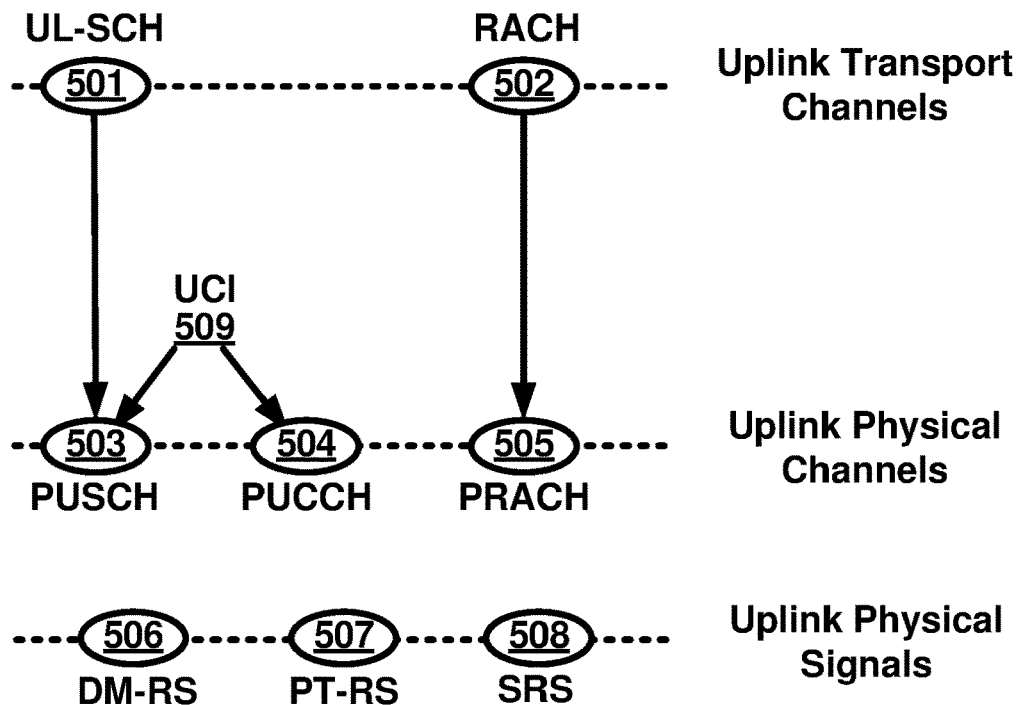
FIG. 5A is a diagram of an example uplink channel mapping and example uplink physical signals as per an aspect of an embodiment of the present disclosure.
Figure 5B:
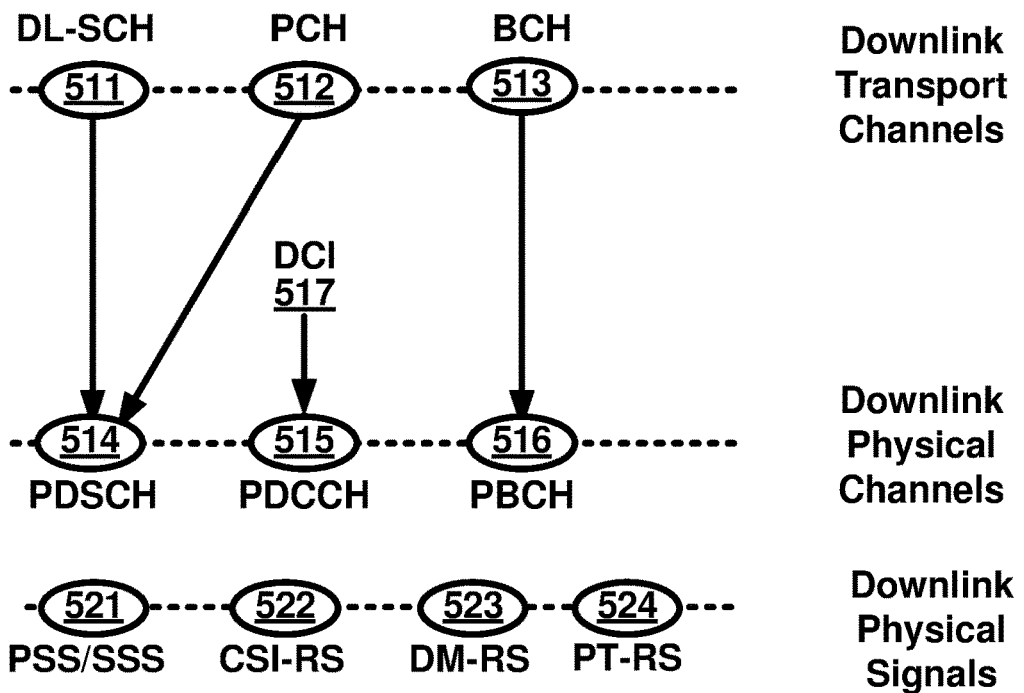
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
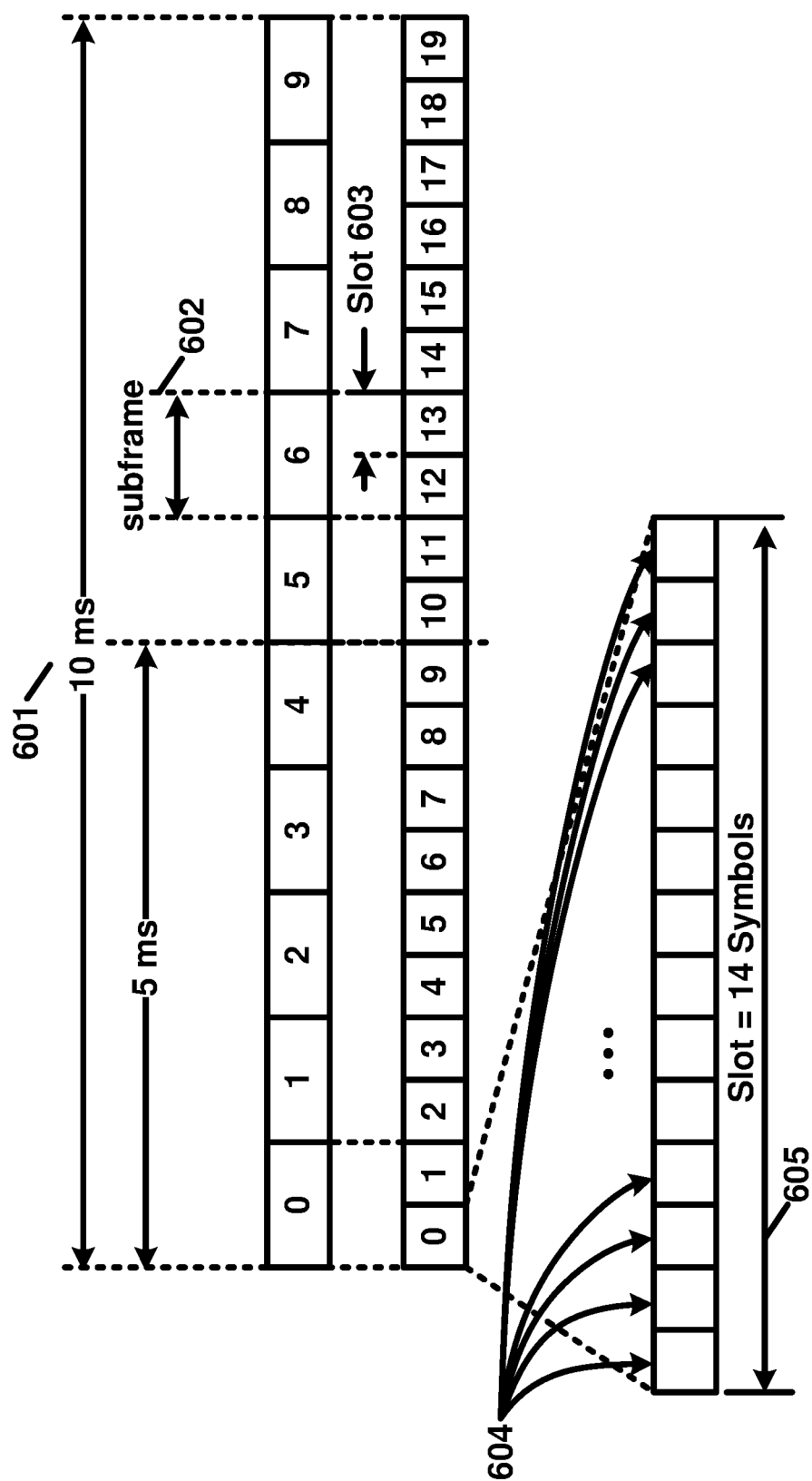
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
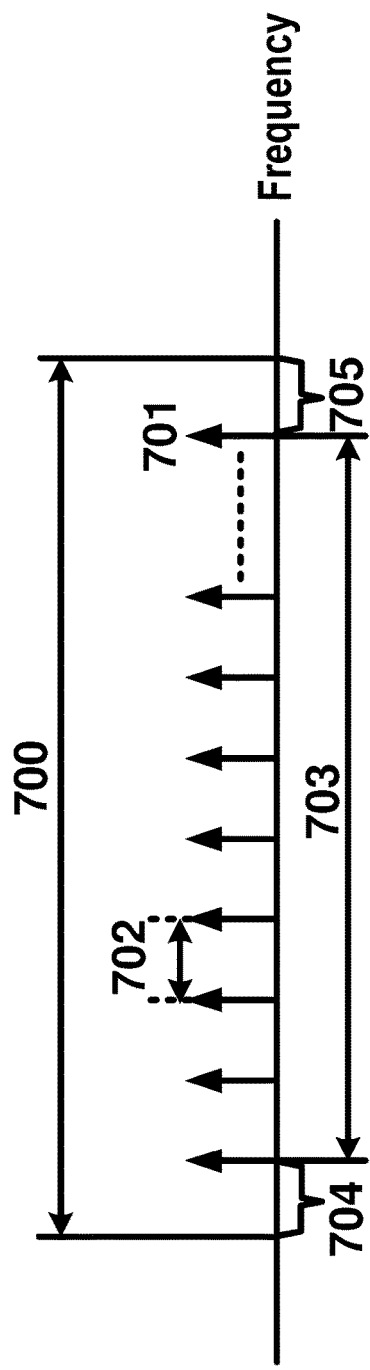
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
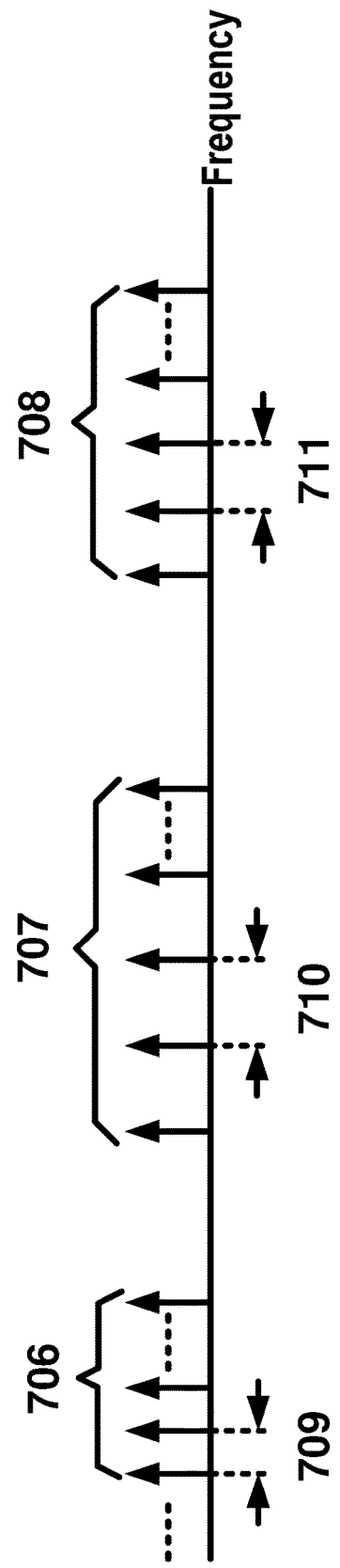

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
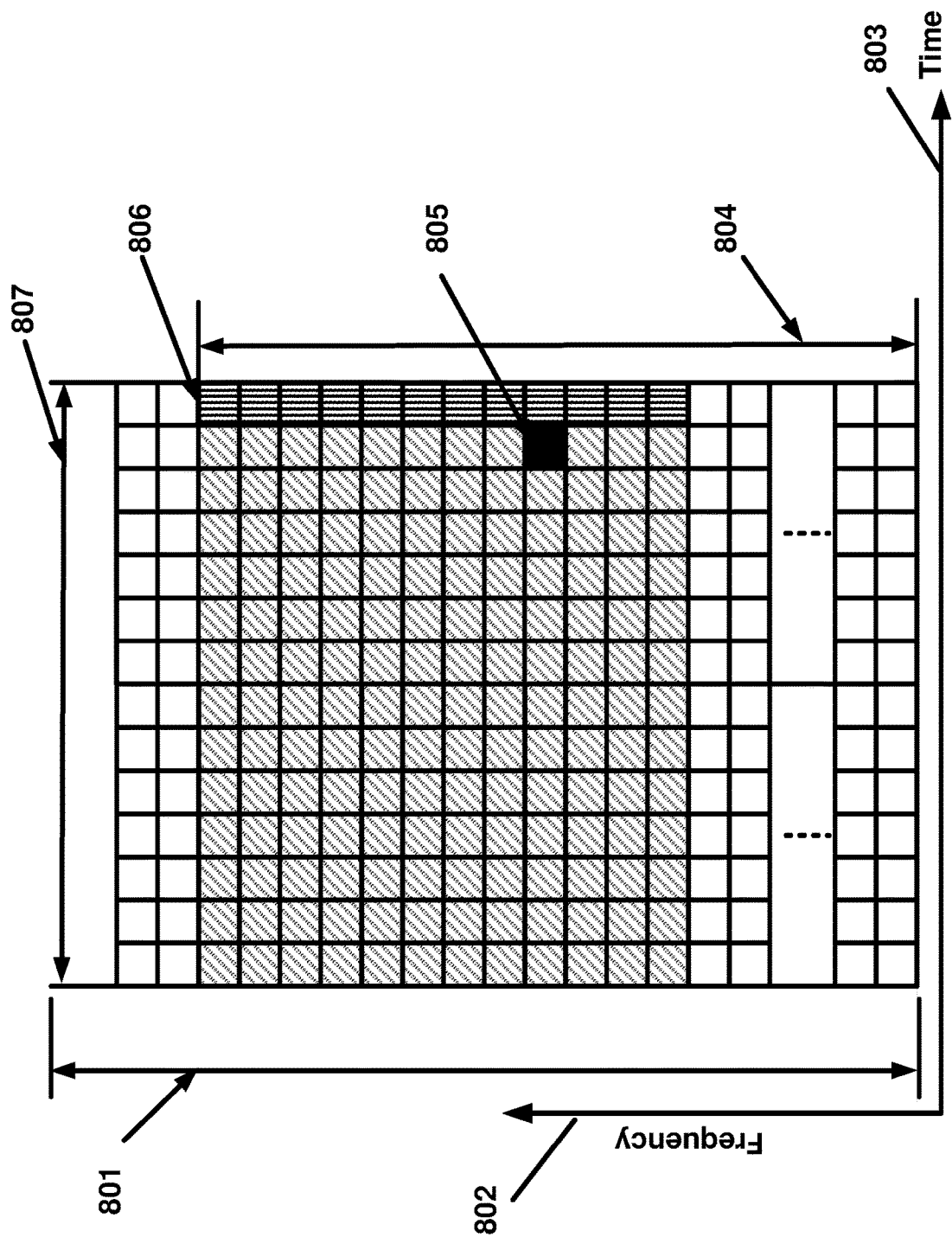
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
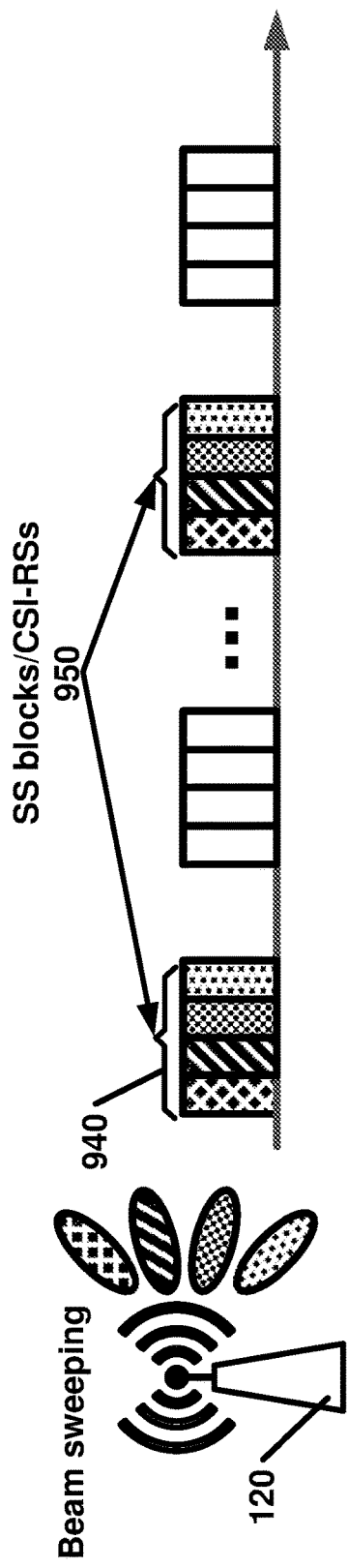
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
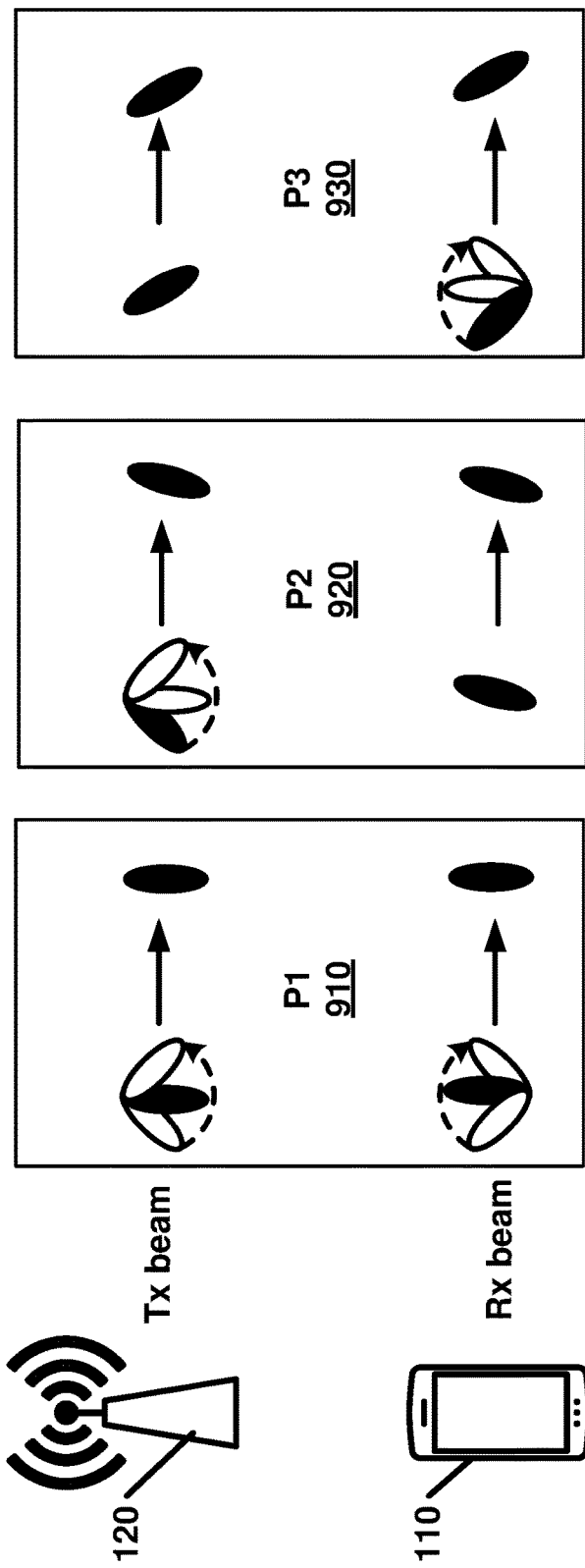
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
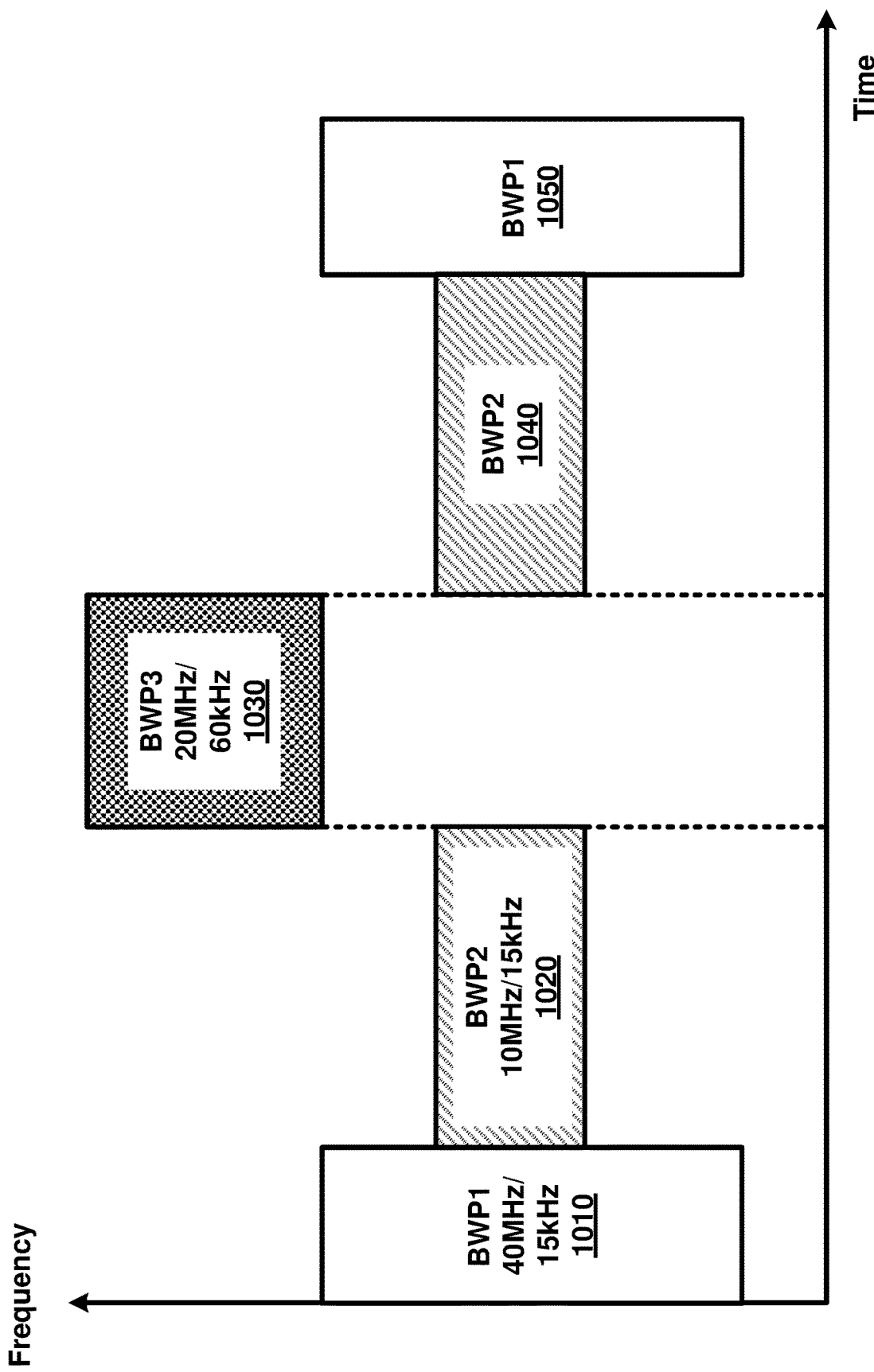
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for an UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
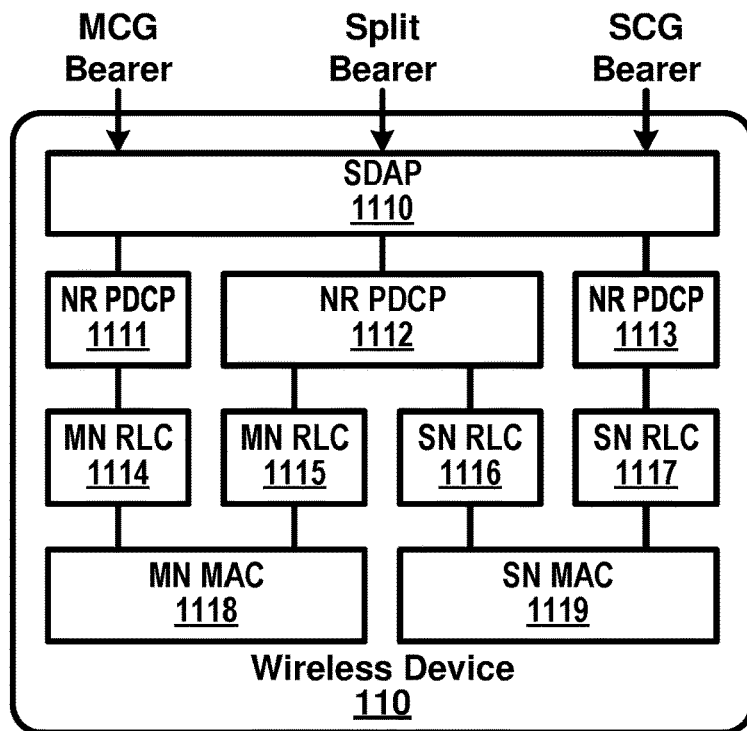
FIG. 11A, and FIG. 11B are diagrams of an example multi connectivity as per an aspect of an embodiment of the present disclosure.
Figure 11B:
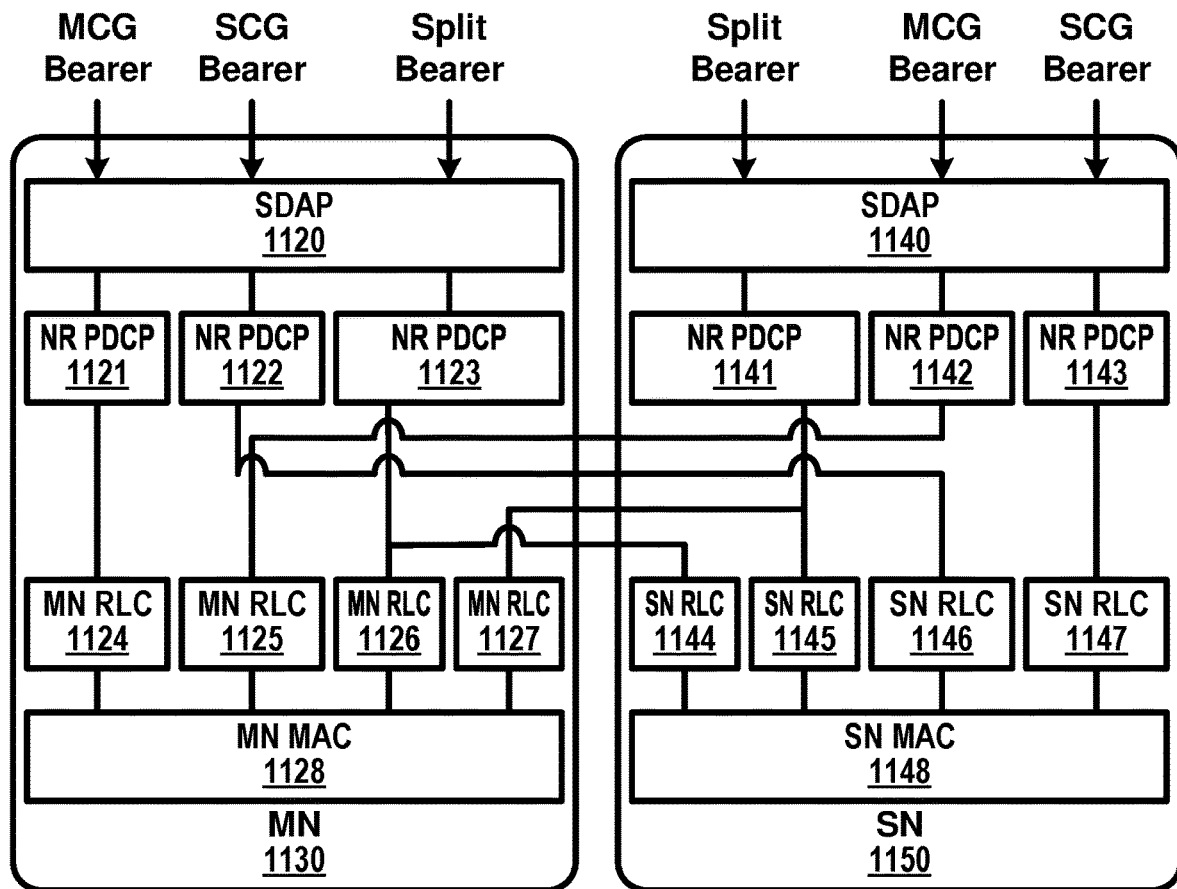

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG)

comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
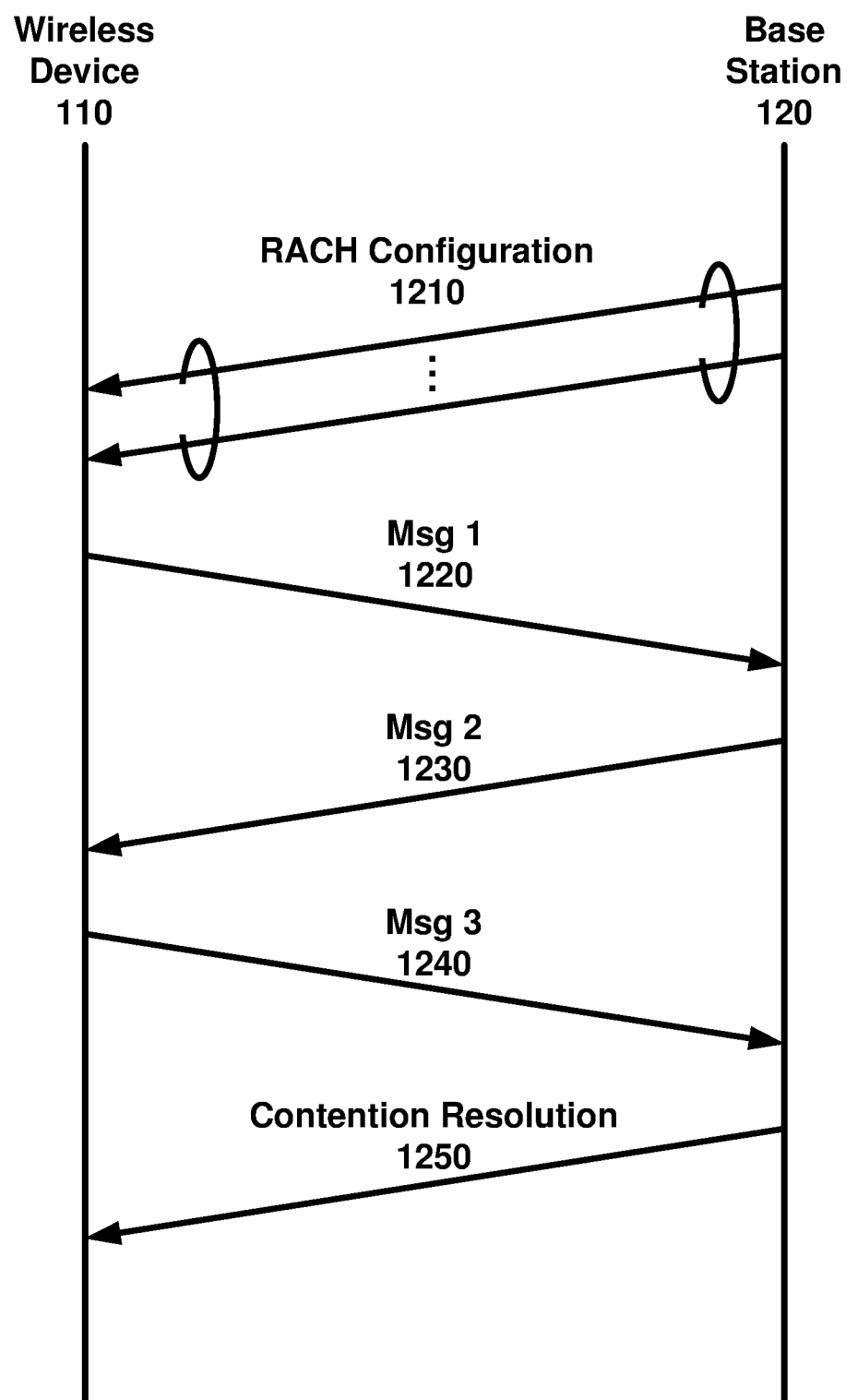
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration

1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
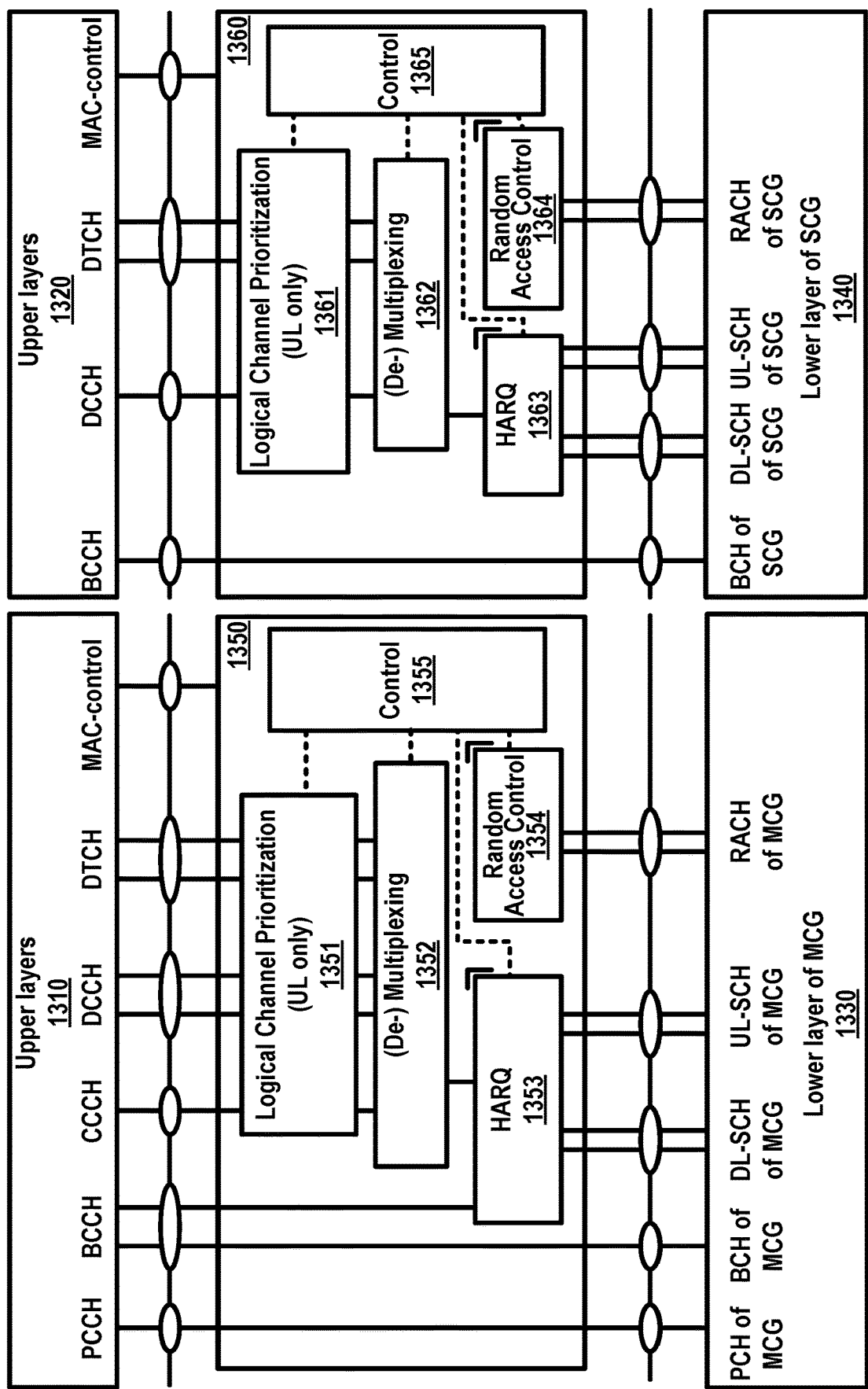
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
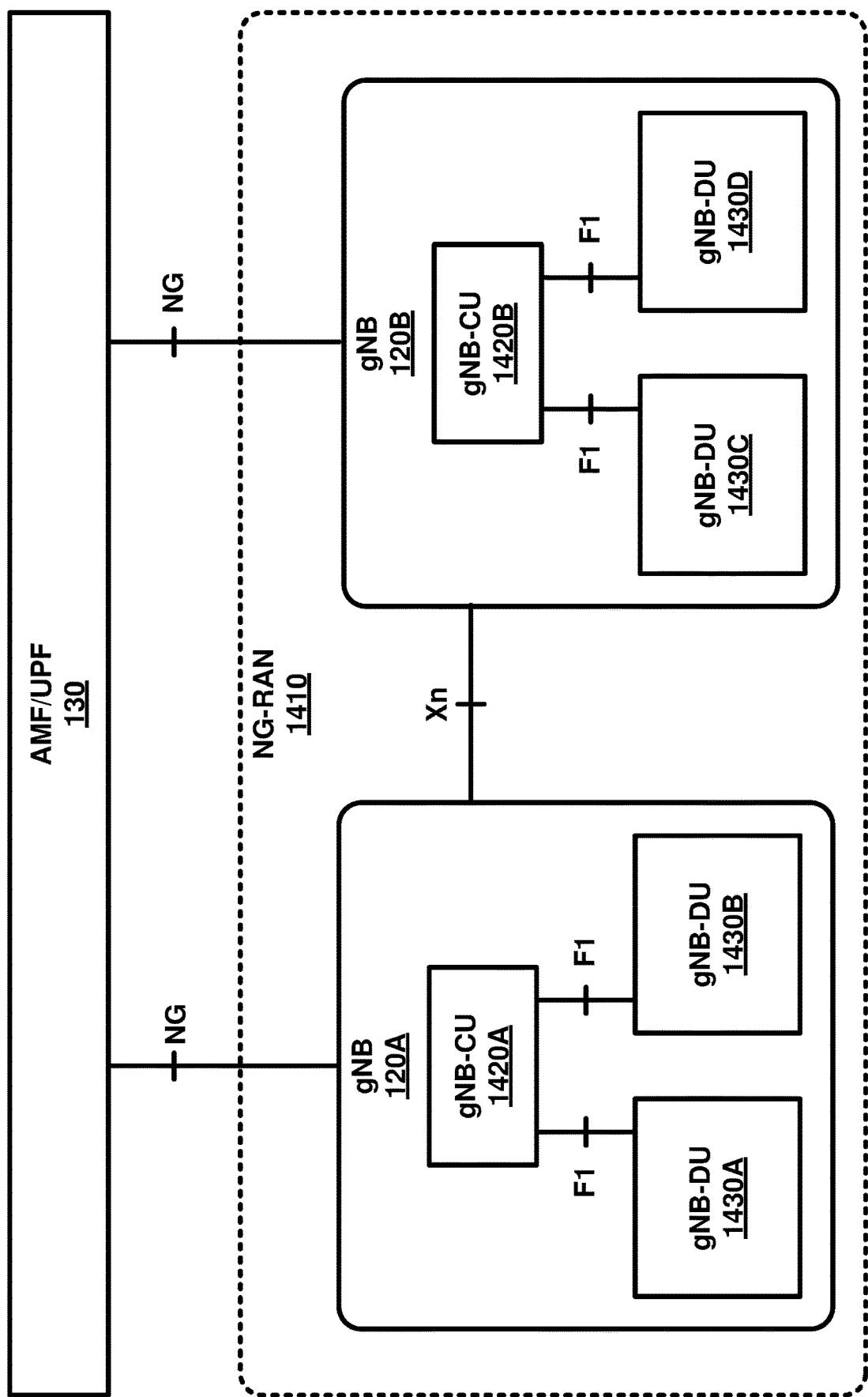
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g.

gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
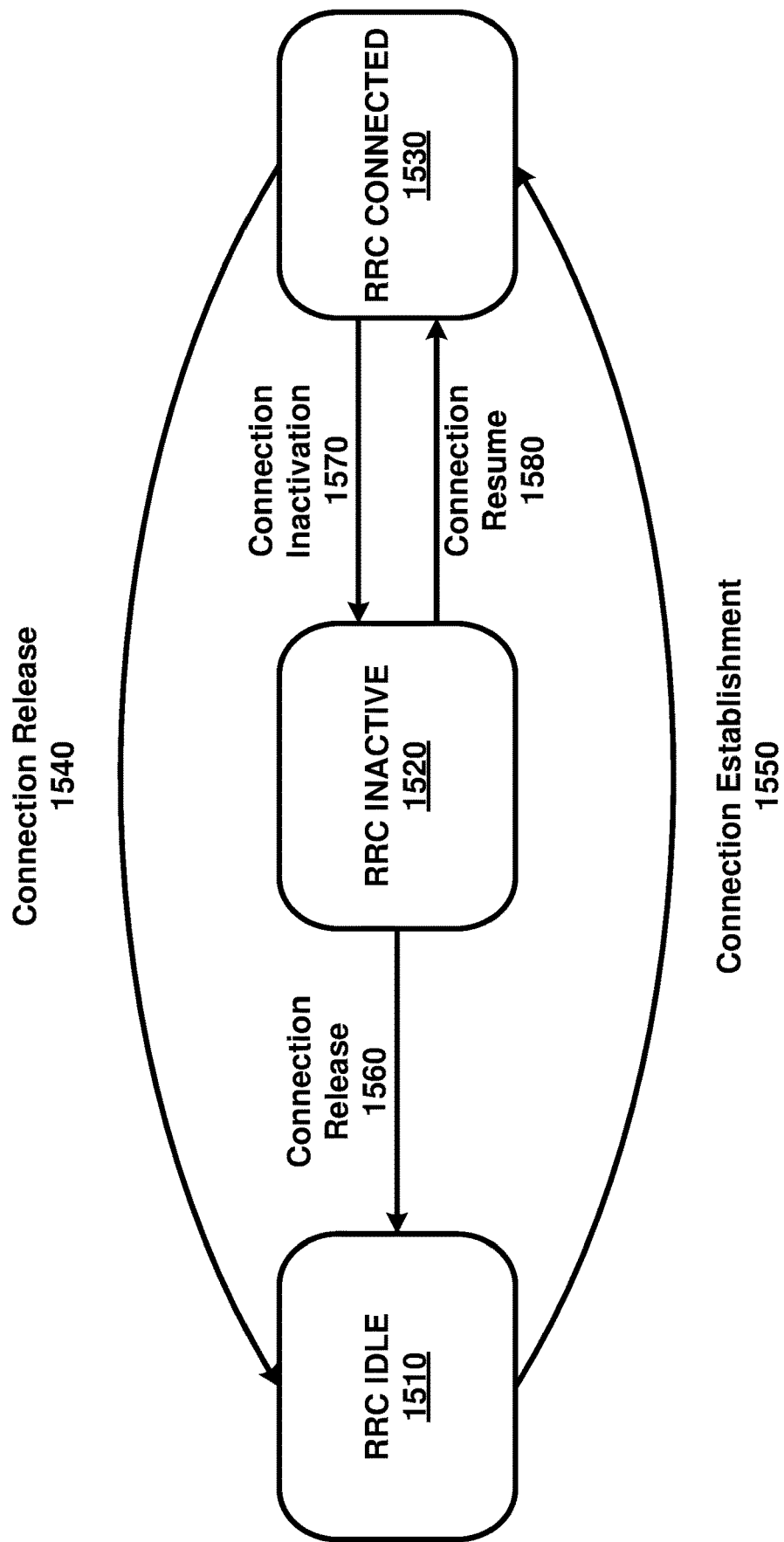
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A wireless device may perform a cell search. For example, the wireless device may acquire time and frequency synchronization with the cell and detect a first physical layer cell ID of the cell during the cell search procedure. The wireless device may perform the cell search, for example, when the wireless device has received one or more synchronization signals (SS), for example, the primary synchronization signal (PSS) and the secondary synchronization signal (SSS). The wireless device may assume that reception occasions of one or more physical broadcast channels (PBCH), PSS, and SSS are in consecutive symbols, and, for example, form a SS/PBCH block (SSB). For example, the wireless device may assume that SSS, PBCH demodulation reference signal (DM-RS), and PBCH data have the same energy per resource element (EPRE). For example, the wireless device may assume that the ratio of PSS EPRE to SSS EPRE in a SS/PBCH block is a particular value (e.g., either 0 dB or 3 dB). For example, the wireless device may assume that the ratio of PDCCH DM-RS EPRE to SSS EPRE is within a particular range (e.g., from −8 dB to 8 dB), for example, when the wireless device has not been provided dedicated higher layer parameters.

A wireless device may determine a first symbol index for one or more candidate SS/PBCH blocks. For example, for a half frame with SS/PBCH blocks, the first symbol index for one or more candidate SS/PBCH blocks may be determined according to a subcarrier spacing of the SS/PBCH blocks. For example, index 0 corresponds to the first symbol of the first slot in a half-frame. As an example, the first symbol of the one or more candidate SS/PBCH blocks may have indexes $\{2, 8\}+14\cdot n$ for 15 kHz subcarrier spacing, where, for example, n=0, 1 for carrier frequencies smaller than or equal to 3 GHz, and for example, n=0, 1, 2, 3 for carrier frequencies larger than 3 GHz and smaller than or equal to 6 GHz. The one or more candidate SS/PBCH blocks in a half frame may be indexed in an ascending order in time, for example, from 0 to L−1. The wireless device may determine some bits (for example, the 2 least significant bits (LSB) for L=4, or the 3 LSB bits for L>4) of a SS/PBCH block index per half frame from, for example, a one-to-one mapping with one or more index of a DM-RS sequence transmitted in the PBCH.

Random access (RA) procedures may be used to establish communications between a wireless device and a base station in a cell. Prior to initiation of a RA procedure, a base station may transmit one or more RRC messages to configure the wireless device with one or more parameters of RACH configuration. The base station may broadcast or multicast the one or more RRC messages to one or more wireless devices. The one or more RRC messages may be wireless device-specific messages, e.g., dedicated RRC messages transmitted to a wireless device in RRC INACTIVE 1520 or RRC CONNECTED 1530. The one or more RRC messages may comprise one or more parameters required for transmitting at least one preamble via one or more random access resources. For example, the one or more parameters may indicate at least one of the following: PRACH resource allocation, preamble format, SSB information (e.g., total number of SSBs, downlink resource allocation of SSB transmission, transmission power of SSB transmission, and/or other information), and/or uplink radio resources for one or more transport block transmissions.

A base station may transmit one or more downlink reference signals. For example, one or more downlink reference signals may comprise one or more discovery reference signals. A wireless device may select a first downlink reference signal among the one or more downlink reference signals. For example, the first downlink reference signal may comprise one or more synchronization signals and a physical broadcast channel (SS/PBCH). For example, the wireless device may adjust a downlink synchronization based on the one or more synchronization signals. For example, the one or more downlink reference signals may comprise one or more channel state information-reference signals (CSI-RS).

One or more RRC messages may further comprise one or more parameters indicating one or more downlink control channels, for example, PDDCH. Each of the one or more downlink control channels may be associated with at least one of the one or more downlink reference signals. For example, the first downlink reference signal may comprise one or more system information (e.g., master information block (MIB) and/or system information block (SIB)). A base station may transmit the one or more system information, for example, on a physical broadcast channel (PBCH), a physical downlink control channel (PDCCH), and/or a physical downlink shared channel (PDSCH).

One or more system information may comprise at least one information element (e.g., PDCCH-Config, PDCCH-ConfigSIB1, PDCCH-ConfigCommon). The at least one information element may be used, for example, to configure a wireless device with, among other things, one or more control parameters. The one or more control parameters may comprise one or more parameters of one or more control resource sets (CORESET). For example, the one or more control parameters may comprise the parameters of a first common CORESET #0 (controlResourceSetZero), and/or a first common CORESET (commonControlResourceSet). The one or more control parameters may further comprise one or more search space sets. For example, the one or more control parameters may comprise the parameters of a first search space for the system information block (searchSpaceSIB1), and/or a first common search space #0 (searchSpaceZero), and/or a first random access search space (ra-SearchSpace), and/or a first paging search space (pagingSearchSpace). For example, the wireless device may use the one or more control parameters to acquire the one or more downlink control channels.

For example, a wireless device may monitor a set of candidates for the one or more downlink control channels in the one or more control resource sets. The one or more control resource sets may be on a first active downlink frequency band, e.g., an active bandwidth part (BWP), on a first activated serving cell. For example, the first activated serving cell may be configured with the one or more control parameters according to the one or more search space sets. For example, the wireless device may decode each of the one or more downlink control channels in the set of candidates for the one or more downlink control channels according to a first format of a first downlink control information (DCI). For example, the set of candidates for the one or more downlink control channels may be defined in terms of the one or more search space sets. For example, the one or more search space sets may be one or more common search space sets (e.g., Type0-PDCCH, Type0A-PDCCH, Type1-PDCCH, Type2-PDCCH, Type3-PDCCH), and/or one or more wireless device-specific search space sets.

For example, a wireless device may monitor a set of candidates for the one or more downlink control channels in a Type0-PDCCH common search space set. For example, a Type0-PDCCH common search space set may be configured by at least one information element, e.g., PDCCH-ConfigSIB1 in a MIB. For example, the Type0-PDCCH common search space set may be configured by one or more search space sets, e.g., a searchSpaceSIB1 in PDCCH-ConfigCommon, or searchSpaceZero in PDCCH-ConfigCommon. For example, the Type0-PDCCH common search space set may be configured for a first format of a first downlink control information scrambled by a first radio network temporary identifier, e.g., a system information-radio network temporary identifier (SI-RNTI).

For example, a wireless device may monitor a set of candidates for one or more downlink control channels in a Type1-PDCCH common search space set. For example, the Type1-PDCCH common search space set may be configured by one or more search space sets, e.g., a ra-searchSpace in a PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), or a temporary cell-radio network temporary identifier (TC-RNTI).

A wireless device may determine, for example during a cell search, that a first control resource set for a first common search space (e.g., Type0-PDCCH) is present. The first control resource set may comprise one or more resource blocks and one or more symbols. One or more RRC messages may comprise one or more parameters indicating one or more monitoring occasions of the one or more downlink control channels. For example, the wireless device may determine a number of consecutive resource blocks and a number of consecutive symbols for the first control resource set of the first common search space. For example, one or more bits (e.g., a four most significant bits) of the at least one information element (e.g., PDCCH-ConfigSIB1) may indicate the number of consecutive resource blocks and the number of consecutive symbols. For example, the wireless device may determine the one or more monitoring occasions of the one or more downlink control channels from one or more bits (e.g., a four least significant bits) of the at least one information element (e.g., PDCCH-ConfigSIB1). For example, the one or more monitoring occasions of the one or more downlink control channels associated with the first downlink reference signal may be determined based on one or more system frame numbers and one or more slot indexes of the first control resource set. For example, the first downlink reference signal with a first index may overlap in time with the first frame number and the first slot index.

A wireless device may determine a first downlink channel among the one or more downlink control channels, based on a first downlink reference signal. For example, the first downlink channel may be a first downlink control channel, or a first system information block (e.g., SIB1). The wireless device may assume that a demodulation reference signal antenna port associated with a reception of the first downlink channel is quasi co-located (QCL) with the first downlink reference signal. For example, the demodulation reference signal antenna port associated with the reception of the first downlink channel and the first downlink reference signal (e.g., the corresponding SS/PBCH block) may be quasi co-located with respect to at least one of the following: an average gain, QCL-TypeA, and/or QCL-TypeD.

A physical layer of the wireless device may receive from higher layers, among other information, one or more SS/PBCH block indexes. For example, the physical layer may receive one or more configuration parameters of one or more physical random access channel (PRACH) transmission parameters (e.g., the one or more PRACH transmission parameters may indicate PRACH preamble format, preamble index, a corresponding RA-RNTI, time resources, and/or frequency resources for PRACH transmission), and/or parameters for determining one or more sequences and their shifts in the PRACH preamble sequence set (e.g., set type). The physical layer may provide to higher layers one or more corresponding sets of reference signal received power (RSRP) measurements.

A random access procedure may comprise one or more transmissions of a random access preamble (e.g., Msg1) in one or more PRACH occasions. The random access procedure may further comprise one or more transmissions of one or more random access response (RAR) messages, for example, with one or more physical downlink channels (e.g., Msg2). The random access procedure may further comprise one or more Msg3 in one or more physical uplink channels (e.g., PUSCH), and one or more physical downlink channels (PDSCH) for contention resolution. The random access procedure may be triggered upon request of one or more PRACH transmissions, for example, by higher layers or by one or more control orders (e.g., PDCCH order).

A MAC entity of the wireless device may select one or more random access resources for a random access procedure initiated. The MAC entity may select a first downlink reference signal. For example, the MAC entity may select the first downlink reference signal (e.g., a first SS/PBCH block (SSB), or a first channel state information-reference signal (CSI-RS)) with the first reference signal received power (RSRP) above a first reference signal received power threshold. For example, the first reference signal received power threshold may be defined per a type of reference signal (e.g., rsrp-ThresholdSSB may for a SSB, and rsrp-ThresholdCSI-RS for a CSI-RS). The first reference signal received power threshold may be broadcast, semi-statically configured, and/or predefined. For example, the MAC entity may select the first downlink reference signal for contention-free random access procedure, for example for beam failure recovery, or system information request. For example, the MAC entity may select the first downlink reference signal for contention-based random access procedure.

A wireless device may select one or more random access resources. The one or more random access resources may, for example, comprise one or more random access preambles, one or more time resources, and/or one or more frequency resources for PRACH transmission. The one or more random access resources may be predefined. The one or more random access resources may be provided by one or more RRC messages. The one or more random access resources may be provided by one or more downlink control orders (e.g., PDCCH order). The one or more random access resources may be determined based on the first downlink reference signal. For example, the wireless device may set a first preamble index to a parameter (e.g., ra-PreambleIndex) corresponding to the first downlink reference signal.

A wireless device may transmit at least one random access preamble in one or more random access resources. For example, the wireless device may transmit a first preamble with a first preamble index. The first preamble may be transmitted using a first PRACH format with a first transmission power on one or more PRACH resources. The one or more PRACH resources may comprise one or more PRACH occasions.

One or more RRC messages may comprise one or more random access parameters. For example, a cell specific random access configuration message (e.g., RACH-Config-Common and/or RACH-ConfigGeneric) may comprise, among other parameters, at least one of following: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., power-RampingStep), a target power level at the network receiver side (preambleReceivedTargetPower), a maximum number of random access preamble transmission that may be performed (e.g., preambleTransMax), a window length for a random access response (i.e., RAR, e.g., Msg2) (e.g., ra-ResponseWindow), a number of SSBs per random access channel (RACH) occasion and a number of contention-based preambles per SSB (e.g., ssb-perRACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise, among other parameters, one or more RACH occasions for contention-free random access (e.g., occasions), and one or more PRACH mask index for random access resource selection (e.g., ra-ssb-OccasionMaskIndex).

One or more random access parameters (e.g., ssb-perRACH-OccasionAndCB-PreamblesPerSSB) may provide a wireless device with a first number (e.g., N) of one or more downlink reference signals (e.g., SS/PBCH blocks) that may be associated with a first PRACH occasion. The one or more random access parameters (e.g., ssb-perRACH-OccasionAndCB-PreamblesPerSSB) may provide the wireless device with a second number (e.g., R) of the one or more random access preambles for a first downlink reference signal and for a first PRACH occasion. The one or more random access preambles may be contention based preambles. The first downlink reference signal may be a first SS/PBCH block. For example, according to the first number (e.g., if N<1), the first SS/PBCH block may be mapped to at least one (e.g., 1/N) consecutive valid PRACH occasions. For example, according to the second number (e.g., R), at least one preamble with consecutive indexes associated with the first SS/PBCH block may start from the first preamble index for the first valid PRACH occasion.

For example, one or more PRACH configuration indexes (e.g., prach-ConfigurationIndex), may indicate, among other things, a preamble format, a periodicity for one or more PRACH time resources, one or more PRACH subframe numbers, a number of PRACH slots within the one or more PRACH subframes, a PRACH starting symbol number, and a number of time domain PRACH occasions within first PRACH slot.

One or more random access parameters may further comprise an association period for mapping one or more SS/PBCH blocks to one or more PRACH occasions. For example, one or more SS/PBCH block indexes may be mapped to the one or more PRACH occasions based on an order. For example, the order may be as follows: In increasing order of indexes of at least one preamble in a first PRACH occasion. In increasing order of indexes of one or more frequency resources (e.g., for frequency multiplexed PRACH occasions). In increasing order of indexes of one or more time resources (e.g., for time multiplexed PRACH occasions) in the first PRACH slot. In increasing order of indexes for one or more PRACH slots.

A base station may trigger a PRACH transmission by transmitting one or more control orders (e.g., PDCCH order). One or more PRACH mask indexes (e.g., ra-ssb-OccasionMaskIndex) may indicate one or more PRACH occasions. The one or more PRACH occasions may be associated with a first SS/PBCH block index indicated by the one or more control orders. The one or more PRACH occasions may be mapped (e.g., consecutively) for the first SS/PBCH block index. The wireless device may select a first PRACH occasion indicated by a first PRACH mask index value for the first SS/PBCH block index in the first association period. The first association period may be a first mapping cycle. The wireless device may reset the one or more indexes of the one or more PRACH occasions for the first mapping cycle.

A wireless device may determine a first PRACH occasion for transmitting a first preamble. The wireless device may determine a random access-radio network temporary identifier (e.g., RA-RNTI) associated with the first PRACH occasion. The a random access-radio network temporary identifier may be, among other things, a function of at least one of PRACH symbol, and a slot index of a PRACH occasion in a system frame, and a frequency index of the PRACH occasion in frequency domain, and an uplink carrier index. For example, the random access-radio network temporary identifier may be computed as: RA-RNTI=1+ s_id+14×t_id+14×80×f_id+14×80×8×ul_carrier_id. For example, s_id may be a PRACH starting symbol, t_id may be an index of a first slot of a first PRACH occasion in a system frame, f_id may be an index of the first PRACH occasion in frequency domain, and ul_carrier_id may be an uplink carrier index.

A wireless device may determine a parameter indicating a first preamble target power (e.g., PREAMBLE_RECEIVED_TARGET_POWER). The wireless device may transmit a first preamble using a first PRACH occasion, with a first preamble transmission power (e.g., $P_{PRACH,b,f,c}(i)$). The first preamble transmission power may be determined based on the first preamble target power.

In response to a PRACH transmission, a wireless device may receive one or more random access responses (RARs) (e.g., Msg2). The one or more random access responses may be scrambled by a particular radio network temporary identifier (e.g., RA-RNTI). The wireless device may monitor a search space set (e.g., the Type1-PDCCH common search space) for a first downlink control information (e.g., DCI format 1_0). The first downlink control information may comprise the one or more RARs. For example, a base station may transmit the one or more RARs in a form of DCI format 1_0 for a random access procedure initiated by PDCCH order, MAC layer, and/or RRC layer. For example, the DCI format 1_0 may comprise at least one of the following fields: one or more random access preamble index, SS/PBCH index, PRACH mask index, UL/SUL indicator, frequency and time domain resource assignments, modulation and/or coding schemes.

A wireless device may monitor for a first downlink control information (e.g., DCI format 1_0) during a time window. The time window may be indicated by the one or more RRC messages. The time window may start at a first symbol of a first control resource set. The wireless device may be configured by the one or more parameters in the one or more RRC messages to receive the first downlink control information on the first control resource set. The wireless device may determine a length of the time window based on the one or more parameters in the one or more RRC messages (e.g., ra-ResponseWindow). The length of the time window may be in number of slots.

A wireless device may stop a time window after or in response to a reception of one or more random access responses being determined as successful. A reception of the one or more random access responses may be determined as successful, for example, when the one or more random access responses comprise a preamble index (e.g., a random access preamble identity: RAPID) corresponding to a preamble that the wireless device transmits to a base station. For example, the RAPID may be associated with the PRACH transmission. The one or more random access responses may comprise an uplink grant indicating one or more uplink resources granted for the wireless device. The wireless device may transmit one or more transport blocks (e.g., Message 3) via the one or more uplink resources.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning of very high data rates to meet customer expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/WLAN interworking. This interest indicates that unlicensed spectrum, when present, may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

In an example embodiment, Listen-before-talk (LBT) may be implemented for transmission in an unlicensed cell. The unlicensed cell may be referred to as a LAA cell and/or a NR-U cell. The unlicensed cell may be operated as non-standalone with an anchor cell in a licensed band or standalone without an anchor cell in a licensed band. LBT may comprise a clear channel assessment (CCA). For example, in an LBT procedure, equipment may apply a CCA before using the unlicensed cell or channel. The CCA may comprise an energy detection that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed bands, such as the 5 GHz unlicensed band. Apart from regulatory requirements, carrier sensing via LBT may be one way for fairly sharing the unlicensed spectrum among different devices and/or networks attempting to utilize the unlicensed spectrum.

In an example embodiment, discontinuous transmission on an unlicensed band with limited maximum transmission duration may be enabled. Some of these functions may be supported by one or more signals to be transmitted from the beginning of a discontinuous downlink transmission in the unlicensed band. Channel reservation may be enabled by the transmission of signals, by an NR-U node, after or in response to gaining channel access based on a successful LBT operation. Other nodes may receive the signals (e.g., transmitted for the channel reservation) with an energy level above a certain threshold that may sense the channel to be occupied. Functions that may need to be supported by one or more signals for operation in unlicensed band with discontinuous downlink transmission may comprise one or more of the following: detection of the downlink transmission in unlicensed band (including cell identification) by wireless devices; time & frequency synchronization of wireless devices.

In an example embodiment, downlink transmission and frame structure design for operation in an unlicensed band may employ subframe, (mini-)slot, and/or symbol boundary alignment according to timing relationships across serving cells aggregated by carrier aggregation. This may not imply that base station transmissions start at the subframe, (mini-)slot, and/or symbol boundary. Unlicensed cell operation (e.g., LAA and/or NR-U) may support transmitting PDSCH, for example, when not all OFDM symbols are available for transmission in a subframe according to LBT. Delivery of necessary control information for the PDSCH may also be supported.

An LBT procedure may be employed for fair and friendly coexistence of a 3GPP system (e.g., LTE and/or NR) with other operators and technologies operating in unlicensed spectrum. For example, a node attempting to transmit on a carrier in unlicensed spectrum may perform a CCA as a part of an LBT procedure to determine if the channel is free for use. The LBT procedure may involve energy detection to determine if the channel is being used. For example, regulatory requirements in some regions, e.g., in Europe, specify an energy detection threshold such that if a node receives energy greater than the threshold, the node assumes that the channel is being used and not free. While nodes may follow such regulatory requirements, a node may optionally use a lower threshold for energy detection than that specified by regulatory requirements. A radio access technology (e.g., LTE and/or NR) may employ a mechanism to adaptively change the energy detection threshold. For example, NR-U may employ a mechanism to adaptively lower the energy detection threshold from an upper bound. An adaptation mechanism may not preclude static or semi-static setting of the threshold. In an example Category 4 LBT (CAT4 LBT) mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 1 (CAT1, e.g., no LBT) may be implemented in one or more cases. For example, a channel in unlicensed band may be hold by a first device (e.g., a base station for DL transmission), and a second device (e.g., a wireless device) takes over the for a transmission without performing the CAT1 LBT. In an example, Category 2 (CAT2, e.g. LBT without random back-off and/or one-shot LBT) may be implemented. The duration of time determining that the channel is idle may be deterministic (e.g., by a regulation). A base station may transmit an uplink grant indicating a type of LBT (e.g., CAT2 LBT) to a wireless device. CAT1 LBT and CAT2 LBT may be employed for COT sharing. For example, a base station (a wireless device) may transmit an uplink grant (resp. uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. In an example, Category 3 (CAT3, e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (CAT4, e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

In an example, a wireless device may employ uplink (UL) LBT. The UL LBT may be different from a downlink (DL) LBT (e.g. by using different LBT mechanisms or parameters) for example, since the NR-U UL may be based on scheduled access which affects a wireless device's channel contention opportunities. Other considerations motivating a different UL LBT comprise, but are not limited to, multiplexing of multiple wireless devices in a subframe (slot, and/or mini-slot).

In an example, DL transmission burst(s) may be a continuous (unicast, multicast, broadcast, and/or combination thereof) transmission by a base station (e.g., to one or more wireless devices) on a carrier component (CC). UL transmission burst(s) may be a continuous transmission from one or more wireless devices to a base station on a CC. In an example, DL transmission burst(s) and UL transmission burst(s) on a CC in an unlicensed spectrum may be scheduled in a TDM manner over the same unlicensed carrier. Switching between DL transmission burst(s) and UL transmission burst(s) may require an LBT (e.g., CAT1 LBT, CAT2 LBT, CAT3 LBT, and/or CAT4 LBT). For example, an instant in time may be part of a DL transmission burst or an UL transmission burst.

Channel occupancy time (COT) sharing may be employed in NR-U. COT sharing may be a mechanism by which one or more wireless devices share a channel that is sensed as idle by at least one of the one or more wireless devices. For example, one or more first devices may occupy a channel via an LBT (e.g., the channel is sensed as idle based on CAT4 LBT) and one or more second devices may share the channel using an LBT (e.g., 25 us LBT) within a maximum COT (MCOT) limit. For example, the MCOT limit may be given per priority class, logical channel priority, and/or wireless device specific. COT sharing may allow a concession for UL in unlicensed band. For example, a base station may transmit an uplink grant to a wireless device for an UL transmission. For example, a base station may occupy a channel and transmit, to one or more wireless devices a control signal indicating that the one or more wireless devices may use the channel. For example, the control signal may comprise an uplink grant and/or a particular LBT type (e.g., CAT1 LBT and/or CAT2 LBT). The one or more wireless device may determine COT sharing based at least on the uplink grant and/or the particular LBT type. The wireless device may perform UL transmission(s) with dynamic grant and/or configured grant (e.g., Type 1, Type2, autonomous UL) with a particular LBT (e.g., CAT2 LBT such as 25 us LBT) in the configured period, for example, if a COT sharing is triggered. A COT sharing may be triggered by a wireless device. For example, a wireless device performing UL transmission(s) based on a configured grant (e.g., Type 1, Type2, autonomous UL) may transmit an uplink control information indicating the COT sharing (UL-DL switching within a (M)COT). A starting time of DL transmission(s) in the COT sharing triggered by a wireless device may be indicated in one or more ways. For example, one or more parameters in the uplink control information indicate the starting time. For example, resource configuration(s) of configured grant(s) configured/activated by a base station may indicate the starting time. For example, a base station may be allowed to perform DL transmission(s) after or in response to UL transmission(s) on the configured grant (e.g., Type 1, Type 2, and/or autonomous UL). There may be a delay (e.g., at least 4 ms) between the uplink grant and the UL transmission. The delay may be predefined, semi-statically configured (via an RRC message) by a base station, and/or dynamically indicated (e.g., via an uplink grant) by a base station. The delay may not be accounted in the COT duration.

In an example, single and multiple DL to UL and UL to DL switching within a shared COT may be supported.

Example LBT requirements to support single or multiple switching points, may comprise: for a gap of less than 16 us: no-LBT may be used; for a gap of above 16 us but does not exceed 25 us: one-shot LBT may be used; for single switching point, for a gap from DL transmission to UL transmission exceeds 25 us: one-shot LBT may be used; for multiple switching points, for a gap from DL transmission to UL transmission exceeds 25 us, one-shot LBT may be used.

In an example, a signal that facilitates its detection with low complexity may be useful for wireless device power saving, improved coexistence, spatial reuse at least within the same operator network, serving cell transmission burst acquisition, etc. In an example, a radio access technology (e.g., LTE and/or NR) may employ a signal comprising at least SS/PBCH block burst set transmission. Other channels and signals may be transmitted together as part of the signal. In an example, the signal may be a discovery reference signal (DRS). There may be no gap within a time span that the signal is transmitted at least within a beam. In an example, a gap may be defined for beam switching. In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for a first unlicensed band, e.g., in a 5 GHz unlicensed band. An initial active DL/UL BWP in one or more unlicensed bands may be similar (e.g., approximately 20 MHz in a 5 GHz and/or 6 GHz unlicensed spectrum), for example, if similar channelization is used in the one or more unlicensed bands (e.g., by a regulation).

In an example, HARQ acknowledge and negative acknowledge (A/N) for the corresponding data may be transmitted in a shared COT (e.g., with a CAT2 LBT). In some examples, the HARQ A/N may be transmitted in a separate COT (e.g., the separate COT may require a CAT4 LBT). In an example, when UL HARQ feedback is transmitted on unlicensed band, a radio access technology (e.g., LTE and/or NR) may support flexible triggering and multiplexing of HARQ feedback for one or more DL HARQ processes. HARQ process information may be defined independent of timing (e.g., time and/or frequency resource) of transmission. In an example, UCI on PUSCH may carry HARQ process ID, NDI, RVID. In an example, Downlink Feedback Information (DFI) may be used for transmission of HARQ feedback for configured grant.

In an example, CBRA and CFRA may be supported on SpCell. CFRA may be supported on SCells. In an example, an RAR may be transmitted via SpCell, e.g., non-standalone scenario. In an example, an RAR may be transmitted via SpCell and/or SCell, e.g., standalone scenario. In an example, a predefined HARQ process ID for an RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in one or more unlicensed bands may be supported. In an example, an NR cell with DL in unlicensed band and UL in licensed band or vice versa may be supported. In an example, dual connectivity between licensed band NR (PCell) and NR-U (PSCell) may be supported.

In an example, a radio access technology (e.g., LTE and/or NR) operating bandwidth may be an integer multiple of 20 MHz, for example, if absence of Wi-Fi cannot be guaranteed (e.g. by regulation) in an unlicensed band (e.g., 5 GHz, 6 GHZ, and/or sub-7 GHz) where the radio access technology (e.g., LTE and/or NR) is operating. In an example, a wireless device may performance or more LBTs in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used.

In an operation in an unlicensed band (e.g., LTE eLAA/ feLAA and/or NR-U), a wireless device may measure (averaged) received signal strength indicator (RSSI) and/or may determine a channel occupancy (CO) of one or more channels. For example, the wireless device may report channel occupancy and/or RSSI measurements to the base station. It may be beneficial to report a metric to represent channel occupancy and/or medium contention. The channel occupancy may be defined as a portion (e.g., percentage) of time that RSSI was measured above a configured threshold. The RSSI and the CO measurement reports may assist the base station to detect the hidden node and/or to achieve a load balanced channel access to reduce the channel access collisions.

Channel congestion may cause an LBT failure. The probability of successful LBT may be increased for random access and/or for data transmission if, for example, the wireless device selects the cell/BWP/channel with the lowest channel congestion or load. For example, channel occupancy aware RACH procedure may be considered to reduce LBT failure. For example, the random access backoff time for the wireless device may be adjusted based on channel conditions (e.g., based on channel occupancy and/or RSSI measurements). For example, a base station may (semi-statically and/or dynamically) transmit a random access backoff. For example, the random access backoff may be predefined. For example, the random access backoff may be incremented after or in response to one or more random access response reception failures corresponding to one or more random access preamble attempts.

A base station may transmit a SS/PBCH burst set in one contiguous burst. For example, DRS transmission may comprise SS/PBCH burst set in one contiguous burst. The base station may transmit one or more CSI-RSs and/or the remaining minimum system information (RMSI)-CORESET(s) and/or the PDSCH(s) carrying RMSI associated with the SS/PBCH block(s) in the contiguous burst (e.g., DRS transmission). A base station may transmit one or more messages/signals comprising the SS/PBCH burst, the CSI-RS(s), the RMSI-CORESET(s), and/or the PDSCH(s) carrying RMSI in one burst in time domain that results in limiting the required number of channel access and short channel occupancy in an unlicensed band. A radio access technology (e.g., LTE and/or NR) may support a stand-alone operation and/or dual-connectivity deployments.

A base station (e.g., operating in an unlicensed band) may transmit DRS comprising signals and/or channels that are required for cell acquisition. For example, the DRS may comprise the transmission of at least one of reference signals, paging and/or OSI signals. In some scenarios and/or radio access technology, a base station may not transmit at least one of following signal(s)/channel(s) in the DRS: RMSI-CORESET, PDSCH, and/or CSI-RS The base station may transmit a DRS within a duration of a DRS transmission window. The DRS transmission window may have a fixed length (e.g. 5 ms) and/or a fixed periodicity (e.g. 20 ms). The length and/or the periodicity of the DRS transmission window may be semi-statically configured by a base station. For example, a duration of the DRS (e.g., comprising SS/PBCH blocks and other multiplex signals/channels) transmitted within the DRS transmission window, may be limited to a particular time duration (e.g., 1 ms). For example, the duration of the DRS within the window may be limited depending on the periodicity of DRS. The base station may transmit one or more messages indicating a number of candidate SSB positions within the DRS transmission window, e.g. up to 64. The base station may transmit a number of SSBs within the DRS transmission window, e.g. up to 8. The transmitted SSBs within the DRS window may not overlap in time domain.

Transmission(s) of NR-U SS/PBCH block(s) may not be guaranteed in unlicensed band due to LBT failure. In an example, one or more SS/PBCH blocks may be dropped at certain time instances due to LBT failure. Predefined transmission position of SS/PBCH block(s) may be inefficient in an unlicensed band. There may be a need to opportunistically schedule one or more SS/PBCH block(s), e.g., depending on a success and/or failure of LBT performed on a channel in an unlicensed band. For example, the entire SS/PBCH burst set may be shifted in time to the next transmission instance. For example, the start of the SS/PBCH burst may be truncated and one or more dropped SSBs (e.g., due to the truncation) may be cyclically wrapped at the end of the burst set transmission. For example, the network may schedule one or more SSBs and transmit a message indicating the timing information of the scheduled one or more SSBs. For example, SS/PBCH block transmission occasion time index and the associated SS/PBCH block index may be included in the SS/PBCH block to allow the wireless device to derive the timing information. For example, the base station may consider slot-level or SSB candidate position-level time shifts of the entire SS/PBCH burst.

The base station may determine a COT duration for SS/PBCH burst transmission. The COT duration may be determined at least based on a subcarrier spacing of the SS/PBCH burst transmission and/or a number of SS/PBCH blocks in the burst transmission. In an example, the base station may use CAT2 LBT for the SS/PBCH burst transmission, for example, that may provide a short COT of 1 ms. A type of LBT may be determined based on priorities. In an example, a base station may use higher priority CAT4 LBT with shorter random backoff, which may provide a short COT of 2 ms. In an example, the base station may use lower priority CAT4 LBT with longer random backoff, which may provide longer COT, e.g., up to 10 ms.

Semi-static resource allocation of PRACH may be supported as a baseline design in a radio access technology (e.g., LTE and/or NR). A base station may semi-statically configure a wireless device with an association between one or more PRACH occasions/preambles and SS/PBCH block(s). For example, the base station may configure the wireless device with a number of SS/PBCH blocks associated with one PRACH occasion based on one or more higher layer parameters. A value of configured number of SS/PBCH blocks associated with one PRACH occasion may be greater than or less than one. For example, one SS/PBCH block may be mapped to multiple (e.g., consecutive) PRACH occasions, or vice versa. A base station may support a mapping from different SS/PBCH blocks to non-overlapping subsets of RACH preamble indices within one PRACH occasion, for example, if more than one SS/PBCH blocks are mapped to one PRACH occasion.

One or more PRACH periodicities may be supported, e.g., 10, 20, 40, 60, and 160 ms. A wireless device may wait until the next configured PRACH occasion without transmitting RACH preamble if, for example, the wireless device determines an LBT failure.

There may be one or more enhancements implemented in a radio access technology (e.g., LTE and/or NR) for an operation in an unlicensed band. In an example, one or more transmission opportunities for PRACH may be configured in time, frequency, code, and/or a combination thereof. For example, a base station may configure a wireless device, for contention-free and/or contention-based RA, with one or more PRACH resources across one or more LBT sub-bands/carriers. For example, in the time domain, a base station may configure a wireless device with one or more PRACH resources dynamically, e.g., via DCI for connected mode wireless device. For example, PRACH resources configured for a wireless device may comprise one or more first PRACH resources dynamically configured (e.g., via DCI) and/or one or more second PRACH resource semi-statically configured (e.g., via an RRC message). For example, a base station may dynamically configure one or more PRACH resources within a COT where the base station transmits one or more SSBs. For example, the one or more PRACH resources may be dynamically scheduled e.g., via paging for idle mode wireless device and/or via DCI (or any control signal) for a connected mode wireless device. For example, the one or more PRACH resources may follow one or more SSBs (e.g., DRS transmission).

A wireless device may transmit one or more preambles. For example, the one or more preambles may be limited before reception of a random access response (RAR) (e.g., Msg2) in a RAR window. For example, the one or more preambles may be allowed before starting an RAR window. For example, the number of allowed preamble transmissions may be predefined or indicated by a message e.g., RMSI in an RRC message and/or PDCCH order in a DL control signal. In an example, group wise SSB-to-RO mapping may be supported, e.g., by frequency first-time second manner, where grouping is in time domain.

A wireless device may perform LBT for accessing a channel before transmitting PRACH in an unlicensed band. The wireless device may transmit the PRACH, for example, if the channel is free. The wireless device may postpone the PRACH transmission, for example, if the channel is busy. A base station may reserve a time duration for the wireless device before transmitting PRACH to perform LBT, e.g., an LBT gap for RACH occasion (RO). The base station may schedule RACH occasions after or in response to a SS/PBCH burst transmission. Scheduling ROs after or in response to the SS/PBCH burst transmission may help a wireless device to avoid LBT failure for the RACH transmission(s). The wireless device may assume no interference and/or no hidden nodes after or in response to detecting SS/PBCH block. The wireless device may skip an LBT and transmit PRACH in response to a reception of at least one SSB. The wireless device may transmit at least one preamble without LBT (or with performing a particular LBT, e.g., CAT2 LBT), for example, if the gap between DL/UL switching point (e.g., between an SSB reception and selected RACH resource) is small.

The base station may configure a wireless device with an association between SS/PBCH blocks and ROs (e.g., SSB-to-RO mapping). For example, a base station may transmit an RRC message indicating the SSB-to-RO mapping that may be time-independent. For example, the RRC message may indicate a frequency resource and/or preamble of a PRACH transmission. The base station may transmit a second message indicating a time resource of the PRACH transmission. The network may support contention-free and contention-based random access procedures on SCells. A base station may transmit an RAR on an SCell where the base station may receive a preamble. A base station may transmit an RAR on an SCell where a base station does not receive a preamble, e.g., with a cell identifier where the base station receives the preamble.

A base station may share an acquired COT with a wireless device for random access procedure. The base station may allow the wireless device to multiplex PRACH resources in an UL portion of an acquired COT. For example, the base station may transmit, to one or more wireless devices, an indication via a group-common PDCCH (GC-PDCCH) to schedule PRACH resources within the acquired COT, e.g., for connected, inactive, and/or idle mode wireless device(s). In an example, the base station may transmit the PDCCH (e.g., GC-PDCCH) to schedule resources after one or more SSBs (e.g., in an RMSI and/or in a DCI). In an example, the wireless device may perform one-shot (CAT2) LBT or no LBT for random access preamble (Msg1) and Msg3 transmission in the COT acquired by the base station, for example, the wireless device receives the indication.

A wireless device may share a COT with a base station, for example, when the wireless device acquires the COT based on, for example, CAT4 LBT. For example, the wireless device may acquire the COT for Msg1 and/or Msg3 transmission(s). The base station may perform one-shot (CAT2) LBT or no LBT before Msg2 and Msg4 transmission in the COT.

An end of an LBT may not be aligned with symbol boundaries. A base station may configure frequent start/ending points (e.g., partial subframe start/ending points) to avoid a time gap between an end of an LBT and a start of a transmission. The base station may configure one or more PDCCH monitoring occasions before and/or after a first slot boundary of a COT. For example, the base station may configure one or more (e.g., around 8) starting points within a subframe. The base station may discard one or more symbols of one or more mini-slot/slot(s), for example, if LBT fails on the corresponding one or more mini-slot/slot(s). The base station may postpone the one or more symbols of one or more mini-slot/slot transmissions, for example, if the one or more mini-slot/slot(s) are occupied by the LBT procedure, e.g., until the LBT succeeds. The base station may puncture the one or more symbols of the one or more mini-slot(s) beyond slot boundary. The base station may indicate one or more COT structures in at least a first mini-slot. The base station may puncture the one or more symbols when transmission starts at a second symbol index. The base station may scale a transport block size (TBS) according to a starting position. The wireless device may re-encode and re-modulate at least a portion of the transport block. The base station may determine the TBS for a full subframe regardless of the starting point. The base station may not need further TBS scaling.

The base station may configure one or more parameters comprising COT structure. In an example, the base station may associate a set of slot format combinations including a DL/UL configuration of one or more slots with a corresponding slot format indicator (SFI)-index field value, e.g., in DCI format 2_0. The base station may configure a partial slot format for COT with flexible starting/ending position. The base station may configure UL transmission pause for COT. The wireless device may detect a slot and mini-slot at the beginning of a base station-initiated COT. The base station may configure a first mini-slot or slot after or in response to a successful LBT to carry a COT format indicator (CFI). The base station may configure the CFI to comprise at least the following: an entire and/or remaining duration of the COT; expected DL/UL and/or UL/DL switching points; indication on LBT categories to be performed by the wireless device after a DL/UL switching point.

A base station may configure one or more wireless devices to share one or more RACH resources. The one or more wireless devices may block each other, for example, if the one or more wireless devices transmit one or more preambles without UL synchronization in the same RACH resource. For example, a preamble transmission time may vary between wireless devices, for example, if the wireless devices are not UL-synchronized, and/or if the wireless devices select different values of backoff timers. The base station may perform an LBT to reserve RACH resources. The RACH resources may be within the base-station-initiated COT. The channel prior to the RACH resource may be occupied by the base station. The wireless device may assume that the channel is reserved by the base station for RACH transmission and may skip LBT, for example when the channel prior to the RACH resource is occupied by the serving base station, and/or the RACH resource is within the COT of the base station. The base station may indicate the above information to the wireless device, for example using an initial signal. The initial signal may comprise COT sharing indication.

The base station may perform an LBT and transmit a polling indication to one or more wireless devices, for example, in response to a success of the LBT. The one or more wireless devices may transmit one or more preambles with for example, one-shot (CAT2) LBT or with a high priority CAT4 LBT performed in response to receiving the polling indication. One or more PRACH occasions may follow the polling indication in the COT that a base station acquired. The wireless device may be configured to transmit a preamble (e.g., Msg1) with a particular LBT (e.g., one-shot LBT) after or in response to receiving the polling indication from the base station. For example, a reception of the polling indication may be a reference time of one or more preamble transmissions for the one or more wireless devices. A base station may configure one or more wireless devices to transmit at least one preamble (e.g., Msg1) without LBT or with a particular LBT after or in response to receiving the polling indication (e.g., being polled by the base station).

A wireless device may receive from a base station one or more messages comprising one or more parameters. The one or more parameters may configure one or more uplink resources, e.g., one or more UL grants. The wireless device may receive from the base station (e.g., in an LAA cell and/or an NR-U cell) one or more downlink control information (DCI). For example, the wireless device may receive a PDCCH with a first DCI (e.g., DCI format 0A/0B/4A/4B in LTE). The first DCI may comprise a first field indicating whether an UL transmission is triggered in response to the first DCI, (e.g., a 'PUSCH trigger A' field). The wireless device may perform the UL transmission, e.g., a PUSCH transmission and/or at least one preamble transmission, for example, in response to the first field being a first value (e.g., for PUSCH trigger A=0). One or more radio resources of the UL transmission may be indicated by one or more fields in the first DCI and/or indicated by the one or more parameters (e.g., configured grant Type 1). The wireless device may postpone (delay, reschedule, cancel, and/or drop) the UL transmission, e.g., a PUSCH transmission and/or at least one preamble transmission, for example in response to the first field being a second value (e.g., for PUSCH trigger A=1).

The wireless device may receive a second PDCCH comprising a second DCI after or in response to a reception of the first field being the second value (e.g., for PUSCH trigger A=1). The second DCI may comprise a second field, for example a 'PUSCH trigger B' field. The wireless device may perform the UL transmission, for example in response to receiving the second DCI. The second DCI may be scrambled by an RNTI, e.g., a CC-RNTI.

A wireless device may receive a first DCI in a first time instance (e.g., in a first subframe/(mini)-slot/symbol). The first DCI may comprise one or more fields. The wireless device may perform a PUSCH transmission in a number of time resources (e.g., a number of subframe(s)/(mini)-slot(s)/symbol(s)). The number of time resources may be pre-defined. The wireless device may determine the number of time resources by one of the one or more fields in the first DCI. The wireless device may determine the number of time resources by one or more parameters received from an RRC message. The wireless device may perform the PUSCH transmission with a first timing offset. The wireless device may determine a value of the first timing offset based on one or more fields in the first DCI. The value of the first timing offset may be pre-defined or configured by the one or more parameters. The wireless device may receive a second DCI in a second time instance (e.g., in a second subframe), for example, after or in response to a reception of the first DCI. The second DCI may comprise one or more fields. The one or more fields may indicate a second timing offset (e.g., an UL offset). The wireless device may determine the value of the first timing offset based on the second timing offset. The second timing offset may be pre-defined or configured by the one or more parameters.

Figure 16:
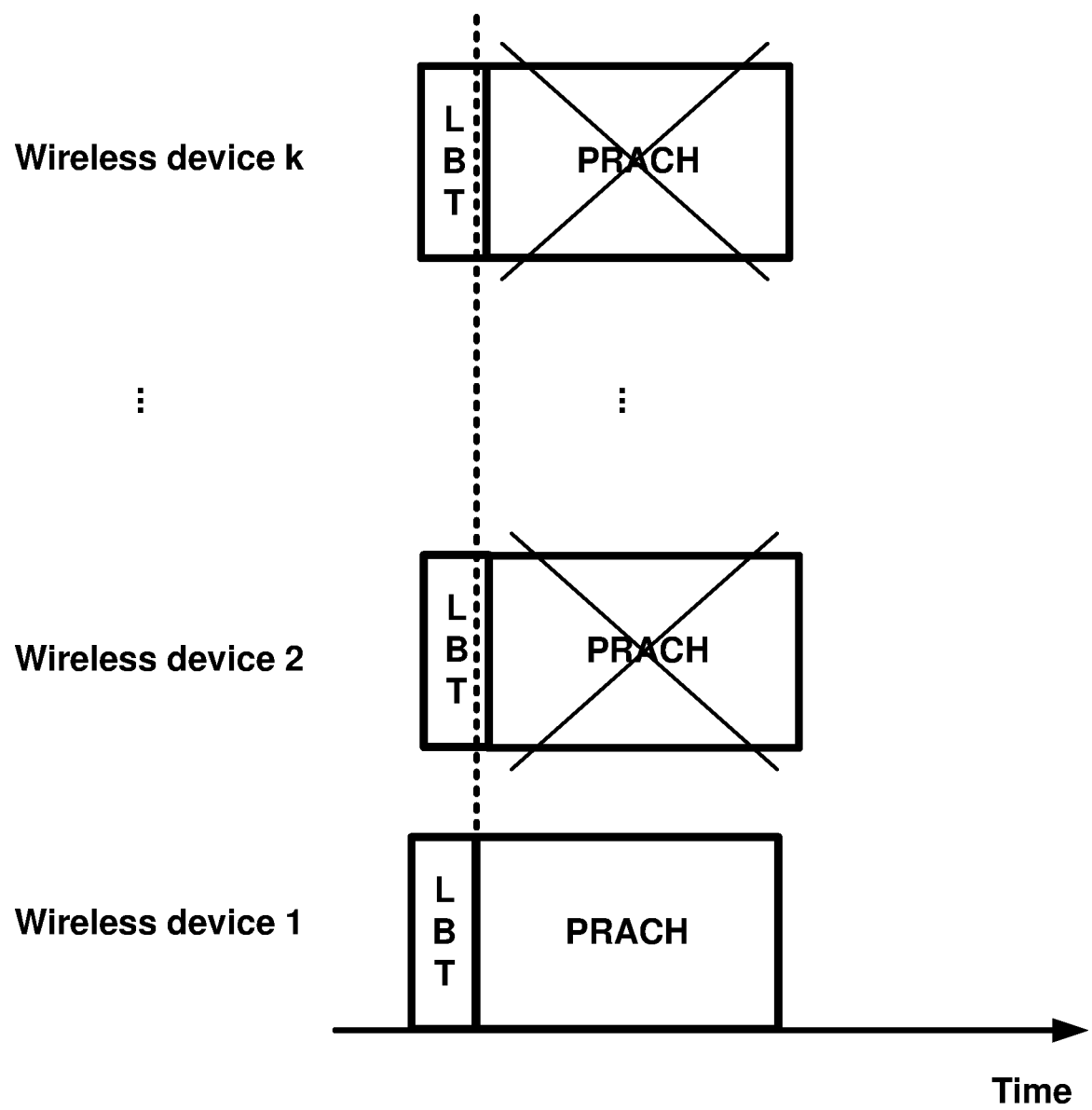
FIG. 16 is a diagram of example PRACH transmissions by one or more wireless devices as per an aspect of an embodiment of the present disclosure.

A wireless device may receive from a base station one or more messages comprising one or more parameters to configure one or more PRACH resources. The wireless device may not acquire the one or more PRACH resources, e.g., because of an LBT failure, e.g., due to Wi-Fi activity in a channel. The wireless device may wait until a first configured PRACH resource to perform a preamble transmission. The base station may configure PRACH resources dynamically. A latency associated with a random access procedure may be increased when the wireless device performs an LBT for preamble transmission. FIG. 16 shows an example where wireless devices 1-*k* may perform one or more LBTs for one or more preamble transmissions. The preamble transmission of wireless device 1 may result in failure of the LBTs performed by the other wireless devices 2-*k*. This situation may be referred to as inter-UE blocking and may occur, for example, because the one or more of wireless devices 1-*k* may not be UL-synchronized, or because of one or more different random backoff times acquired by the one or more independent LBTs.

Figure 17:
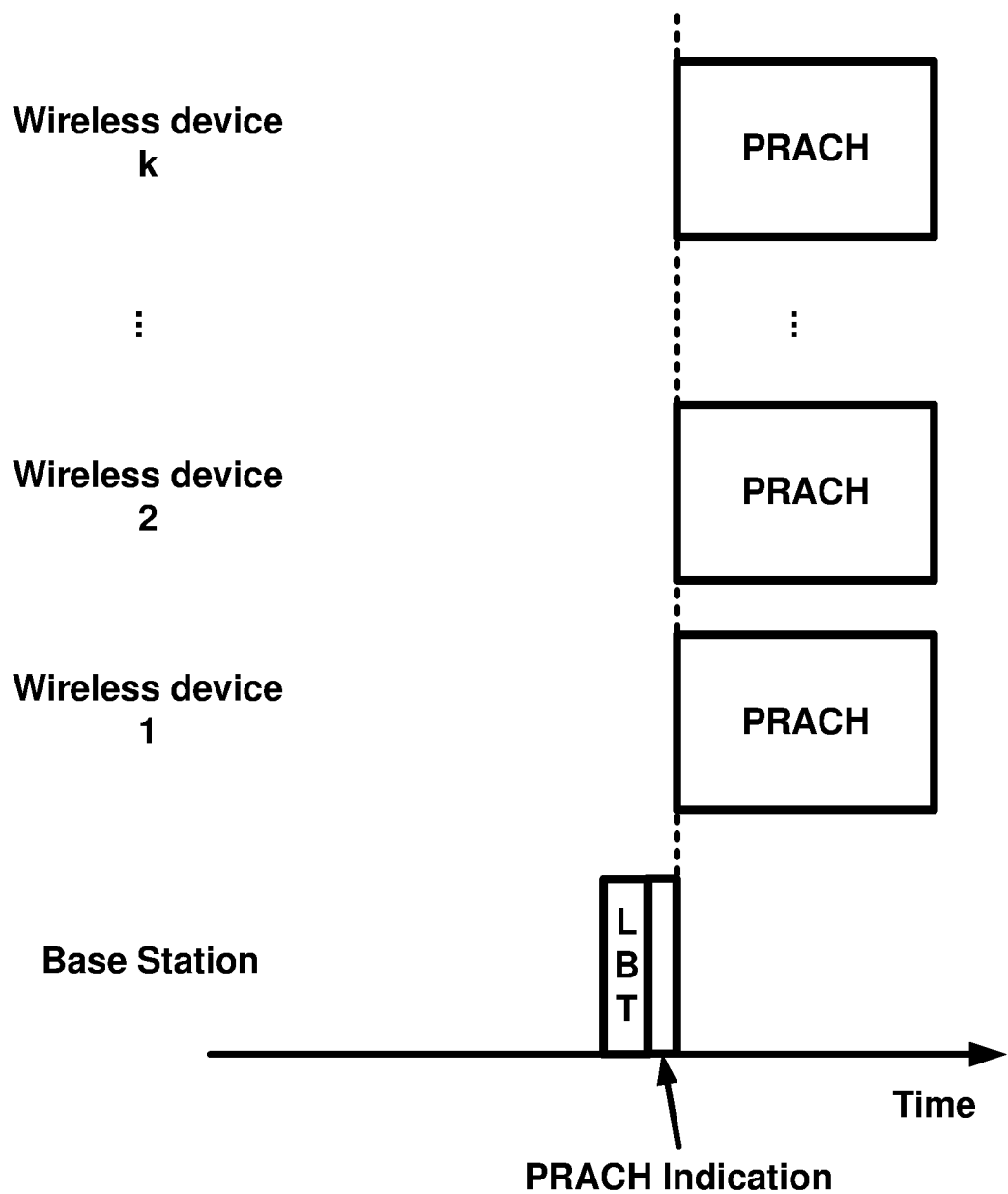
FIG. 17 is a diagram of an example channel reservation for PRACH as per an aspect of an embodiment of the present disclosure.

A base station may perform an LBT on at least one PRACH and transmit at least one PRACH indication to one or more wireless devices, e.g., after or in response to the at least one PRACH being sensed idle based on the LBT. FIG. 17 shows an example where the base station performs the LBT on one or more PRACHs and transmits a PRACH indication. For example, the one or more PRACHs may be in a same sub-band, a same BWP, and/or a same channel that may require the base station and/or one or more wireless devices to perform at least one LBT before occupying the one or more PRACHs. The one or more wireless devices may perform a particular type of LBT, for example, no LBT (CAT1), or a one-shot LBT (CAT2), or a CAT3, or a CAT4 LBT. The one or more wireless devices may transmit one or more preambles after or in response to receiving the PRACH indication form the base station. The base station may transmit (or trigger) the PRACH indication to indicate that the one or more wireless devices may perform one or more preamble transmissions via at least one PRACH. The PRACH indication may comprise one or more parameters indicating one or more of the following: RACH occasions, PRACH time and frequency resources, SSB-to-RO association, COT sharing information and/or COT structure, PRACH resource multiplexing, etc.

A base station may transmit the SS/PBCH burst (SSB) as a part of a DRS transmission. The base station may transmit a message (e.g., SIB1) indicating other configuration parameters (e.g., PRACH resource allocation) for a random access procedure in the DRS transmission. The base station may transmit the DRS within a (e.g., periodic) DRS window, for example when the base station acquires the channel after a successful LBT. The DRS window may have a first length (e.g., 5 ms) predefined and/or semi-statically configured (e.g., by an RRC message).

Figure 18A:
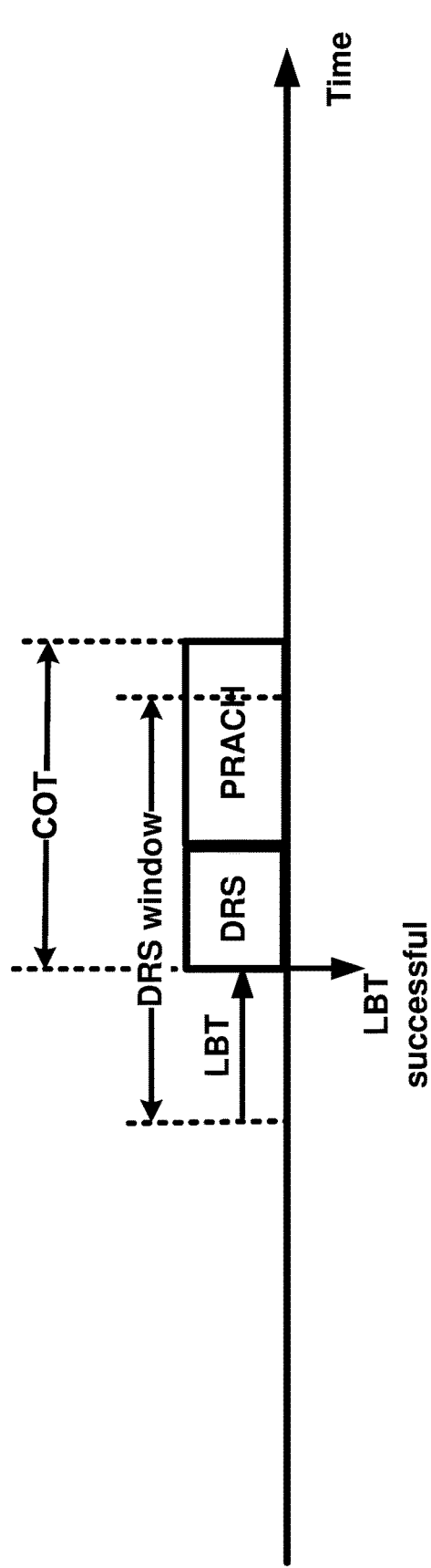
FIG. 18A and FIG. 18B are diagrams of example PRACH resource configurations as per an aspect of an embodiment of the present disclosure.
Figure 18B:
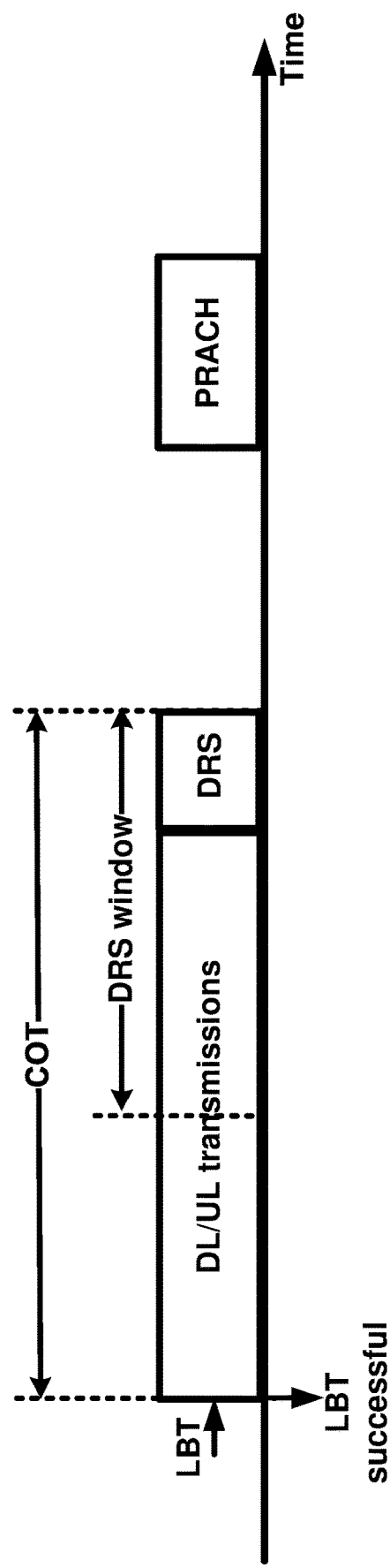

FIG. 18A shows an example where a base station configures one or more PRACH resources within a COT. The COT may comprise a DRS transmission, e.g., a DRS COT. The DRS transmission may occur at the end of a COT (e.g., MCOT), for example, due to other transmissions by the base station or by other wireless devices (e.g., PDCCH, PDSCH, PUSCH, PUCCH). The base station may not configure the one or more PRACH resources within the COT (e.g., the DRS COT, after DRS transmission), for example because the COT duration may expire. FIG. 18B shows an example where the base station configures the one or more PRACH resources outside the COT (e.g., the DRS COT). The base station may configure the one or more PRACH resources semi-statistically or dynamically (e.g., by one or more downlink control information) outside the COT (e.g., the DRS COT). The base station may transmit at least one PRACH indication to indicate the one or more PRACH resources.

In an example, a base station may transmit (broadcast or multicast), to one or more wireless devices, at least one PRACH indication. The one or more wireless devices may receive the at least one PRACH indication with at least a first level of received signal strength (e.g., the first level may determine a detection performance of the at least one PRACH indication). For example, in a particular frequency, at least one of the one or more wireless device may not receive the at least one PRACH indication with the first level of received signal strength, for example, in a high frequency band. There may be a need that the base station may transmit (broadcast or multicast), to one or more wireless devices, the at least one PRACH indication using one or more transmitting beams. For example, a PRACH indication transmitted via a directional beam (e.g., one or more transmitting beams) may enhance the detection performance of a reception of the at least one PRACH indication. There may be a need to define (to (pre)configure) a search space where a wireless device monitors the PRACH indication transmitted by the base station. Defining ((pre)configuring) a search space may reduce a size of the search space that may reduce a battery consumption of the wireless device to monitor the DL control channel (the PRACH indication). For example, the wireless device may not be configured with a DL control channel configuration for receiving the PRACH indication. For example, in an initial access, the wireless device may not have the DL control channel configuration.

A radio access technology may need a mechanism for a wireless device to determine one or more search spaces to monitor for the PRACH indication. For example, the one or more search spaces (e.g., DL (common) control channels) may be predefined and/or semi-statically configured by a message (e.g., SIB, dedicated/broadcast/multicast RRC message) transmitted by a base station. For example, the wireless device may select (or be configured with) at least one RS (e.g., SSB, CSI-RS). For example, the wireless device may select (or be configured with) the at least one RS based on a beam management process (e.g., beam sweeping (SSB burst transmission) during an RA procedure). The wireless device may determine the one or more search spaces based on the at least one RS. Example embodiments describe one or more ways to determine the one or more search spaces based on the at least one RS. For example, an antenna port of a reference signal (e.g., DMRS) associated with a reception of at least one of the one or more search spaces may be quasi co-located with the at least one RS.

In a radio access technology, an idle mode UE may not be configured with dedicated signaling. For example, the wireless device may not be configured with a (dedicated/UE-specific) search space set for receiving a PRACH indication/trigger. The UE may not be able to detect a control signal (e.g. DCI), triggering/scheduling PRACH, that is associated with a first RS (e.g. a selected SSB/CSI-RS), for example in a common search space, and/or may not be able to determine an association between a detected control signal and/or a scheduled PRACH occasion and a first RS. A base station may configure the UE with multiple pre-defined/pre-allocated downlink control channels each associated with one of the multiple RSs, but that may result in an increased waste of resources and signaling overhead, and increased UE processing. Based on existing technology, the base station may configure a downlink control channel and address it to a first radio network identifier, wherein the first radio network is specified by a PRACH transmission resource (e.g. RA-RNTI). However, at this point that the UE (e.g. idle mode UE) has not received the PRACH scheduling yet, this is not possible/available. One or more embodiments of this enclosure provide the network with efficient mechanism to improve a PRACH triggering/scheduling/indication. Based on the one or more embodiments, the control signal (e.g. DCI) that triggers/schedules/indicates PRACH may be addressed to and/or scrambled by a second radio network identifier, wherein the radio network identifier is specified/determined based on a transmission/reception of the first RS (e.g. a selected SSB/CSI-RS). This may reduce a UE processing and/or blind detection, and may provide the network with more flexibility in resource allocation, and may reduce a waste of time/frequency resources by utilizing orthogonal code domain resources (e.g. radio network identifiers).

A wireless device may receive from a base station one or more messages comprising one or more parameters indicating one or more PRACH resources. The base station may configure the one or more PRACH resources dynamically, e.g., by transmitting an L1 signal (PDCCH, DCI, and/or control signal). The wireless device may receive from the base station one or more PRACH indications that may indicate the one or more PRACH resources. The one or more parameters may indicate a first association between the one or more PRACH indications and the one or more PRACH resources. The one or more PRACH resources may be associated with one or more downlink reference signals. For example, the first association may comprise a second association between one or more downlink reference signals and the one or more PRACH indications. The base station may transmit the one or more PRACH indications via a beam, for example a wide beam. The base station may transmit the one or more PRACH indications via one or more beams (e.g., the one or more PRACH indications may be beam-formed). The one or more beams may be associated with one or more beams that may be used for transmitting the one or more downlink reference signals (e.g., SSBs/CSI-RSs/DCIs). For example, the base station may transmit the one or more PRACH indications and the one or more downlink reference signals (e.g., SSBs) via the one or more beams. For example, the base station may transmit a first PRACH indication and a first SSB via a first beam. The wireless device may receive the one or more PRACH indications on a second beam. The one or more parameters may indicate a mechanism for a selection of the second beam. For example, the selection of the second beam may be associated with a first selection of a first search space. The first search space may comprise a first downlink reference signal (e.g., a first SSB and/or a first DCI and/or a first CSI-RS). The base station may transmit the first downlink reference signal (e.g., the first SSB and/or the first DCI and/or the first CSI-RS) via the first beam. For example, the first beam and the second beam may be paired. The second beam may be associated with a reception of the one or more downlink reference signals (e.g. SSBs). For example, the wireless device may receive the first PRACH indication and the first SSB on the second beam. For example, a reception of the one or more PRACH indications may be beam-formed. The wireless device may detect the one or more PRACH indications with high probability, for example when the reception of the one or more PRACH indications is beam-formed. For example, a received power of the one or more PRACH indications may be above a threshold when a received power of the one or more downlink reference signals is above the threshold, e.g., a reception of the one or more downlink reference signals is via the second beam. The wireless device may transmit one or more preambles using a third beam. For example, the third beam may correspond to the second beam.

Figure 19:
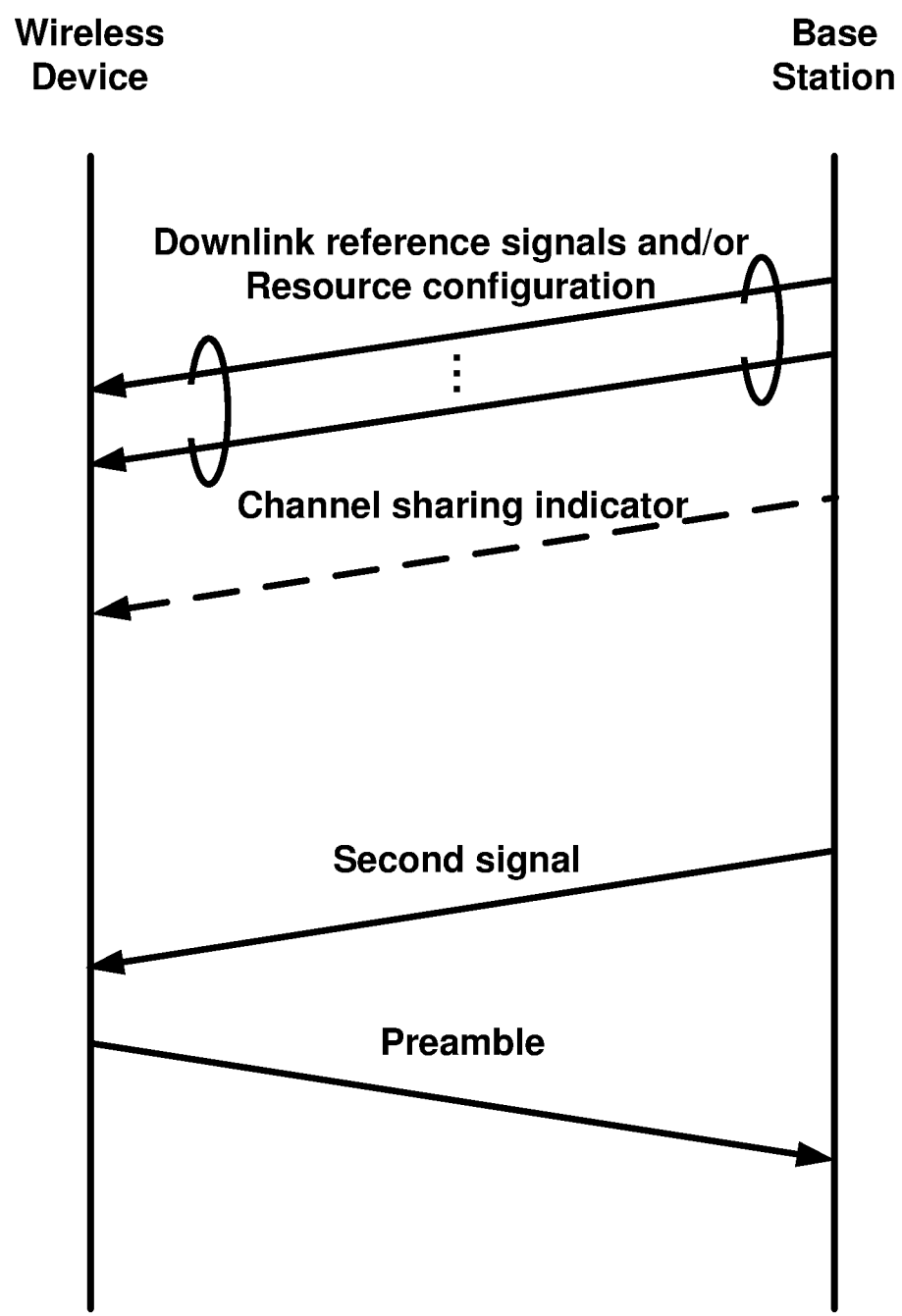
FIG. 19 is a diagram of an example signaling for random access procedure as per an aspect of an embodiment of the present disclosure.

FIG. 19 shows an example transmission sequence between a wireless device and a base station. As shown in FIG. 19, the base station transmit one or more messages to the wireless device. The one or more messages may comprise one or more downlink reference signals. The one or more downlink reference signals may comprise one or more SS/PBCH blocks (SSBs) and/or CSI-RSs. The one or more downlink reference signals may comprise one or more discovery reference signals (DRS). The one or more DRS may comprise one or more SSBs and/or CSI-RSs. The one or more messages may comprise resource configuration parameters indicating one or more downlink control channels. Each of the one or more downlink control channels may be associated with at least one of the one or more downlink reference signals. For example, each of the one or more downlink control channels may be associated with at least one SSB.

A wireless device may select a first downlink reference signal among the one or more downlink reference signals. For example, the wireless device may select a first SSB among one or more SSBs. The wireless device may determine among one or more downlink control channels, a first downlink channel based on the first downlink reference signal. For example, demodulation reference signal antenna port associated with a reception of the first downlink channel may be quasi co-located with the first downlink reference signal. For example, the first downlink channel may be a first downlink control channel (e.g., PDCCH). One or more resource configuration parameters may indicate a control resource set (CORESET) and/or one or more search space sets (e.g., Type0-PDCCH common search space set, Type1-PDCCH common search space set) for the first downlink channel. The CORESET/search space set may comprise one or more resource blocks and one or more symbols. The CORESET/search space set may comprise one or more monitoring occasions of the first downlink channel.

As further shown in FIG. 19, the wireless device receives from the base station one or more messages comprising a second signal. The wireless device may receive the second signal from a first downlink channel. In response to receiving the second signal, the wireless device may transmit at least one preamble, as shown in FIG. 19, via one or more random access resources. The one or more messages may comprise an indicator indicating that the at least one preamble may be transmitted based on the second signal. The one or more messages may comprise an indicator indicating that the one or more random access resources are allocated based on the second signal. For example, the second signal may comprise an indicator that indicates a trigger of preamble transmission (e.g. a PUSCH trigger B field in LTE). For example, the wireless device may transmit at least one preamble after or in response to receiving the second signal. There may be a time offset (e.g., a gap) between a reception of the second signal and a transmission of the at least one preamble. The time offset may determine an LBT category (e.g., CAT1, CAT2, CAT3, and/or CAT4). The wireless device may perform a particular LBT (e.g., CAT1 and/or CAT2) for a transmission of the at least one preamble, for example, if the time offset is less than or equal to a threshold (e.g., 25 us). The wireless device may perform a particular LBT (e.g., CAT3 and/or CAT4) for a transmission of the at least one preamble, for example, if the time offset is longer than a threshold (e.g., 25 us). For example, the second signal may initiate a RACH COT.

Figure 20:
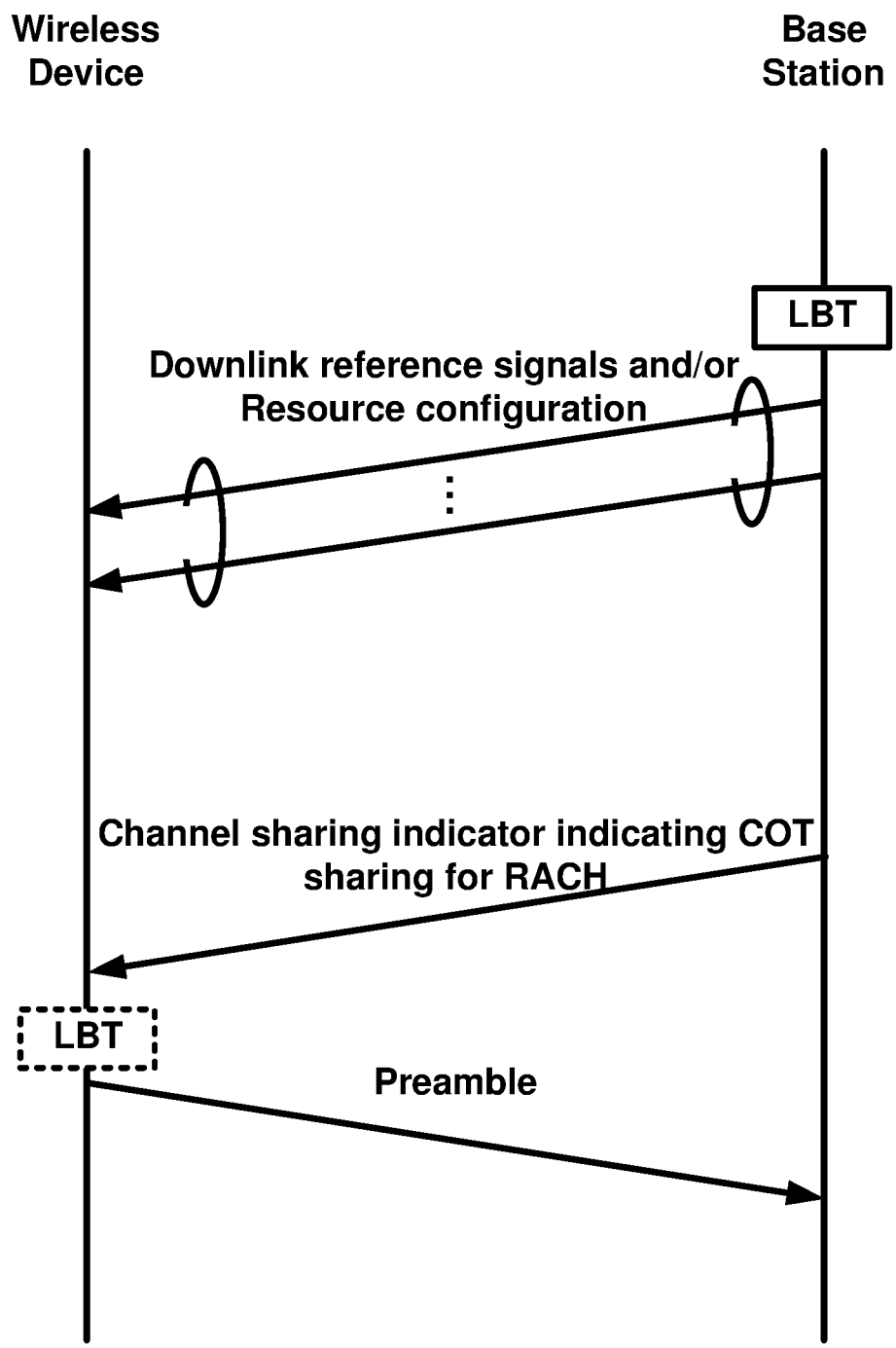
FIG. 20 is a diagram of an example signaling for random access procedure with COT sharing as per an aspect of an embodiment of the present disclosure.

A base station may schedule one or more random access resources within a COT that the base station initiated. For example, the base station may transmit one or more downlink reference signals in the COT. For example, the base station may transmit one or more SS/PBCH blocks/DRS in the COT. A wireless device may receive from the base station an indicator indicating that the one or more random access resources are scheduled within the base station-initiated COT (e.g., COT sharing for RACH). FIG. 20 shows an example transmission sequence, where a wireless device receives from a base station a channel sharing indicator indicating COT sharing for RACH. The wireless device may transmit at least one preamble in response to receiving the channel sharing indicator via the one or more random access resources within the COT. The wireless device may perform a channel access procedure by listening to a channel comprising the one or more random access resources and may determine that the channel is clear (e.g., free). The wireless device may perform a particular type of LBT, e.g., no LBT, or a one-shot (CAT2) LBT, or a CAT4 LBT for transmitting the at least one preamble.

Figure 21:
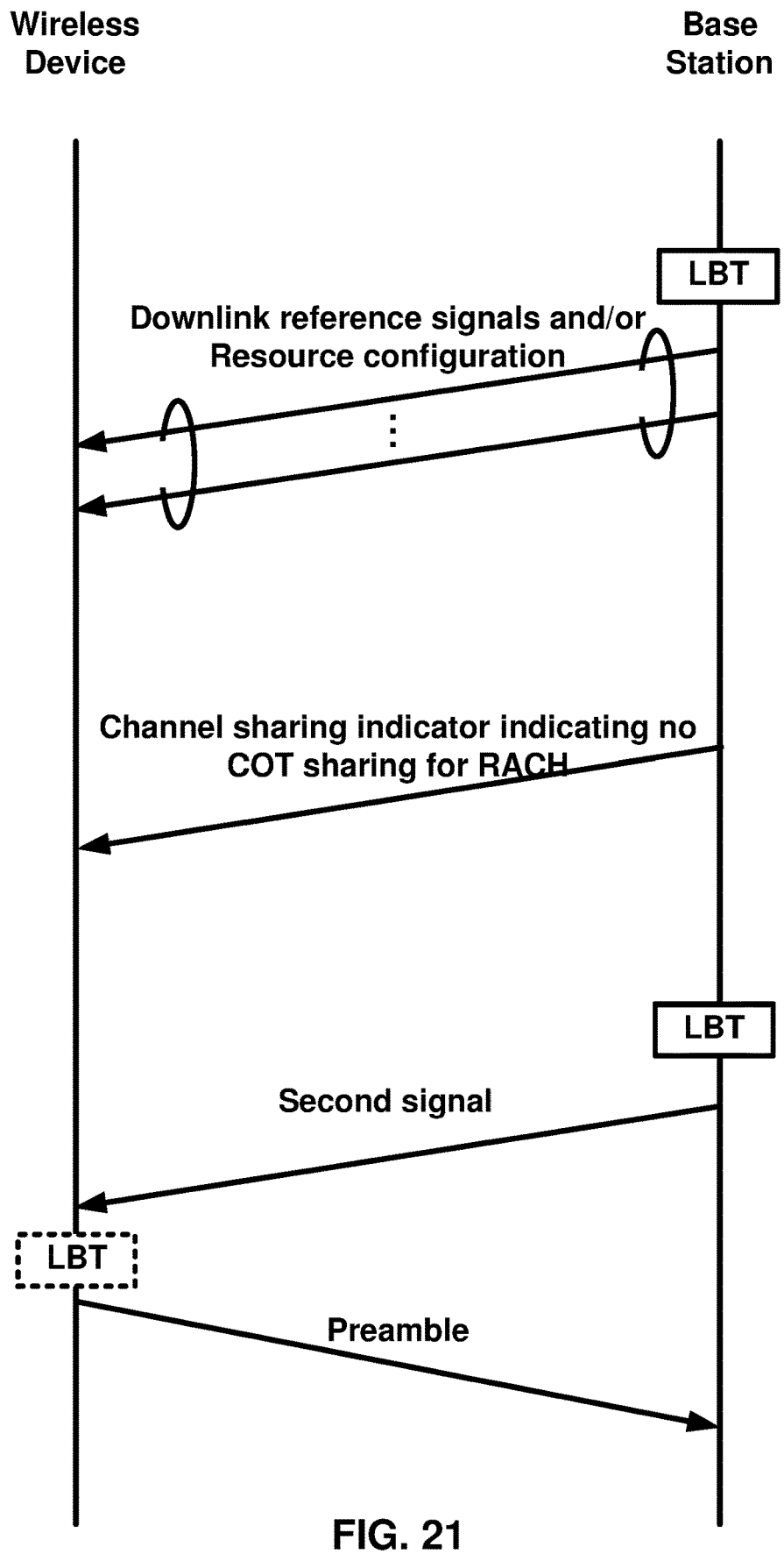
FIG. 21 is a diagram of an example signaling for two-stage preamble transmission as per an aspect of an embodiment of the present disclosure.

A base station may not schedule one or more random access resources within a COT that the base station initiated (e.g., a DRS COT). A wireless device may receive from the base station an indicator indicating that the one or more random access resources are scheduled outside the base station-initiated COT (e.g., no channel sharing for RACH). FIG. 21 shows an example transmission sequence, where a wireless device receives form a base station a channel sharing indicator indicating no COT sharing for RACH. The wireless device may further receive a second signal from the base station. The second signal may indicate the one or more random access resources. The wireless device may transmit at least one preamble in response to receiving the second signal via the one or more random access resources. The wireless device may perform a particular type of LBT, e.g., no LBT, or a one-shot (CAT2) LBT, or a CAT4 LBT for transmitting the at least one preamble.

Figure 22A:
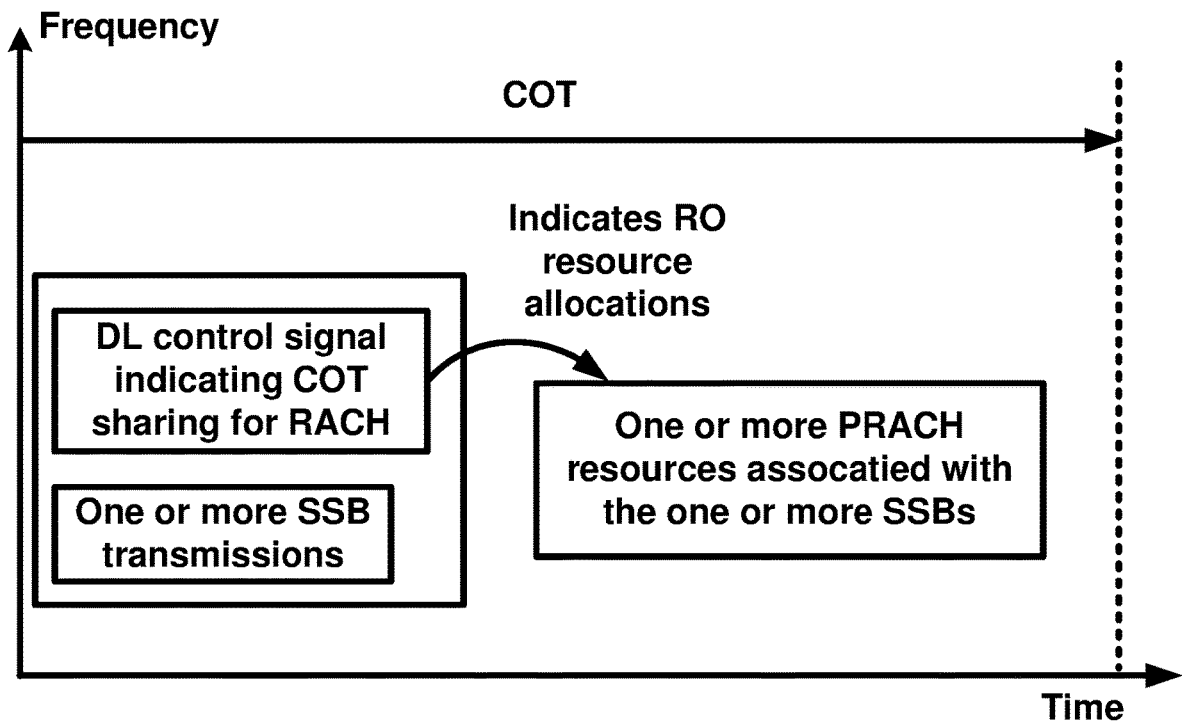
FIG. 22A and FIG. 22B are diagrams of an example PRACH resource allocation as per an aspect of an embodiment of the present disclosure.
Figure 22B:
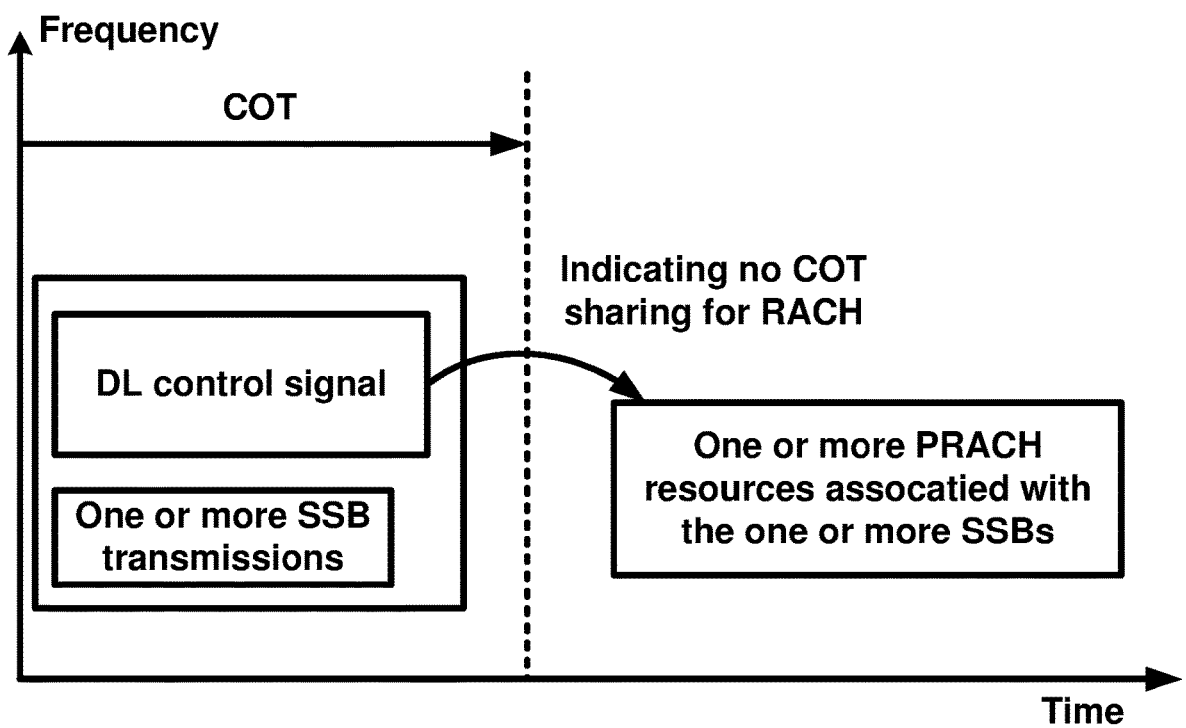

FIG. 22A shows an example where a base station schedules PRACH resources within a base station-initiated COT (e.g., DRS COT). In an example, one or more downlink control signals may comprise an indicator indicating COT sharing for RACH. In an example, one or more PRACH resources associated with one or more SSBs may be scheduled within the same COT as the one or more SSBs (e.g., DRS COT). FIG. 22B shows an example where the base station-initiated COT (e.g., DRS COT) expires and the base station may not be able to schedule PRACH resources within the base station-initiated COT. In an example, the one or more downlink control signals may comprise an indicator indicating no COT sharing for RACH. In an example, the one or more PRACH resources associated with the one or more SSBs may be scheduled outside the COT comprising SSBs (e.g., DRS COT). The one or more PRACH resources may be pre-configured. The one or more PRACH resources may be dynamically configured.

Figure 23:
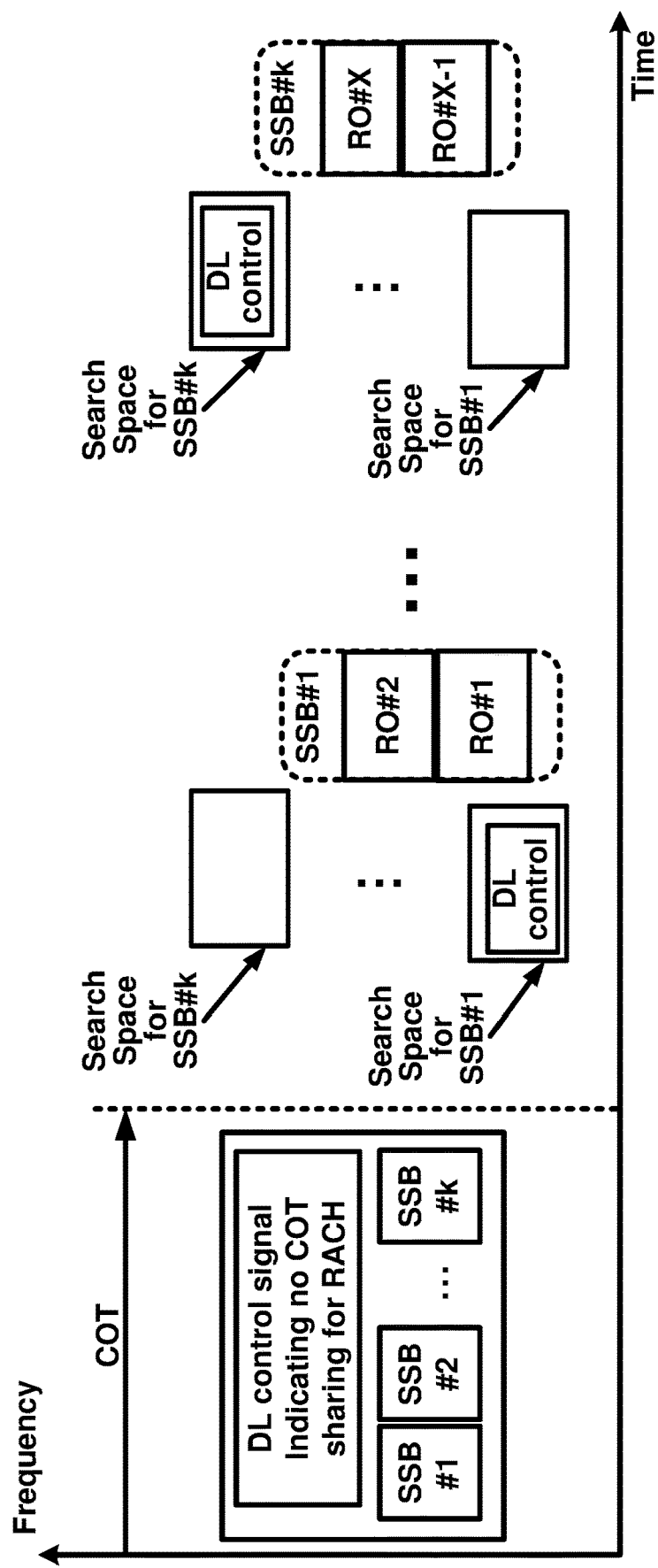
FIG. 23 is a diagram of an example search space monitoring for a two-stage preamble transmission as per an aspect of an embodiment of the present disclosure.

A wireless device may receive from a base station one or more messages comprising one or more parameters indicating one or more PRACH indications. The one or more PRACH indications may indicate one or more PRACH resources. The base station may configure the one or more PRACH resources semi-statistically and/or dynamically. The base station may transmit a second signal via one or more beams, e.g., via a first beam. For example, the second signal may comprise the one or more PRACH indications. The first beam may be associated with a transmission of one or more downlink reference signals. For example, the base station may transmit a first downlink reference signal (e.g., a first SSB/CSI-RS/DCI) via the first beam. For example, the wireless device may determine a first index of the first downlink reference signal (e.g., a first SSB index). For example, the wireless device may assume the first beam is associated with a transmission of the first downlink reference signal. For example, the wireless device may assume the second signal is transmitted via the first beam. The wireless device may receive the first downlink reference signal via a second beam. For example, a received power of the first downlink reference signal associated with the second beam may be above a threshold. The wireless device may receive the second signal via the second beam. For example, demodulation reference signal antenna port associated with a reception of the first downlink reference signal may be quasi co-located with the second signal. The wireless device may monitor a first downlink channel (e.g., a first downlink control channel, PDCCH) for the second signal. For example, the wireless device may monitor a first search space (e.g., Type0-PDCCH common search space and/or Type1-PDCCH common search space) associated with the first downlink reference signal (e.g., the first SSB). For example, the first search space may comprise the first downlink channel. FIG. 23 shows an example where one or more search spaces associated with one or more SSBs comprise one or more downlink control channels.

A wireless device may receive from a base station one or more messages comprising a first parameter indicating a time duration for a monitoring window (e.g., a window size). The time duration may be in terms of a number of slots, and/or symbols, and/or ms. The wireless device may start the monitoring window and may monitor during the time duration of the monitoring window. The wireless device may start the monitoring window in response to a first occasion of the first downlink channel and/or a second occasion associated with one or more downlink reference signals (e.g., the first SSB). For example, the wireless device may determine the first occasion based on the second occasion. For example, the second occasion may be an end of a first transmission of the one or more downlink reference signals. For example, the second occasion may be the end of a second transmission of a first downlink reference signal (e.g., the first SSB). The one or more messages may further comprise a second parameter indicating a start time of the monitoring window. The wireless device may determine the start time with respect to a transmission timing of the first downlink reference signal (e.g., the first SSB). For example, the start time may be determined with respect to a first occasion associated with the first downlink reference signal, e.g., the end of the first SSB transmission. The start time may be determined in terms of one or more slots or symbols.

Figure 24:
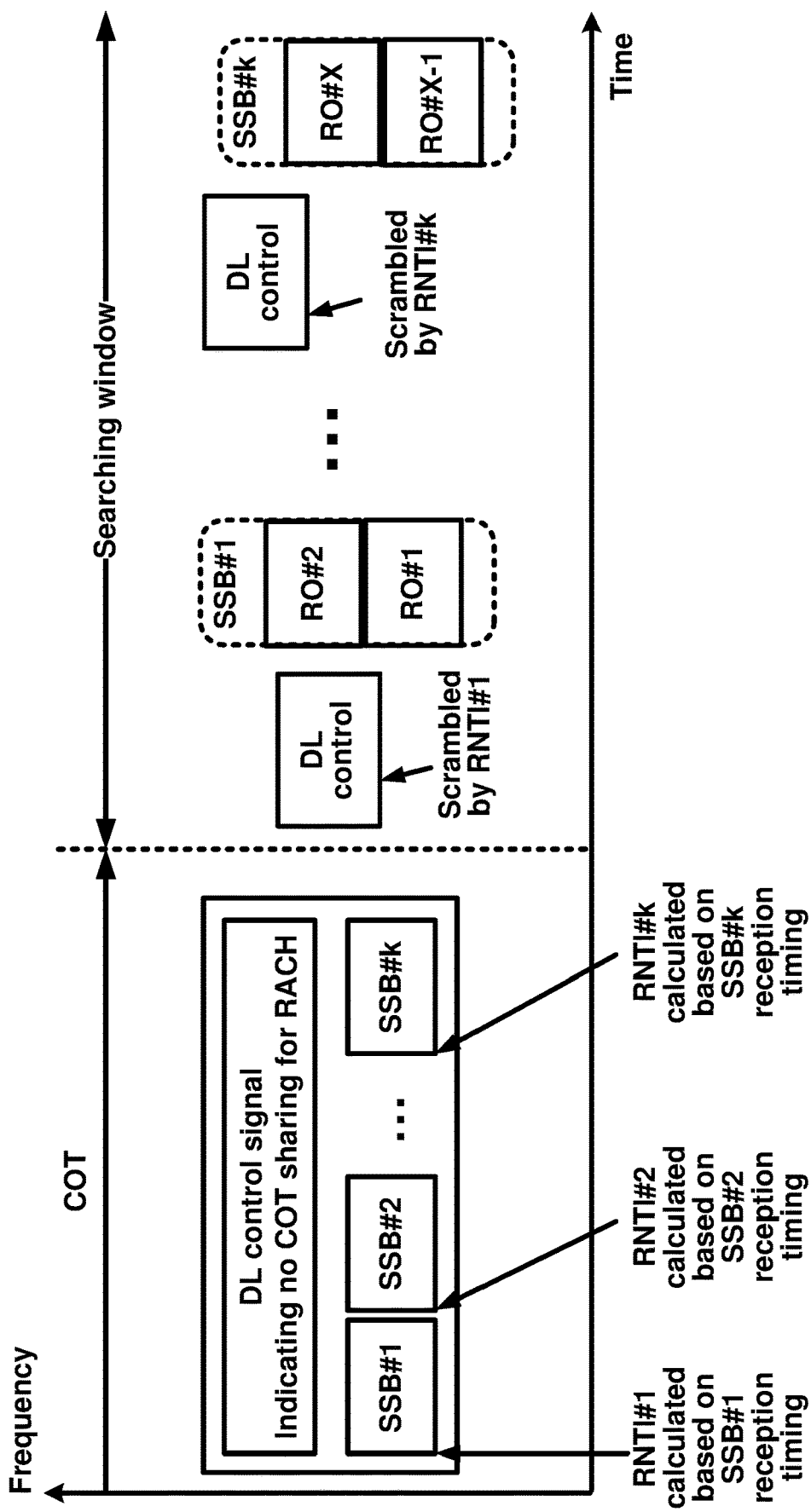
FIG. 24 is a diagram of an example channel monitoring for a two-stage preamble transmission as per an aspect of an embodiment of the present disclosure.

A wireless device may monitor a first downlink channel for a second signal based on a first radio network temporary identifier (RNTI). For example, the second signal may be scrambled by the first RNTI. The first RNTI may be predefined. One or more messages (e.g., RRC messages) may comprise the first RNTI. For example, the first RNTI may be a first RA-RNTI, and/or a first C-RNTI, and/or a first TC-RNTI, and/or a SI-RNTI. The wireless device may determine the first RNTI based on a transmission timing of a first downlink reference signal. FIG. 24 shows an example where the first RNTI is calculated based on a reception timing of a first SSB. For example, the transmission timing may be a slot index. For example, the first downlink channel may be scrambled by the first RNTI.

A base station may configure a plurality of RACH occasions (ROs). The base station may transmit a message comprising one or more parameters indicating one or more PRACH slots. The one or more parameters may indicate a number of ROs within a PRACH slot. The one or more parameters may indicate a number of ROs multiplexed in frequency domain (FDMed) in a PRACH slot. FIG. 25 shows an example of the one or more parameters. The base station may transmit one or more second signals. For example, the one or more second signals may comprise one or more PRACH indications. Each of the one or more second signals may be associated with one or more of the plurality of ROs. The message may comprise one or more parameters indicating an association between a second signal and one or more ROs. For example, the one or more parameters may indicate at least one of following: a subcarrier spacing of PRACH, a number of ROs FDMed in a time instance (e.g., Msg1-FDM), a PRACH configuration index (e.g., prach-ConfigurationIndex and/or ra-ssb-OccasionMaskIndex), a preamble format, a number of beams, a number of SSBs, a number of SSBs per RO (e.g., ssb-perRACH-Occasion), and/or a number of the one or more second signals transmitted per SSB, and/or a number of the one or more second signals transmitted per RO, and/or a number of ROs associated with a second signal (e.g., PRACH indication).

Figure 26:
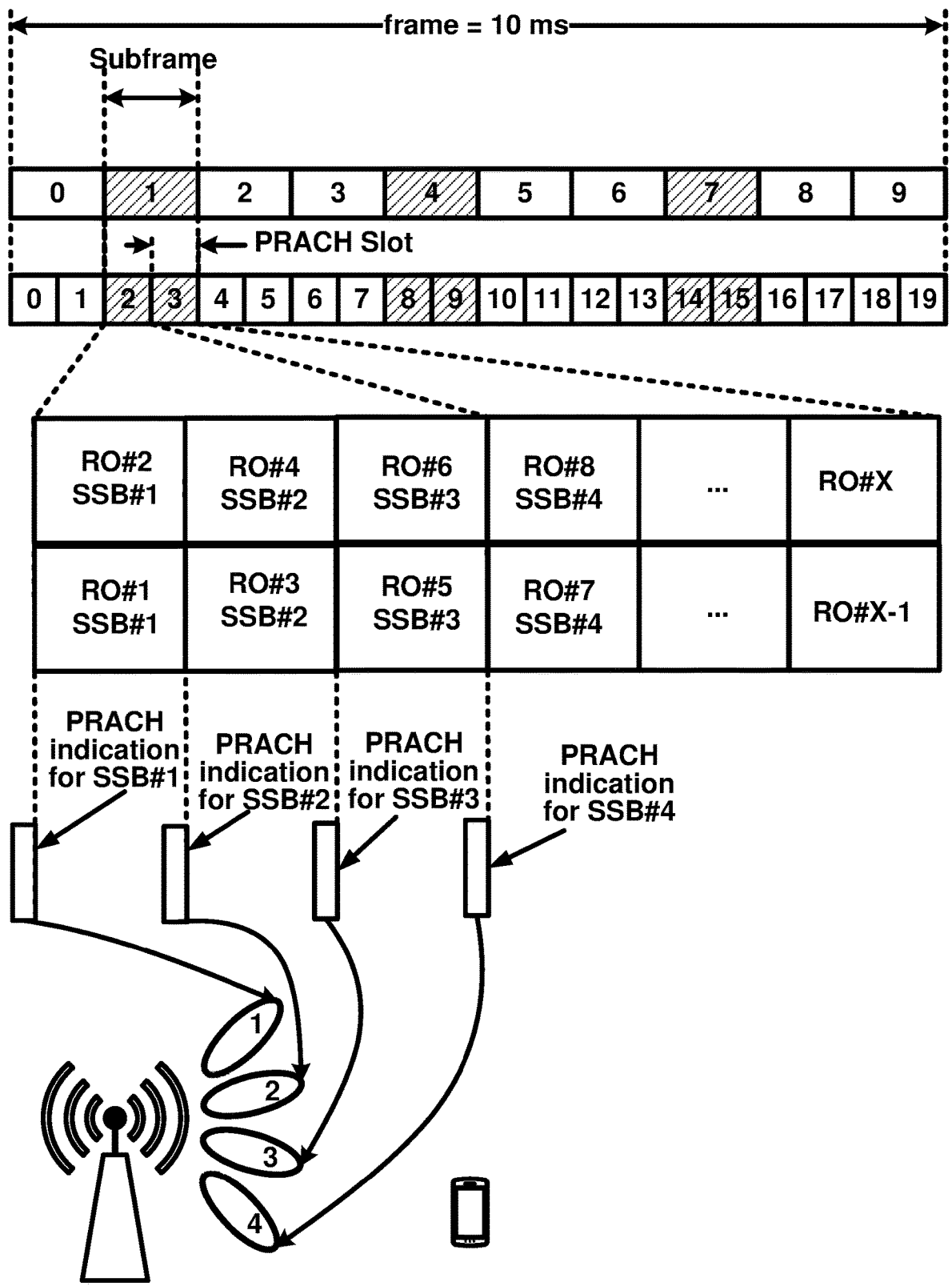
FIG. 26 is a diagram of an example PRACH indication as per an aspect of an embodiment of the present disclosure.

FIG. 26 shows an example where a wireless device may receive from a base station one or more second signals, e.g., PRACH indications. The one or more second signals may be associated with one or more downlink reference signals, e.g., SSBs. For example, the base station may transmit a first second signal via a first beam. For example, the base station may transmit a first SSB via the first beam. The base station may configure a plurality of ROs associated with the one or more second signals. For example, in FIG. 26 the base station configures one or more parameters indicating at least one of following: a PRACH configuration index (e.g., 133), a preamble format (e.g., A2), a PRACH frame number, a PRACH subframe number (e.g., 1,4,7), a PRACH starting symbol (e.g., 0), a number of PRACH slots within a PRACH subframe (e.g., 2), a number of time domain PRACH occasions (ROs) within a PRACH slot (e.g., 3), a PRACH duration (e.g., 4), a number of ROs FDMed in a PRACH slot (e.g., Msg1-FDM=2), a PRACH subcarrier spacing (e.g., 30 kHz), a number of SSBs per RO (e.g., ssb-perRACH-Occasion=½), a number of beams and/or a number of SSBs (e.g., 4). For example, FIG. 25 shows an example comprising such random access configurations. The wireless device may determine one or more of the plurality of ROs associated with the one or more second signals. The wireless device may transmit one or more preambles via the one or more ROs. For example, the wireless device determines a total number of ROs within a first PRACH slot (e.g., using the Msg-FDM and the number of ROs in a PRACH slot; 2×3=6). For example, the wireless device determines a number of ROs associated with the first SSB, (e.g., 1/ssb-perRACH-Occasion=2). For example, the wireless device receives one or more second signals associated with the first SSB. For example, the one or more parameters may indicate a number of the one or more second signals associated with the first SSB (e.g., PRACHindication-perSSB=1). For example, the wireless device may determine one or more reception of the number of the one or more seconds signals associated with the first SSB (e.g., reception of the first second signal). The wireless device may determine a number of ROs associated with the one or more second signals. In an example, the wireless may determine the number of ROs associated with the first second signal from the following equation:

RO-perPRACHindication=1/(ssb-perRACH-Occasion×PRACHindication-perSSB).

In an example, RO-perPRACHindication=1/(½×1)=2, i.e., the wireless device determines two ROs associated with the first second signal. For example, the one or more parameters may indicate the number of ROs associated with the one or more second signals (e.g., RO-perPRACHindication=2). For example, the one or more second signals may indicate a first index of one or more associated ROs.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 27:
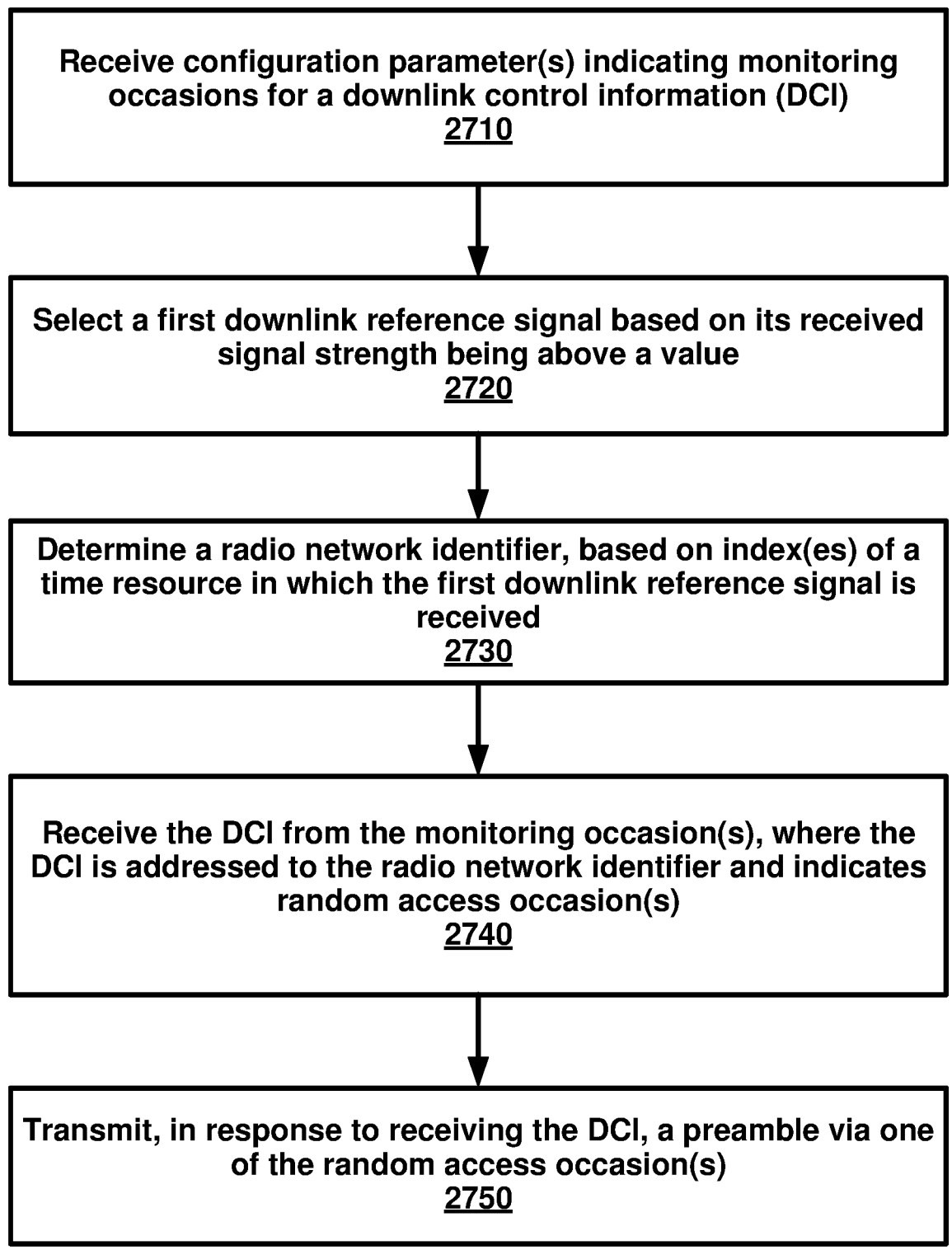
FIG. 27 is a flow diagram of an example embodiment for a wireless device two-stage preamble transmission as per an aspect of the present disclosure.

FIG. 27 is a flow diagram as per an aspect of an example embodiment of the present disclosure. FIG. 27 shows an example two-stage preamble transmission procedure for a wireless device. At 2710, a wireless device may receive, from a base station, one or more RRC messages. The RRC message(s) may comprise configuration parameters indicating one or more monitoring occasions for a downlink control information (DCI). The wireless device may receive one or more downlink reference signals. At 2720, the wireless device may select a first downlink reference signal from the one or more downlink reference signals. For example, a received signal strength of the first downlink reference signal may be above a value. The wireless device may receive the first downlink reference signal in a time resource. At 2730, the wireless device may determine a radio network identifier, based on at least one index indicating a time resource. At 2740, the wireless device may receive the DCI, from the one or more monitoring occasions. The DCI may be addressed to the radio network identifier. The DCI may indicate one or more random access occasions (ROs). At 2750, the wireless device may transmit, for example in response to receiving the DCI, one or more preambles via one of the one or more random access occasions.

According to an embodiment, the one or more messages may indicate a search space set, e.g. a common search space set. The search space set may comprise the one or more monitoring occasions. The one or more monitoring occasions may be associated with at least one downlink reference signal from the one or more downlink reference signals. The at least one downlink reference signal may comprise the first downlink reference signal. A demodulation reference signal antenna port associated with a reception of the DCI may be quasi co-located with the first downlink reference signal.

According to an embodiment, the first downlink reference signal may be received in a time resource. At least one index may indicate the time resource, e.g. slot/subframe/frame/ symbol number. The at least one index may comprise a first index of a first slot. The first slot may be associated with a reception and/or transmission of the first downlink reference signal.

According to an embodiment, the wireless device may monitor the one or more monitoring occasions for the DCI. The DCI may be addressed to and/or scrambled with the radio network identifier. The wireless device may monitor during a time duration. The time duration may be indicated, e.g. by a first parameter, for a monitoring window value. The one or more messages may comprise the first parameter indicating the monitoring window value. The first parameter for the monitoring window value may be pre-defined. The wireless device may start monitoring at a first monitoring occasion, of the one or more monitoring occasions, from an end of a reception of the first downlink reference signal. The time duration may start at a first monitoring occasion, of the one or more monitoring occasions, from an end of a reception of the first downlink reference signal. The wireless device may determine to start the monitoring based on a first time offset. The wireless device may apply the first time offset to a first timing of the first downlink reference signal. For example, the first timing may be an end of a reception and/or transmissions of the first downlink reference signal. The one or more messages may indicate the first time offset. The first time offset may be pre-defined. The first time offset may comprise one or more slots. The first time offset may comprise one or more symbols.

According to an embodiment, the received DCI may indicate a second time offset to a first RO of the one or more ROs. The one or more ROs may comprise consecutive ROs. The consecutive ROs may be multiplexed in a frequency domain and/or a time domain. The one or more ROs may be ordered in an increasing order of frequency resource indexes followed by increasing order of time resource indexes. The indexing may start from the first RO. The wireless device may determine the first RO by applying the second time offset to a second timing of the DCI. The second timing may be an end of a reception of the DCI. The wireless device may determine at least one RO from the one or more ROs. The at least one RO may be associated with the first downlink reference signal. The wireless device may select a second RO from the at least one RO. The one of the one or more ROs is the second RO. The wireless device may transmit the preamble via the second RO. The wireless device may map the one or more ROs to the one or more downlink reference signals. The mapping may be based on an increasing order of indexes of the one or more ROs. The mapping may be based on an increasing order of indexes of the one or more downlink reference signals. The mapping may be based on a number of ROs. The number of ROs may be a function of a downlink reference signal-to-RO mapping-ratio. The wireless device may determine the number of ROs from the one or more ROs that are mapped to the first downlink reference signal. The one or more messages may indicate the downlink reference signal-to-RO mapping-ratio. The DCI may indicate a number of the at least one RO associated with the first downlink reference signal. The at least one RO may be consecutive.

Figure 28:
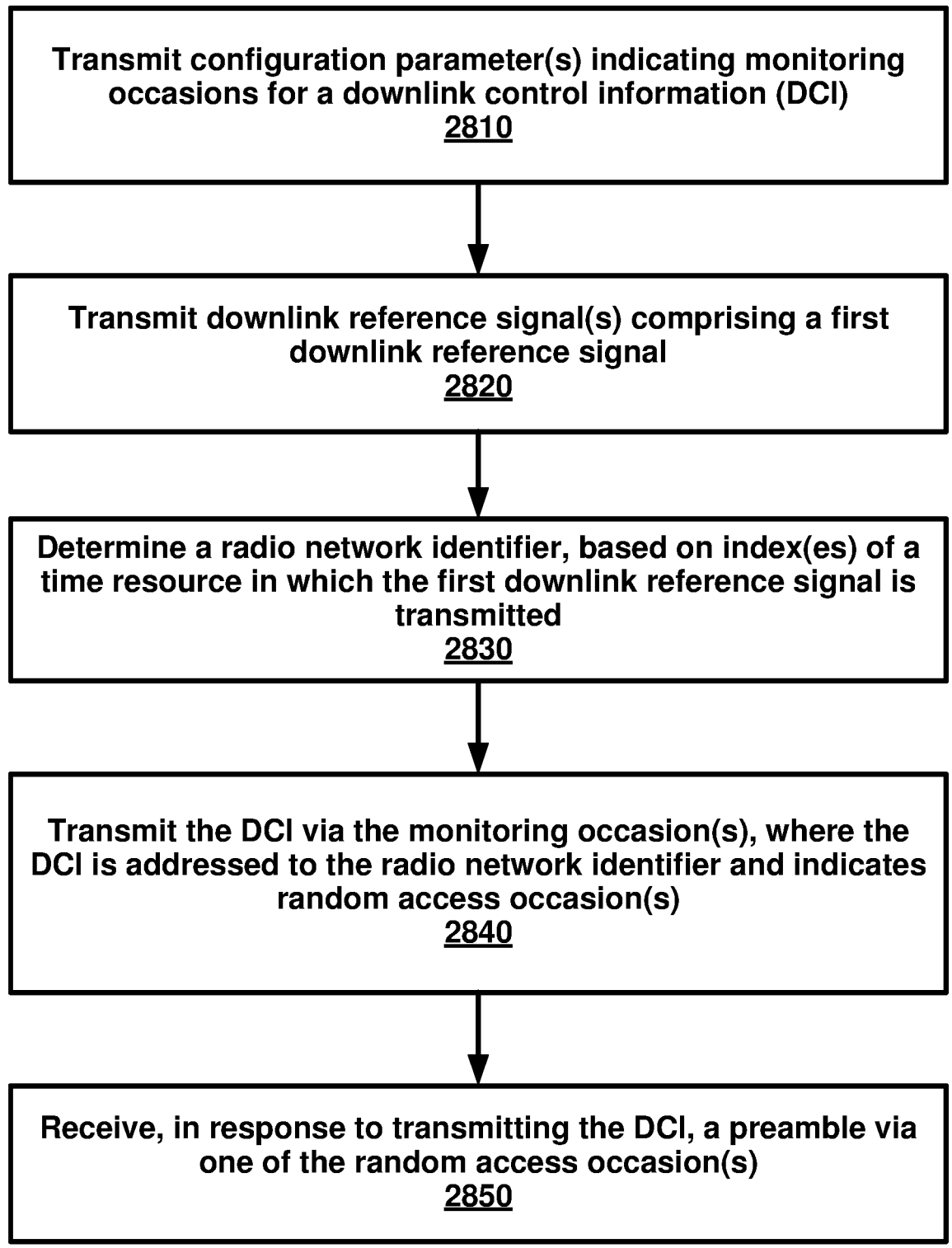
FIG. 28 is a flow diagram of an example embodiment for a base station in a two-stage preamble transmission as per an aspect of the present disclosure.

FIG. 28 is a flow diagram of an example embodiment for a base station in a two-stage preamble transmission as per an aspect of the present disclosure. At 2810, a base station may transmit, to a wireless device, one or more RRC messages. The RRC message(s) may comprise configuration parameters indicating one or more monitoring occasions for a downlink control information (DCI). At 2820, the base station may transmit one or more downlink reference signals. The one or more downlink reference signals may comprise a first downlink reference signal. At 2830, the base station may determine a radio network identifier, based on at least one index indicating a time resource. At 2840, the base station may transmit the DCI, via the one or more monitoring occasions. The DCI may be addressed to the radio network identifier. The DCI may indicate one or more random access occasions (ROs). At 2850, the base station may receive, for example in response to transmitting the DCI, one or more preambles via one of the one or more random access occasions.

A wireless device may receive from a second base station, one or more messages (e.g. RRC messages). The one or more messages may indicate one or more downlink reference signals of a first base station. For example, the one or more messages may comprise index(es) of the one or more downlink reference signals of a first base station. The one or more messages may indicate one or more monitoring occasions of a downlink control channel of the first base station. The wireless device may select a first downlink reference signal from the one or more downlink reference signals. The wireless device may select the first downlink reference signal based on a received signal strength of the first downlink reference signal being above a first value. The wireless device may determine a radio network identifier based on a time resource. The wireless device may receive the first downlink reference signal in the time resource, e.g. a slot/symbol. The wireless device may receive, from the first base station via the downlink control channel, a downlink control signal. The downlink control signal may be addressed to the radio network identifier. The wireless device may transmit a preamble to the first base station.

A wireless device may determine a first occasion of one or more random access resources (RACH occasion, RO) to transmit a preamble. A second signal may comprise a parameter indicating a time offset. The time offset may be in terms of a number of slots/symbols. The time offset may indicate the first occasion. The time offset may be defined based on a second occasion that the wireless device receives the second signal from a first downlink channel. One or more messages (e.g., RRC messages) may comprise one or more parameters indicating a first number of occasions (ROs) associated with the second signal. For example, the wireless device may determine the first occasion based on the first number of occasions associated with the second signal. The one or more messages may comprise a parameter indicating a first RO index (e.g., a lowest RO index or a highest RO index) associated with the second signal. For example, the wireless device may determine the one or more random access resources (ROs) associated with a first downlink reference signal (e.g., a first SSB). The base station may transmit one or more second signals associated with at least one of one or more downlink reference signals, e.g., the first downlink reference signal or the first SSB. The one or more parameters may comprise a second number of the one or more second signals. The one or more second signals may comprise the second signal. The one or more parameters may indicate at least a number of occasions (ROs) associated with the one or more second signals. For example, the wireless device may determine the first occasion based on the at least one number of occasions associated with the one or more second signals. The one or more parameters may indicate a number of RO indexes (e.g., a lowest RO index or a highest RO index) associated with the one or more second signals. FIG. 23 and FIG. 24 show examples where the one or more ROs associated with the one or more downlink reference signals are determined based on the one or more second signals. One or more downlink control channels may comprise the one or more second signals.

A wireless device may receive from a base station one or more downlink reference signals, e.g., SSBs. The wireless device may further receive from the base station a downlink control information (DCI, e.g., a PDCCH order). The base station may send a DCI order to trigger a random access procedure, for example, to obtain uplink synchronization, or to add an SCell. The DCI may comprise a first parameter indicating one or more random access channel occasions (RACH occasions, ROs). The DCI may further comprise a second parameter indicating a first downlink reference signal (e.g., a first SSB) among the one or more downlink reference signals. The wireless device may receive from the base station one or more messages (e.g., RRC messages) comprising one or more parameters that configure one or more PRACH occasions associated with the first downlink reference signal (e.g., the first SSB). For example, the one or more parameters may comprise a PRACH mask index, and/or a PRACH configuration index. The DCI may further comprise an indicator indicating that the one or more random access channel occasions (ROs) are allocated based on a second signal.

A wireless device may receive from a base station one or more messages comprising resource configuration parameters indicating one or more downlink control channels. The one or more downlink control channels may be associated with at least one of one or more downlink reference signals. The wireless device may determine among the one or more downlink control channels, a first downlink channel based on a first downlink reference signal (e.g., the first SSB). For example, demodulation reference signal antenna ports associated with a reception of the first downlink channel may be quasi co-located with the first downlink reference signal. The first downlink reference signal may comprise one or more channel state information reference signals (CSI-RS). The wireless device may receive a second signal from the first downlink channel. In response to receiving the second signal, the wireless device may transmit at least one preamble via one or more RACH occasions (ROs). A downlink control information (DCI) may comprise an index of the at least one preamble (e.g., PRACH mask index). The DCI may further comprise an uplink carrier indicator.

A wireless device may monitor a first downlink channel for a second signal based on a first radio network temporary identifier (RNTI). The wireless device may receive from a base station one or more messages comprising a first parameter indicating a time duration for a monitoring window (e.g., a window size). The time duration may be in terms of a number of slots, and/or symbols, and/or ms. The wireless device may start the monitoring window and may monitor during the time duration of the monitoring window. The wireless device may start the monitoring window in response to a first occasion of the first downlink channel and/or a second occasion of one or more RACH occasions (ROs). The one or more messages may further comprise a second parameter indicating a start time of the monitoring window. The wireless device may determine the start time with respect to a transmission timing of the first downlink reference signal (e.g., the first SSB). For example, the start time may be determined with respect to a first occasion associated with the first downlink reference signal, e.g., the end of the first SSB transmission. The start time may be determined in terms of one or more slots or symbols.

A wireless device may receive from a first base station one or more downlink reference signals. The wireless device may further receive from a second base station one or more messages (e.g., RRC messages), for example, when the wireless device is accessing a new cell (e.g., during a handover). The one or more messages may comprise a first parameter indicating one or more RACH occasions and a second parameter indicating a first downlink reference signal (e.g., a first SSB) among the one or more downlink reference signals. The one or more messages may further comprise an indicator indicating that the one or more RACH occasions may be allocated based on a second signal. The one or more messages may comprise resource configuration parameters indicating one or more downlink control channels. Each of the one or more downlink control channels may be associated with at least one of the one or more downlink reference signals. The wireless device may determine among the one or more downlink reference signals a first downlink control channel based on the first downlink reference signal. The wireless device may receive the second signal from the first downlink channel. In response to receiving the second signal, the wireless device may transmit at least one preamble to the first base station via the one or more RACH occasions.

A method may comprise receiving, by a wireless device from a base station, one or more messages comprising resource configuration parameters indicating one or more downlink control channels, wherein each of the one or more downlink control channels is associated with at least one of one or more downlink reference signals. The method may further comprise selecting a first downlink reference signal among the one or more downlink reference signals; determining, among the one or more downlink control channels, a first downlink channel based on the first downlink reference signal; receiving a second signal from the first downlink channel; and in response to receiving the second signal, transmitting at least one preamble via one or more random access resources. The one or more messages may comprise an indicator indicating that a preamble is transmitted based on the second signal. The one or more messages may comprise an indicator indicating that the one or more random access resources are allocated based on the second signal. The resource configuration parameters may further indicate a control resource set of the first downlink channel, the control resource set may comprise one or more resource blocks and one or more symbols; and one or more monitoring occasions of the first downlink channel. Demodulation reference signal antenna port associated with a reception of the first downlink channel may be quasi co-located with the first downlink reference signal. The method may further comprise starting a monitoring window; and monitoring, during a time duration of the monitoring window, the first downlink channel for the second signal based on a first radio network temporary identifier. The one or more messages may further comprise a first parameter indicating the time duration for the monitoring. The wireless device may start the monitoring window in response to a first occasion of the first downlink channel; and/or a second occasion associated with the one or more downlink reference signals. The first occasion may be determined based on the second occasion. The second occasion may be the end of a first transmission of the one or more downlink reference signals. The second occasion may be the end of a second transmission of the first downlink reference signal. The one or more messages may further comprise a second parameter indicating a start time of the monitoring. The start time may be determined with respect to a transmission timing of the first downlink reference signal. The start time may be determined in terms of one or more slots or symbols. The first radio network temporary identifier may be predefined. The one or more messages may comprise the first radio network temporary identifier. The method may further comprise determining the first radio network temporary identifier based on transmission timing of the first downlink reference signal. The transmission timing may be a slot index. The one or more downlink reference signals may comprise one or more discovery reference signals. The first downlink reference signal may comprise one or more synchronization signals, further comprising adjusting a downlink synchronization based on the one or more synchronization signals. The method may further comprise determining a first occasion of the one or more random access resources. The second signal may comprise a parameter indicating a time offset indicating the first occasion. The time offset may be defined based on a second occasion that the wireless device receives the second signal from the first downlink channel. The one or more messages may comprise one or more parameters indicating a first number of occasions associated with the second signal; and the one or more second signals may comprise the second signal. The method may further comprise performing a channel access procedure by listening to a channel comprising the one or more random access resources; and determining that the channel is clear.

A method may comprise receiving, by a wireless device from a base station, one or more messages comprising an indicator indicating that one or more random access resources are allocated based on a second signal, a first parameter indicating a start time of a monitoring window; a second parameter indicating a time duration of the monitoring window; and resource configuration parameters indicating one or more downlink control channels, wherein each of the one or more downlink control channels is associated with at least one of one or more downlink reference signals. The method may comprise selecting a first downlink reference signal among the one or more downlink reference signals; determining, among the one or more downlink control channels, a first downlink channel based on the first downlink reference signal; monitoring, from the start time and during the time duration of the monitoring window, the first downlink channel for the second signal; and in response to receiving the second signal, transmitting at least one preamble via the one or more random access resources. Demodulation reference signal antenna ports associated with a reception of the first downlink channel may be quasi co-located with the first downlink reference signal. The start time may be determined with respect to a transmission timing of the first downlink reference signal. The start time may be determined in terms of one or more slots or symbols. The second signal may be scrambled by a first radio network temporary identifier. The wireless device may start the monitoring window in response to a first occasion of the first downlink channel; and/or second occasion associated with the one or more downlink reference signals. The first occasion may be determined based on the second occasions. The second occasion may be the end of a first transmission of the one or more downlink reference signals. The second occasion may be the end of a second transmission of the first downlink reference signal. The first radio network temporary identifier may be pre-defined. The one or more messages may comprise the first radio network temporary identifier. The method may further comprise determining the first radio network temporary identifier based on transmission timing of the first downlink reference signal. The transmission timing may be a slot index. The method may further comprise determining a first occasion of the one or more random access resources. The second signal may comprise a parameter indicating a time offset indicating the first occasion. The time offset may be defined based on a second occasion that the wireless device receives the second signal from the first downlink control channel. The one or more messages may comprise one or more parameters indicating a first number of occasions associated with the second signal; and/or the first occasion may be determined based on the first number of occasions. The one or more parameters may comprise a second number of one or more second signals transmitted by the base station associated with the at least one of one or more downlink reference signals; and/or the one or more second signals comprise the second signal.

A method may comprise receiving, by a wireless device form a base station, one or more downlink reference signals. The method may further comprise receiving, by a wireless device from a base station, a downlink control information comprising a first parameter indicating one or more random access channel occasions; a second parameter indicating a first downlink reference signal among the one or more downlink reference signals; and an indicator indicating that the one or more random access channel occasions are allocated based on a second signal. The method may comprise determining, among one or more downlink control channels, a first downlink channel based on the first downlink reference signal; receiving the second signal from the first downlink channel; and in response to receiving the second signal, transmitting at least one preamble via the one or more random access channel occasions. The method may further comprise receiving one or more messages comprising resource configuration parameters indicating the one or more downlink control channels, wherein each of the one or more downlink control channels is associated with at least one of the one or more downlink reference signals. The downlink control information may further comprise an index of the at least one preamble. The downlink control information may further comprise an uplink carrier indicator. The first downlink reference signal may comprise one or more channel state information reference signals. Demodulation reference signal antenna ports associated with a reception of the first downlink channel may be quasi co-located with the first downlink reference signal. The method may further comprise starting a monitoring window; and monitoring, during a time duration of the monitoring window, the first downlink channel for the second signal based on a first radio network temporary identifier. The one or more messages may further comprise a first parameter indicating the time duration for the monitoring. the wireless device may start the monitoring window in response to a first occasion of the first downlink channel; and/or a second occasion of the one or more random access resources. The first occasion may be determined based on the second occasions. The second occasion may be the end of the one or more downlink reference signals. The second occasion may be the end of the first downlink reference signal. The one or more messages further may comprise a second parameter indicating a start time of the monitoring. The start time may be determined with respect to a transmission timing of the first downlink reference signal. The start time may be determined in terms of one or more slots or symbols. The first radio network temporary identifier may be redefined. the one or more messages may comprise the first radio network temporary identifier. The method may further comprise determining the first radio network temporary identifier based on transmission timing of the first downlink reference signal. The transmission timing may be a slot index. The method may further comprise determining a first occasion of the one or more random access resources. The second signal may comprise a parameter indicating a time offset indicating the first occasion. The time offset may be defined based on a second occasion that the wireless device receives the second signal from the first downlink control channel. The one or more messages may comprise one or more parameters indicating a first number of occasions associated with the second signal; and the first occasion may be determined based on the first number of occasions. The one or more parameters may comprise a second number of one or more second signals transmitted by the base station associated with the at least one of one or more downlink reference signals; and the one or more second signals may comprise the second signal.

A method may comprise receiving, by a wireless device from a first base station, one or more downlink reference signals. The method may further comprise receiving, by a wireless device from a second base station, one or more messages comprising a first parameter indicating one or more random access channel occasions; a second parameter indicating a first downlink reference signal among the one or more downlink reference signals; and/or an indicator indicating that the one or more random access channel occasions are allocated based on a second signal. The method may comprise determining, among one or more downlink control channels, a first downlink channel based on the first downlink reference signal; receiving the second signal from the first downlink channel; and in response to receiving the second signal, transmitting at least one preamble to the first base station via one or more random access resources. The one or more messages may comprise resource configuration parameters indicating the one or more downlink control channels, wherein each of the one or more downlink control channels may be associated with at least one of the one or more downlink reference signals. The first downlink reference signal may comprise one or more channel state information reference signals. Demodulation reference signal antenna ports associated with a reception of the first downlink channel may be quasi co-located with the first downlink reference signal. The method may comprise starting a monitoring window; and monitoring, during a time duration of the monitoring window, the first downlink channel for the second signal based on a first radio network temporary identifier. the one or more messages may further comprise a first parameter indicating the time duration for the monitoring. The wireless device may start the monitoring window in response to a first occasion of the first downlink channel; and a second occasion of the one or more random access resources. The first occasion may be determined based on the second occasions. The second occasion may be the end of the one or more downlink reference signals. The second occasion may be the end of the first downlink reference signal. The one or more messages may further comprise a second parameter indicating a start time of the monitoring. The start time may be determined with respect to a transmission timing of the first downlink reference signal. The start time may be determined in terms of one or more slots or symbols. The first radio network temporary identifier may be redefined. the one or more messages may comprise the first radio network temporary identifier. The method may further comprise determining the first radio network temporary identifier based on transmission timing of the first downlink reference signal. The transmission timing may be a slot index. The method may further comprise determining a first occasion of the one or more random access resources. The second signal may comprise a parameter indicating a time offset indicating the first occasion. The time offset may be defined based on a second occasion that the wireless device receives the second signal from the first downlink control channel. The one or more messages may comprise one or more parameters indicating a first number of occasions associated with the second signal; and the first occasion may be determined based on the first number of occasions. The one or more parameters may comprise a second number of one or more second signals transmitted by the base station associated with the at least one of one or more downlink reference signals; and the one or more second signals may comprise the second signal.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
  selecting, by a wireless device, a first downlink reference signal from one or more downlink reference signals based on a received signal strength of the first downlink reference signal being above a value;
  determining, based on an index of the first downlink reference signal, a radio network identifier;
  receiving a downlink control information (DCI) addressed to the radio network identifier and indicating one or more random access occasions (ROs);
  transmitting, in response to receiving the DCI, a preamble via one of the one or more ROs;
  wherein the DCI further indicates a first time offset to a first RO of the one or more ROs, and wherein the one or more ROs:
    comprise consecutive ROs multiplexed in at least one of a frequency domain or a time domain; and
    are ordered in an increasing order of frequency resource indexes followed by increasing order of time resource indexes, wherein the ordering starts from the first RO;
  determining the first RO by applying the first time offset to an end of a reception of the DCI;
  determining at least one RO from the one or more ROs, wherein the at least one RO is associated with the first downlink reference signal; and
  selecting a second RO from the at least one RO, wherein the one of the one or more ROs is the second RO;
  wherein the determining the at least one RO comprises:
    mapping the one or more ROs to the one or more downlink reference signals based on:
      an increasing order of indexes of the one or more ROs;
      an increasing order of indexes of the one or more downlink reference signals; and
      a number of ROs based on a downlink reference signal to RO mapping ratio; and
    determining the number of ROs from the one or more ROs that are mapped to the first downlink reference signal.

2. The method of claim 1, wherein the determining is based on the index indicating a time resource in which the first downlink reference signal is received.

3. The method of claim 1, wherein the index comprises a first index of a first slot associated with a reception of the first downlink reference signal.

4. The method of claim 1, further comprising:
  receiving, from a base station, one or more messages indicating one or more monitoring occasions for the DCI.

5. The method of claim 4, wherein:
  the one or more monitoring occasions are associated with at least one downlink reference signal from the one or more downlink reference signals;
  the at least one downlink reference signal comprises the first downlink reference signal; and
  a demodulation reference signal antenna port associated with a reception of the DCI is quasi co-located with the first downlink reference signal.

6. The method of claim 4, further comprising monitoring, during a time duration indicated by a monitoring window value, the one or more monitoring occasions for the DCI addressed to the radio network identifier, wherein the time duration starts at a first monitoring occasion, of the one or more monitoring occasions, from an end of a reception of the first downlink reference signal.

7. The method of claim 6, further comprising determining to start the monitoring based on a second time offset with respect to the end of the reception of the first downlink reference signal, wherein the second time offset:
  comprises at least one of:
    one or more slots; or
    one or more symbols; and
  is:
    indicated via the one or more messages; or
    predefined.

8. A wireless device comprising:
  one or more processors; and
  memory storing instructions that, when executed by the one or more processors, cause the wireless device to:
    select a first downlink reference signal from one or more downlink reference signals based on a received signal strength of the first downlink reference signal being above a value;
    determine, based on an index of the first downlink reference signal, a radio network identifier;
    receive a downlink control information (DCI) addressed to the radio network identifier and indicating one or more random access occasions (ROs);
    transmit, in response to receiving the DCI, a preamble via one of the one or more ROs;
    wherein the DCI further indicates a first time offset to a first RO of the one or more ROs, and wherein the one or more ROs:
      comprise consecutive ROs multiplexed in at least one of a frequency domain or a time domain; and
      are ordered in an increasing order of frequency resource indexes followed by increasing order of time resource indexes, wherein the ordering starts from the first RO;
    determine the first RO by applying the first time offset to an end of a reception of the DCI;
    determine at least one RO from the one or more ROs, wherein the at least one RO is associated with the first downlink reference signal; and
    select a second RO from the at least one RO, wherein the one of the one or more ROs is the second RO;
    wherein to determine the at least one RO, the instructions cause the wireless device to:
      map the one or more ROs to the one or more downlink reference signals based on:
        an increasing order of indexes of the one or more ROs;
        an increasing order of indexes of the one or more downlink reference signals; and
        a number of ROs based on a downlink reference signal to RO mapping ratio; and
      determine the number of ROs from the one or more ROs that are mapped to the first downlink reference signal.

9. The wireless device of claim 8, wherein the radio network identifier is determined based on the index indicating a time resource in which the first downlink reference signal is received.

10. The wireless device of claim 8, wherein the index comprises a first index of a first slot associated with a reception of the first downlink reference signal.

11. The wireless device of claim 8, wherein the instructions further cause the wireless device to:
   receive, from a base station, one or more messages indicating one or more monitoring occasions for the DCI.

12. The wireless device of claim 11, wherein the instructions further cause the wireless device to monitor, during a time duration indicated by a monitoring window value, the one or more monitoring occasions for the DCI addressed to the radio network identifier, wherein the time duration starts at a first monitoring occasion, of the one or more monitoring occasions, from an end of a reception of the first downlink reference signal.

13. The wireless device of claim 12, wherein the instructions further cause the wireless device to determine to start the monitoring based on a second time offset with respect to the end of the reception of the first downlink reference signal, wherein the second time offset:
   comprises at least one of:
      one or more slots; or
      one or more symbols; and
   is:
      indicated via the one or more messages; or
      predefined.

14. A system comprising:
   a base station comprising:
      one or more first processors; and
      first memory storing first instructions that, when executed by the one or more first processors of the base station, cause the base station to:
         transmit one or more downlink reference signals;
         transmit a downlink control information (DCI) addressed to a radio network identifier and indicating one or more random access occasions (ROs); and
         receive, in response to receiving the DCI, a preamble via one of the one or more ROs; and
   a wireless device comprising:
      one or more second processors; and
      second memory storing second instructions that, when executed by the one or more second processors, cause the wireless device to:
         select a first downlink reference signal from the one or more downlink reference signals based on a received signal strength of the first downlink reference signal being above a value;
         determine, based on an index of the first downlink reference signal, the radio network identifier;
         receive the DCI addressed to the radio network identifier and indicating the one or more ROs;
         transmit, in response to receiving the DCI, the preamble via the one of the one or more ROs;
      wherein the DCI further indicates a first time offset to a first RO of the one or more ROs, and wherein the one or more ROs:
         comprise consecutive ROs multiplexed in at least one of a frequency domain or a time domain; and
         are ordered in an increasing order of frequency resource indexes followed by increasing order of time resource indexes, wherein the ordering starts from the first RO;
      determine the first RO by applying the first time offset to an end of a reception of the DCI;
      determine at least one RO from the one or more ROs, wherein the at least one RO is associated with the first downlink reference signal; and
      select a second RO from the at least one RO, wherein the one of the one or more ROs is the second RO;
      wherein to determine the at least one RO, the second instructions cause the wireless device to:
      map the one or more ROs to the one or more downlink reference signals based on:
         an increasing order of indexes of the one or more ROs;
         an increasing order of indexes of the one or more downlink reference signals; and
         a number of ROs based on a downlink reference signal to RO mapping ratio; and
            determine the number of ROs from the one or more ROs that are mapped to the first downlink reference signal.

\* \* \* \* \*